US012001761B2

(12) United States Patent
Pivac

(10) Patent No.: US 12,001,761 B2
(45) Date of Patent: Jun. 4, 2024

(54) COMPUTER AIDED DESIGN FOR BRICK AND BLOCK CONSTRUCTIONS AND CONTROL SOFTWARE TO CONTROL A MACHINE TO CONSTRUCT A BUILDING

(71) Applicant: FASTBRICK IP PTY LTD, Perth (AU)

(72) Inventor: Mark Pivac, Perth (AU)

(73) Assignee: FASTBRICK IP PTY LTD, High Wycombe (AU)

( * ) Notice: Subject to any disclaimer, the term of this patent is extended or adjusted under 35 U.S.C. 154(b) by 1400 days.

(21) Appl. No.: 16/317,772

(22) PCT Filed: Jul. 17, 2017

(86) PCT No.: PCT/AU2017/050738
§ 371 (c)(1),
(2) Date: Jan. 14, 2019

(87) PCT Pub. No.: WO2018/009985
PCT Pub. Date: Jan. 18, 2018

(65) Prior Publication Data
US 2019/0251210 A1    Aug. 15, 2019

(30) Foreign Application Priority Data
Jul. 15, 2016    (AU) .................................. 2016902787

(51) Int. Cl.
*G06F 30/13*    (2020.01)
*B25J 5/00*    (2006.01)
(Continued)

(52) U.S. Cl.
CPC ................ *G06F 30/13* (2020.01); *B25J 5/00* (2013.01); *B25J 9/023* (2013.01); *B25J 9/161* (2013.01);
(Continued)

(58) Field of Classification Search
USPC ............................................................ 703/1
See application file for complete search history.

(56) References Cited

U.S. PATENT DOCUMENTS

| 1,633,192 A | 6/1927 | Reagan |
| 1,829,435 A | 10/1931 | Barnhart |

(Continued)

FOREIGN PATENT DOCUMENTS

| AU | 645640 B2 | 1/1994 |
| CH | 673498 A | 3/1990 |

(Continued)

OTHER PUBLICATIONS

Davis, Jamie, BIM-M Initiative: A Comprehensive Update, Masonry Magazine, available at https://www.masonrymagazine.com/blog/2015/12/21/bim-m-initiative-a-comprehensive-update (Jan. 2016).*
(Continued)

*Primary Examiner* — Tamara T Kyle
*Assistant Examiner* — Conrad R Pack
(74) *Attorney, Agent, or Firm* — Perkins Coie LLP

(57) ABSTRACT

Computer aided design software for designing a building or other structure of brick construction, where in addition to the usual three dimensional modelling and rendering typical of CAD software, tabular data describing the spatial location and orientation of each brick is provided, including information regarding which bricks are cut to length so as to be shortened, and where they are located along each course, and which bricks are machined, drilled or routed for services or other special fittings. Data pertaining to this is compiled in a database for access by control software to control a brick laying machine to build a building or other structure from bricks. The database may receive via interface with a scanner data being a measure of the elevation of the footings and/or concrete pad that has been constructed according to
(Continued)

the building plan and for each brick of the first course, to determine how much material must be machined off the bottom of each brick so that when the first course is laid, the tops of the bricks of the first course are at the same level. This machining data is stored for each brick with the tabular data produced by computer aided design software, so that the control software can control the brick laying machine to machine and cut each brick as per the stored data, and convey each brick to the stored position on the footing, pad or previously laid course of bricks, with application of adhesive prior to positioning of the brick.

15 Claims, 19 Drawing Sheets

(51) Int. Cl.
| | | |
|---|---|---|
| *B25J 9/02* | (2006.01) | |
| *B25J 9/16* | (2006.01) | |
| *B25J 13/08* | (2006.01) | |
| *B25J 19/02* | (2006.01) | |
| *B28D 1/00* | (2006.01) | |
| *B28D 1/10* | (2006.01) | |
| *B28D 1/18* | (2006.01) | |
| *B28D 7/00* | (2006.01) | |
| *B28D 7/04* | (2006.01) | |
| *B60P 1/48* | (2006.01) | |
| *E04B 1/02* | (2006.01) | |
| *E04G 21/22* | (2006.01) | |
| *G05B 19/4097* | (2006.01) | |
| *G05B 19/416* | (2006.01) | |
| *G06F 16/00* | (2019.01) | |
| *G06F 16/17* | (2019.01) | |
| *B60P 3/28* | (2006.01) | |
| *B66C 13/22* | (2006.01) | |
| *E04B 2/04* | (2006.01) | |
| *E04F 21/02* | (2006.01) | |
| *G01C 15/00* | (2006.01) | |
| *G01S 17/66* | (2006.01) | |
| *G06F 111/20* | (2020.01) | |

(52) U.S. Cl.
CPC ............ *B25J 9/1612* (2013.01); *B25J 9/162* (2013.01); *B25J 9/1633* (2013.01); *B25J 9/1635* (2013.01); *B25J 9/1638* (2013.01); *B25J 9/1651* (2013.01); *B25J 9/1664* (2013.01); *B25J 9/1674* (2013.01); *B25J 9/1679* (2013.01); *B25J 9/1684* (2013.01); *B25J 9/1694* (2013.01); *B25J 13/089* (2013.01); *B25J 19/021* (2013.01); *B25J 19/022* (2013.01); *B28D 1/003* (2013.01); *B28D 1/10* (2013.01); *B28D 1/186* (2013.01); *B28D 7/005* (2013.01); *B28D 7/04* (2013.01); *B60P 1/48* (2013.01); *E04B 1/02* (2013.01); *E04G 21/22* (2013.01); *G05B 19/4097* (2013.01); *G05B 19/416* (2013.01); *G06F 16/00* (2019.01); *G06F 16/1734* (2019.01); *B25J 9/1697* (2013.01); *B60P 3/28* (2013.01); *B66C 13/22* (2013.01); *E04B 2/04* (2013.01); *E04F 21/023* (2013.01); *G01C 15/002* (2013.01); *G01S 17/66* (2013.01); *G05B 2219/35207* (2013.01); *G05B 2219/39001* (2013.01); *G05B 2219/40257* (2013.01); *G05B 2219/45086* (2013.01); *G06F 2111/20* (2020.01)

(56) References Cited

U.S. PATENT DOCUMENTS

| | | |
|---|---|---|
| 3,438,171 A | 4/1969 | Demarest |
| 3,757,484 A | 9/1973 | Williamson et al. |
| 3,790,428 A | 2/1974 | Lingl |
| RE28,305 E | 1/1975 | Williamson et al. |
| 3,930,929 A | 1/1976 | Lingl |
| 3,950,914 A | 4/1976 | Lowen |
| 4,033,463 A | 7/1977 | Cervin |
| 4,106,259 A | 8/1978 | Taylor-smith |
| 4,221,258 A | 9/1980 | Richard |
| 4,245,451 A | 1/1981 | Taylor-smith |
| 4,303,363 A | 12/1981 | Cervin |
| 4,523,100 A | 6/1985 | Payne |
| 4,708,562 A | 11/1987 | Melan et al. |
| 4,714,339 A | 12/1987 | Lau |
| 4,758,036 A | 7/1988 | Legille et al. |
| 4,765,789 A | 8/1988 | Lonardi et al. |
| 4,790,651 A | 12/1988 | Brown et al. |
| 4,827,689 A | 5/1989 | Lonardi et al. |
| 4,852,237 A | 8/1989 | Tradt et al. |
| 4,911,595 A | 3/1990 | Kirchen et al. |
| 4,945,493 A | 7/1990 | Huang et al. |
| 4,952,772 A | 8/1990 | Zana |
| 4,954,762 A | 9/1990 | Miyake et al. |
| 4,969,789 A | 11/1990 | Searle |
| 5,004,844 A | 4/1991 | Van Leeuwen et al. |
| 5,013,986 A | 5/1991 | Gauggel |
| 5,018,923 A | 5/1991 | Melan et al. |
| 5,049,797 A | 9/1991 | Phillips |
| 5,080,415 A | 1/1992 | Bjornson |
| 5,196,900 A | 3/1993 | Pettersen |
| 5,284,000 A | 2/1994 | Milne et al. |
| 5,321,353 A | 6/1994 | Furness |
| 5,403,140 A | 4/1995 | Carmichael et al. |
| 5,413,454 A | 5/1995 | Movsesian |
| 5,419,669 A | 5/1995 | Kremer et al. |
| 5,420,489 A | 5/1995 | Hansen et al. |
| 5,469,531 A | 11/1995 | Faure et al. |
| 5,497,061 A | 3/1996 | Nonaka et al. |
| 5,523,663 A | 6/1996 | Tsuge et al. |
| 5,527,145 A | 6/1996 | Duncan |
| 5,557,397 A | 9/1996 | Hyde et al. |
| 5,737,500 A | 4/1998 | Seraji et al. |
| 5,838,882 A | 11/1998 | Gan et al. |
| 6,018,923 A | 2/2000 | Wendt |
| 6,049,377 A | 4/2000 | Lau et al. |
| 6,101,455 A | 8/2000 | Davis |
| 6,134,507 A | 10/2000 | Markey, Jr. et al. |
| 6,166,809 A | 12/2000 | Pettersen et al. |
| 6,166,811 A | 12/2000 | Long et al. |
| 6,172,754 B1 | 1/2001 | Niebuhr |
| 6,213,309 B1 | 4/2001 | Dadisho |
| 6,285,959 B1 | 9/2001 | Greer |
| 6,310,644 B1 | 10/2001 | Keightley |
| 6,330,503 B1 | 12/2001 | Sharp et al. |
| 6,370,837 B1 | 4/2002 | Mcmahon et al. |
| 6,427,122 B1 | 7/2002 | Lin |
| 6,429,016 B1 | 8/2002 | Mcneil |
| 6,512,993 B2 | 1/2003 | Kacyra et al. |
| 6,516,272 B2 | 2/2003 | Lin |
| 6,584,378 B1 | 6/2003 | Anfindsen |
| 6,611,141 B1 | 8/2003 | Schulz |
| 6,618,496 B1 | 9/2003 | Tassakos et al. |
| 6,628,322 B1 | 9/2003 | Cerruti |
| 6,643,002 B2 | 11/2003 | Drake, Jr. |
| 6,664,529 B2 | 12/2003 | Pack et al. |
| 6,681,145 B1 | 1/2004 | Greenwood et al. |
| 6,683,694 B2 | 1/2004 | Cornil |
| 6,704,619 B1 | 3/2004 | Coleman et al. |
| 6,741,364 B2 | 5/2004 | Lange et al. |
| 6,825,937 B1 | 11/2004 | Gebauer et al. |
| 6,850,946 B1 | 2/2005 | Rappaport et al. |
| 6,859,729 B2 | 2/2005 | Breakfield et al. |
| 6,864,966 B2 | 3/2005 | Giger |
| 6,868,847 B2 | 3/2005 | Ainedter et al. |
| 6,873,880 B2 | 3/2005 | Hooke et al. |

(56) References Cited

U.S. PATENT DOCUMENTS

| | | |
|---|---|---|
| 6,917,893 B2 | 7/2005 | Dietsch et al. |
| 6,935,036 B2 | 8/2005 | Barber et al. |
| 6,957,496 B2 | 10/2005 | Raab et al. |
| 6,965,843 B2 | 11/2005 | Hobden et al. |
| 6,970,802 B2 | 11/2005 | Ban et al. |
| 6,996,912 B2 | 2/2006 | Raab et al. |
| 7,050,930 B2 | 5/2006 | Hobden et al. |
| 7,051,450 B2 | 5/2006 | Barber et al. |
| 7,069,664 B2 | 7/2006 | Barber et al. |
| 7,107,144 B2 | 9/2006 | Capozzi et al. |
| 7,111,437 B2 | 9/2006 | Ainedter |
| 7,130,034 B2 | 10/2006 | Barvosa-Carter et al. |
| 7,142,981 B2 | 11/2006 | Hablani |
| 7,145,647 B2 | 12/2006 | Suphellen et al. |
| 7,153,454 B2 | 12/2006 | Khoshnevis |
| 7,174,651 B2 | 2/2007 | Barber et al. |
| 7,230,689 B2 | 6/2007 | Lau |
| 7,246,030 B2 | 7/2007 | Raab et al. |
| 7,269,910 B2 | 9/2007 | Raab et al. |
| 7,347,311 B2 | 3/2008 | Rudge |
| 7,519,493 B2 | 4/2009 | Atwell et al. |
| 7,551,121 B1 | 6/2009 | Oconnell et al. |
| 7,564,538 B2 | 7/2009 | Sakimura et al. |
| 7,570,371 B1 | 8/2009 | Storm |
| 7,576,836 B2 | 8/2009 | Bridges |
| 7,576,847 B2 | 8/2009 | Bridges |
| 7,591,078 B2 | 9/2009 | Crampton |
| 7,639,347 B2 | 12/2009 | Eaton |
| 7,693,325 B2 | 4/2010 | Pulla et al. |
| 7,701,587 B2 | 4/2010 | Shioda et al. |
| 7,774,159 B2 | 8/2010 | Cheng et al. |
| 7,800,758 B1 | 9/2010 | Bridges et al. |
| 7,804,602 B2 | 9/2010 | Raab |
| RE42,055 E | 1/2011 | Raab et al. |
| RE42,082 E | 2/2011 | Raab et al. |
| 7,881,896 B2 | 2/2011 | Atwell et al. |
| 7,967,549 B2 | 6/2011 | Geist et al. |
| 7,993,289 B2 | 8/2011 | Quistgaard et al. |
| 8,036,452 B2 | 10/2011 | Pettersson et al. |
| 8,054,451 B2 | 11/2011 | Karazi et al. |
| 8,060,344 B2 | 11/2011 | Stathis |
| 8,145,446 B2 | 3/2012 | Atwell et al. |
| 8,166,727 B2 | 5/2012 | Pivac et al. |
| 8,169,604 B2 | 5/2012 | Braghiroli et al. |
| 8,185,240 B2 | 5/2012 | Williams et al. |
| 8,229,208 B2 | 7/2012 | Pulla et al. |
| 8,233,153 B2 | 7/2012 | Knuettel |
| 8,244,030 B2 | 8/2012 | Pettersson et al. |
| 8,248,620 B2 | 8/2012 | Wicks et al. |
| 8,269,984 B2 | 9/2012 | Hinderling et al. |
| 8,327,555 B2 | 12/2012 | Champ |
| 8,337,407 B2 | 12/2012 | Quistgaard et al. |
| 8,345,926 B2 | 1/2013 | Clark et al. |
| 8,346,392 B2 | 1/2013 | Walser et al. |
| 8,405,716 B2 | 3/2013 | Yu et al. |
| 8,467,072 B2 | 6/2013 | Cramer et al. |
| 8,537,372 B2 | 9/2013 | Siercks et al. |
| 8,537,376 B2 | 9/2013 | Day et al. |
| 8,558,992 B2 | 10/2013 | Steffey |
| 8,593,648 B2 | 11/2013 | Cramer et al. |
| 8,595,948 B2 | 12/2013 | Raab et al. |
| 8,606,399 B2 | 12/2013 | Williams et al. |
| 8,634,950 B2 | 1/2014 | Simonetti et al. |
| 8,644,964 B2 | 2/2014 | Hendron et al. |
| 8,670,114 B2 | 3/2014 | Bridges et al. |
| 8,677,643 B2 | 3/2014 | Bridges et al. |
| 8,792,709 B2 | 7/2014 | Pulla et al. |
| 8,803,055 B2 | 8/2014 | Lau et al. |
| 8,812,155 B2 | 8/2014 | Brethe |
| 8,825,208 B1 | 9/2014 | Benson |
| 8,832,954 B2 | 9/2014 | Atwell et al. |
| 8,848,203 B2 | 9/2014 | Bridges et al. |
| 8,875,409 B2 | 11/2014 | Kretschmer et al. |
| 8,898,919 B2 | 12/2014 | Bridges et al. |
| 8,902,408 B2 | 12/2014 | Bridges |
| 8,913,814 B2 | 12/2014 | Gandyra |
| 8,931,182 B2 | 1/2015 | Raab et al. |
| 8,942,940 B2 | 1/2015 | York |
| 8,965,571 B2 | 2/2015 | Peters et al. |
| 8,996,244 B2 | 3/2015 | Summer et al. |
| 8,997,362 B2 | 4/2015 | Briggs et al. |
| 9,020,240 B2 | 4/2015 | Pettersson et al. |
| 9,033,998 B1 | 5/2015 | Schaible et al. |
| RE45,565 E | 6/2015 | Bridges et al. |
| 9,046,360 B2 | 6/2015 | Atwell et al. |
| 9,074,381 B1 | 7/2015 | Drew |
| 9,109,877 B2 | 8/2015 | Thierman |
| 9,146,315 B2 | 9/2015 | Bosse et al. |
| 9,151,830 B2 | 10/2015 | Bridges |
| 9,163,922 B2 | 10/2015 | Bridges et al. |
| 9,170,096 B2 | 10/2015 | Fowler et al. |
| 9,188,430 B2 | 11/2015 | Atwell et al. |
| 9,207,309 B2 | 12/2015 | Bridges |
| 9,223,025 B2 | 12/2015 | Debrunner et al. |
| 9,229,108 B2 | 1/2016 | Debrunner et al. |
| 9,266,238 B2 | 2/2016 | Huettenhofer |
| 9,267,784 B2 | 2/2016 | Atwell et al. |
| 9,278,448 B2 | 3/2016 | Freeman |
| 9,279,661 B2 | 3/2016 | Tateno et al. |
| 9,303,988 B2 | 4/2016 | Tani |
| 9,353,519 B2 | 5/2016 | Williams |
| 9,354,051 B2 | 5/2016 | Dunne et al. |
| 9,358,688 B2 | 6/2016 | Drew |
| 9,367,741 B2 | 6/2016 | Le Marec |
| 9,377,301 B2 | 6/2016 | Neier et al. |
| 9,383,200 B2 | 7/2016 | Hulm et al. |
| 9,395,174 B2 | 7/2016 | Bridges |
| 9,405,293 B2 | 8/2016 | Meuleau |
| 9,423,282 B2 | 8/2016 | Moy |
| 9,437,005 B2 | 9/2016 | Tateno et al. |
| 9,443,308 B2 | 9/2016 | Pettersson et al. |
| 9,452,533 B2 | 9/2016 | Calkins et al. |
| 9,454,818 B2 | 9/2016 | Cramer |
| 9,476,695 B2 | 10/2016 | Becker et al. |
| 9,482,524 B2 | 11/2016 | Metzler et al. |
| 9,482,525 B2 | 11/2016 | Bridges |
| 9,482,746 B2 | 11/2016 | Bridges |
| 9,494,686 B2 | 11/2016 | Maryfield et al. |
| 9,513,100 B2 | 12/2016 | Raab et al. |
| 9,536,163 B2 | 1/2017 | Veeser et al. |
| 9,541,371 B2 | 1/2017 | Pettersson et al. |
| 9,561,019 B2 | 2/2017 | Mihailescu et al. |
| 9,607,239 B2 | 3/2017 | Bridges et al. |
| 9,618,620 B2 | 4/2017 | Zweigle et al. |
| 9,658,061 B2 | 5/2017 | Wilson et al. |
| 9,671,221 B2 | 6/2017 | Ruhland et al. |
| 9,679,385 B2 | 6/2017 | Suzuki et al. |
| 9,686,532 B2 | 6/2017 | Tohme |
| 9,708,079 B2 | 7/2017 | Desjardien et al. |
| 9,715,730 B2 | 7/2017 | Suzuki |
| 9,720,087 B2 | 8/2017 | Christen et al. |
| 9,734,609 B2 | 8/2017 | Pulla et al. |
| 9,739,595 B2 | 8/2017 | Lau |
| 9,746,308 B2 | 8/2017 | Gong |
| 9,757,859 B1 | 9/2017 | Kolb et al. |
| 9,768,837 B2 | 9/2017 | Charvat et al. |
| 9,772,173 B2 | 9/2017 | Atwell et al. |
| 9,803,969 B2 | 10/2017 | Gong |
| 9,816,813 B2 | 11/2017 | Lettau et al. |
| 9,829,305 B2 | 11/2017 | Gong |
| 9,835,717 B2 | 12/2017 | Bosse et al. |
| 9,844,792 B2 | 12/2017 | Pettersson et al. |
| 9,879,976 B2 | 1/2018 | Bridges et al. |
| 9,897,442 B2 | 2/2018 | Pettersson et al. |
| 9,903,939 B2 | 2/2018 | Charvat et al. |
| 9,909,855 B2 | 3/2018 | Becker et al. |
| 9,915,733 B2 | 3/2018 | Fried et al. |
| 9,921,046 B2 | 3/2018 | Gong |
| 9,958,268 B2 | 5/2018 | Ohtomo et al. |
| 9,958,545 B2 | 5/2018 | Eichenholz et al. |
| 9,964,398 B2 | 5/2018 | Becker et al. |
| 9,964,402 B2 | 5/2018 | Tohme et al. |
| 9,967,545 B2 | 5/2018 | Tohme |
| 9,989,353 B2 | 6/2018 | Bartmann et al. |

(56) References Cited

U.S. PATENT DOCUMENTS

| | | |
|---|---|---|
| 10,012,732 B2 | 7/2018 | Eichenholz et al. |
| 10,030,972 B2 | 7/2018 | Iseli et al. |
| 10,041,793 B2 | 8/2018 | Metzler et al. |
| 10,054,422 B2 | 8/2018 | Böckem et al. |
| 10,058,394 B2 | 8/2018 | Johnson et al. |
| 10,073,162 B2 | 9/2018 | Charvat et al. |
| 10,074,889 B2 | 9/2018 | Charvat et al. |
| 10,082,521 B2 | 9/2018 | Atlas et al. |
| 10,090,944 B1 | 10/2018 | Charvat et al. |
| 10,094,909 B2 | 10/2018 | Charvat et al. |
| 10,126,415 B2 | 11/2018 | Becker et al. |
| 10,189,176 B2 | 1/2019 | Williams |
| 10,220,511 B2 | 3/2019 | Linnell et al. |
| 10,240,949 B2 | 3/2019 | Peters et al. |
| 10,635,758 B2 | 4/2020 | Pivac et al. |
| 10,865,578 B2 | 12/2020 | Pivac et al. |
| 10,876,308 B2 | 12/2020 | Pivac et al. |
| 11,106,836 B2 | 8/2021 | Pivac et al. |
| 2002/0176603 A1 | 11/2002 | Bauer et al. |
| 2003/0048459 A1 | 3/2003 | Gooch |
| 2003/0090682 A1 | 5/2003 | Gooch et al. |
| 2003/0120377 A1 | 6/2003 | Hooke et al. |
| 2003/0206285 A1 | 11/2003 | Lau |
| 2004/0078137 A1 | 4/2004 | Breakfield et al. |
| 2004/0093119 A1 | 5/2004 | Gunnarsson et al. |
| 2004/0200947 A1 | 10/2004 | Lau |
| 2005/0007450 A1 | 1/2005 | Hill et al. |
| 2005/0057745 A1 | 3/2005 | Bontje |
| 2005/0060092 A1 | 3/2005 | Hablani |
| 2005/0086901 A1 | 4/2005 | Chisholm |
| 2005/0131619 A1 | 6/2005 | Rappaport et al. |
| 2005/0196484 A1 | 9/2005 | Khoshnevis |
| 2005/0252118 A1* | 11/2005 | Matsufuji ............ E04B 2/14 52/223.7 |
| 2006/0167587 A1 | 7/2006 | Read |
| 2006/0215179 A1 | 9/2006 | Mcmurtry et al. |
| 2007/0024870 A1 | 2/2007 | Girard et al. |
| 2007/0229802 A1 | 10/2007 | Lau |
| 2007/0284215 A1 | 12/2007 | Rudge |
| 2008/0030855 A1 | 2/2008 | Lau |
| 2008/0189046 A1 | 8/2008 | Eliasson et al. |
| 2009/0038258 A1 | 2/2009 | Pivac et al. |
| 2009/0074979 A1 | 3/2009 | Krogedal et al. |
| 2010/0025349 A1 | 2/2010 | Khoshnevis |
| 2010/0138185 A1 | 6/2010 | Kang |
| 2010/0281822 A1 | 11/2010 | Murray |
| 2011/0066393 A1 | 3/2011 | Groll et al. |
| 2011/0153524 A1 | 6/2011 | Schnackel |
| 2011/0208347 A1 | 8/2011 | Otake et al. |
| 2012/0038074 A1 | 2/2012 | Khoshnevis |
| 2012/0099096 A1 | 4/2012 | Bridges et al. |
| 2012/0136524 A1 | 5/2012 | Everett et al. |
| 2012/0265391 A1 | 10/2012 | Letsky |
| 2012/0277898 A1 | 11/2012 | Kawai et al. |
| 2013/0028478 A1 | 1/2013 | St-pierre et al. |
| 2013/0068061 A1 | 3/2013 | Yoon |
| 2013/0103192 A1 | 4/2013 | Huettenhofer |
| 2013/0104407 A1 | 5/2013 | Lee |
| 2013/0222816 A1 | 8/2013 | Briggs et al. |
| 2013/0250285 A1 | 9/2013 | Bridges et al. |
| 2013/0286196 A1 | 10/2013 | Atwell |
| 2014/0002608 A1 | 1/2014 | Atwell et al. |
| 2014/0067121 A1 | 3/2014 | Brooks et al. |
| 2014/0176677 A1 | 6/2014 | Valkenburg et al. |
| 2014/0192187 A1 | 7/2014 | Atwell et al. |
| 2014/0309960 A1 | 10/2014 | Vennegeerts et al. |
| 2014/0343727 A1 | 11/2014 | Calkins et al. |
| 2014/0366481 A1 | 12/2014 | Benson |
| 2015/0082740 A1 | 3/2015 | Peters et al. |
| 2015/0100066 A1 | 4/2015 | Kostrzewski et al. |
| 2015/0134303 A1 | 5/2015 | Chang et al. |
| 2015/0153720 A1 | 6/2015 | Pettersson et al. |
| 2015/0241203 A1 | 8/2015 | Jordil et al. |
| 2015/0258694 A1 | 9/2015 | Hand et al. |
| 2015/0276402 A1 | 10/2015 | Grsser et al. |
| 2015/0293596 A1 | 10/2015 | Krausen et al. |
| 2015/0309175 A1 | 10/2015 | Hinderling et al. |
| 2015/0314890 A1 | 11/2015 | Desjardien et al. |
| 2015/0352721 A1 | 12/2015 | Wicks et al. |
| 2015/0355310 A1 | 12/2015 | Gong et al. |
| 2015/0367509 A1 | 12/2015 | Georgeson |
| 2015/0371082 A1 | 12/2015 | Csaszar et al. |
| 2015/0377606 A1 | 12/2015 | Thielemans |
| 2016/0005185 A1 | 1/2016 | Geissler |
| 2016/0153786 A1 | 6/2016 | Liu et al. |
| 2016/0187130 A1 | 6/2016 | Metzler et al. |
| 2016/0187470 A1 | 6/2016 | Becker et al. |
| 2016/0223364 A1 | 8/2016 | Peters et al. |
| 2016/0242744 A1 | 8/2016 | Mihailescu et al. |
| 2016/0263767 A1 | 9/2016 | Williams |
| 2016/0274237 A1 | 9/2016 | Stutz |
| 2016/0282107 A1 | 9/2016 | Roland et al. |
| 2016/0282110 A1 | 9/2016 | Vagman et al. |
| 2016/0282179 A1 | 9/2016 | Nazemi et al. |
| 2016/0288331 A1 | 10/2016 | Sivich et al. |
| 2016/0313114 A1 | 10/2016 | Tohme et al. |
| 2016/0327383 A1 | 11/2016 | Becker et al. |
| 2016/0340873 A1 | 11/2016 | Eidenberger et al. |
| 2016/0341041 A1 | 11/2016 | Puura et al. |
| 2016/0349746 A1 | 12/2016 | Grau |
| 2016/0363436 A1 | 12/2016 | Clark et al. |
| 2016/0363659 A1 | 12/2016 | Mindell et al. |
| 2016/0363663 A1 | 12/2016 | Mindell et al. |
| 2016/0363664 A1 | 12/2016 | Mindell et al. |
| 2016/0364869 A1 | 12/2016 | Siercks et al. |
| 2016/0364874 A1 | 12/2016 | Tohme et al. |
| 2017/0066157 A1 | 3/2017 | Peters et al. |
| 2017/0067739 A1 | 3/2017 | Siercks et al. |
| 2017/0082436 A1 | 3/2017 | Siercks et al. |
| 2017/0091922 A1 | 3/2017 | Siercks et al. |
| 2017/0091923 A1 | 3/2017 | Siercks et al. |
| 2017/0108528 A1 | 4/2017 | Atlas et al. |
| 2017/0122736 A1 | 5/2017 | Dold et al. |
| 2017/0166399 A1 | 6/2017 | Stubbs |
| 2017/0173796 A1 | 6/2017 | Kim et al. |
| 2017/0176572 A1 | 6/2017 | Charvat et al. |
| 2017/0179570 A1 | 6/2017 | Charvat |
| 2017/0179603 A1 | 6/2017 | Charvat et al. |
| 2017/0227355 A1 | 8/2017 | Pettersson et al. |
| 2017/0236299 A1 | 8/2017 | Valkenburg et al. |
| 2017/0254102 A1 | 9/2017 | Peters et al. |
| 2017/0269203 A1 | 9/2017 | Trishaun |
| 2017/0307757 A1 | 10/2017 | Hinderling et al. |
| 2017/0314909 A1 | 11/2017 | Dang |
| 2017/0333137 A1 | 11/2017 | Roessler |
| 2017/0343336 A1 | 11/2017 | Lettau |
| 2018/0003493 A1 | 1/2018 | Bernhard et al. |
| 2018/0017384 A1 | 1/2018 | Siercks et al. |
| 2018/0023935 A1 | 1/2018 | Atwell et al. |
| 2018/0038684 A1 | 2/2018 | Fröhlich et al. |
| 2018/0046096 A1 | 2/2018 | Shibazaki |
| 2018/0052233 A1 | 2/2018 | Frank et al. |
| 2018/0108178 A1 | 4/2018 | Murugappan et al. |
| 2018/0121571 A1 | 5/2018 | Tiwari et al. |
| 2018/0149469 A1 | 5/2018 | Becker et al. |
| 2018/0156601 A1 | 6/2018 | Pontai |
| 2018/0170719 A1 | 6/2018 | Tasch et al. |
| 2018/0180416 A1 | 6/2018 | Edelman et al. |
| 2018/0202796 A1 | 7/2018 | Ziegenbein |
| 2018/0209156 A1 | 7/2018 | Pettersson |
| 2018/0239010 A1 | 8/2018 | Mindell et al. |
| 2018/0300433 A1 | 10/2018 | Maxam et al. |
| 2019/0026401 A1 | 1/2019 | Benjamin et al. |
| 2019/0032348 A1 | 1/2019 | Parkes |
| 2019/0184555 A1 | 6/2019 | Linnell et al. |
| 2019/0224846 A1 | 7/2019 | Pivac et al. |
| 2020/0173777 A1 | 6/2020 | Pivac et al. |
| 2020/0206923 A1 | 7/2020 | Pivac et al. |
| 2020/0206924 A1 | 7/2020 | Pivac et al. |
| 2020/0215688 A1 | 7/2020 | Pivac et al. |
| 2020/0215692 A1 | 7/2020 | Pivac et al. |
| 2020/0215693 A1 | 7/2020 | Pivac et al. |
| 2020/0324981 A1 | 10/2020 | Pivac et al. |
| 2021/0016437 A1 | 1/2021 | Pivac et al. |

(56) References Cited

U.S. PATENT DOCUMENTS

| | | | |
|---|---|---|---|
| 2021/0016438 A1 | 1/2021 | Pivac et al. | |
| 2021/0080582 A1 | 3/2021 | Pivac et al. | |
| 2021/0291362 A1 | 9/2021 | Pivac et al. | |

FOREIGN PATENT DOCUMENTS

| | | |
|---|---|---|
| CN | 2730976 Y | 10/2005 |
| CN | 2902981 Y | 5/2007 |
| CN | 2923903 Y | 7/2007 |
| CN | 101100903 A | 1/2008 |
| CN | 201184054 Y | 1/2009 |
| CN | 101360873 B | 2/2009 |
| CN | 101476883 A | 7/2009 |
| CN | 100557169 C | 11/2009 |
| CN | 101694130 A | 4/2010 |
| CN | 201972413 U | 9/2011 |
| CN | 102359282 A | 2/2012 |
| CN | 202248944 U | 5/2012 |
| CN | 202292752 U | 7/2012 |
| CN | 102995911 A | 3/2013 |
| CN | 202925913 U | 5/2013 |
| CN | 103363902 A | 10/2013 |
| CN | 103698769 A | 4/2014 |
| CN | 203701626 U | 7/2014 |
| CN | 104141391 B2 | 11/2014 |
| CN | 104153591 A | 11/2014 |
| CN | 104493810 A | 4/2015 |
| CN | 204295678 U | 4/2015 |
| CN | 104612411 A | 5/2015 |
| CN | 204311767 U | 5/2015 |
| CN | 103774859 B | 11/2015 |
| CN | 103753586 B | 12/2015 |
| CN | 105113373 A | 12/2015 |
| CN | 105178616 A | 12/2015 |
| CN | 105257008 B | 1/2016 |
| CN | 105544998 A | 5/2016 |
| CN | 104806028 B | 11/2016 |
| CN | 205668271 U | 11/2016 |
| CN | 205840368 U | 12/2016 |
| CN | 205990775 U | 3/2017 |
| CN | 206185879 U | 5/2017 |
| CN | 206189878 U | 5/2017 |
| CN | 105089274 B | 6/2017 |
| CN | 105064699 B | 7/2017 |
| CN | 107217859 A | 9/2017 |
| CN | 107237483 A | 10/2017 |
| CN | 107357294 A | 11/2017 |
| CN | 107605167 A | 1/2018 |
| CN | 206844687 U | 1/2018 |
| CN | 107654077 A | 2/2018 |
| CN | 107675891 A | 2/2018 |
| CN | 107740591 A | 2/2018 |
| CN | 106088632 B | 3/2018 |
| CN | 107762165 A | 3/2018 |
| CN | 207063553 U | 3/2018 |
| CN | 106088631 B | 5/2018 |
| CN | 107975245 A | 5/2018 |
| CN | 108061551 A | 5/2018 |
| CN | 108222527 A | 6/2018 |
| CN | 108301628 A | 7/2018 |
| CN | 108331362 A | 7/2018 |
| CN | 106150109 B | 8/2018 |
| CN | 108457479 A | 8/2018 |
| CN | 108708560 A | 10/2018 |
| CN | 208023979 U | 10/2018 |
| CN | 106881711 A | 4/2019 |
| CN | 107083845 A | 6/2019 |
| CN | 108016585 B | 7/2019 |
| DE | 3430915 C2 | 3/1986 |
| DE | 4038260 C2 | 6/1991 |
| DE | 4207384 A1 | 9/1993 |
| DE | 19509809 A1 | 10/1995 |
| DE | 4417928 A1 | 11/1995 |
| DE | 29601535 U1 | 5/1997 |
| DE | 19600006 A1 * | 7/1997 ............. E04G 21/22 |
| DE | 19600006 A1 | 7/1997 |
| DE | 19603234 C2 | 9/1997 |
| DE | 19743717 C2 | 4/1999 |
| DE | 19849720 A1 | 5/2000 |
| DE | 10230021 C1 | 7/2003 |
| DE | 102006030130 B3 | 9/2007 |
| DE | 102009018070 A1 | 10/2010 |
| DE | 102009042014 A1 | 3/2011 |
| DE | 202012100646 U1 | 6/2013 |
| DE | 102013019869 A1 | 5/2015 |
| EP | 190076 A1 | 8/1986 |
| EP | 370682 A2 | 5/1990 |
| EP | 456020 A1 | 1/1995 |
| EP | 493020 B1 | 4/1995 |
| EP | 495525 B1 | 4/1995 |
| EP | 836664 B1 | 1/1999 |
| EP | 674069 B1 | 12/1999 |
| EP | 1918478 A2 | 5/2008 |
| EP | 2112291 A1 | 10/2009 |
| EP | 2219528 A1 | 8/2010 |
| EP | 2249997 A1 | 11/2010 |
| EP | 2353801 A2 | 8/2011 |
| EP | 2199719 B1 | 10/2014 |
| EP | 3084719 A1 | 10/2016 |
| ES | 2296556 A1 | 4/2008 |
| FR | 2230825 A1 | 12/1974 |
| FR | 2524522 A1 | 10/1983 |
| GB | 119331 A | 10/1918 |
| GB | 2198105 A | 5/1923 |
| GB | 673472 A | 6/1952 |
| GB | 682010 A | 11/1952 |
| GB | 839253 A | 6/1960 |
| GB | 1067604 A | 5/1967 |
| GB | 1465068 A | 2/1977 |
| GB | 125079 | 12/2001 |
| GB | 2422400 A | 7/2006 |
| JP | 64006719 A | 1/1989 |
| JP | H07101509 A | 11/1999 |
| JP | 2005283600 A | 10/2005 |
| JP | 4294990 B2 | 4/2009 |
| JP | 2009521630 A | 6/2009 |
| JP | 5508895 B2 | 3/2014 |
| LU | 87054 A1 | 6/1989 |
| LU | 87381 A1 | 6/1990 |
| LU | 88144 A1 | 4/1994 |
| RU | 85392 U1 | 8/2009 |
| WO | 9702397 A1 | 1/1997 |
| WO | 2001076830 A1 | 10/2001 |
| WO | 2004020760 A1 | 3/2004 |
| WO | 2004083540 A3 | 2/2005 |
| WO | 2005014240 A1 | 2/2005 |
| WO | 2005017550 A2 | 2/2005 |
| WO | 2005070657 A1 | 8/2005 |
| WO | 2004011734 A1 | 11/2005 |
| WO | 2006111827 A1 | 10/2006 |
| WO | 2007076581 A1 | 7/2007 |
| WO | 2008124713 A2 | 10/2008 |
| WO | 2009026641 A1 | 3/2009 |
| WO | 2009026642 A1 | 3/2009 |
| WO | 2010020457 A1 | 2/2010 |
| WO | 2011077006 A2 | 6/2011 |
| WO | 2013088154 A1 | 6/2013 |
| WO | 2013134559 A1 | 9/2013 |
| WO | 2018009978 A1 | 1/2018 |
| WO | 2018009980 A1 | 1/2018 |
| WO | 2018009981 A1 | 1/2018 |
| WO | 2018009985 A1 | 1/2018 |
| WO | 2018009986 A1 | 1/2018 |
| WO | 2018052469 A3 | 4/2018 |
| WO | 201899323 A1 | 6/2018 |
| WO | 2019006511 A1 | 1/2019 |
| WO | 2019014701 A1 | 1/2019 |
| WO | 2019014702 A1 | 1/2019 |
| WO | 2019014705 A1 | 1/2019 |
| WO | 2019014706 A1 | 1/2019 |
| WO | 2019014707 A1 | 1/2019 |
| WO | 2019033165 A1 | 2/2019 |
| WO | 2019033166 A1 | 2/2019 |

(56) References Cited

FOREIGN PATENT DOCUMENTS

| WO | 2019033170 A1 | 2/2019 |
|---|---|---|
| WO | 2019068128 A1 | 4/2019 |
| WO | 2019071313 A1 | 4/2019 |

OTHER PUBLICATIONS

Gentry, Russell, and Collins, Jeffrey (Eds.), BIM for Masonry—Modeling Masonry Buildings in Autodesk Revit, The Masonry Society, available at https://masoncontractors.org/pdf/bim-for-masonry-modeling-buildings-in-autodesk-revit.pdf (Feb. 2016).*
Delgado, R. et al.: "Development and Control of an Omnidirectional Mobile Robot on an EtherCAT Network", International Journal of Applied Engineering Research, vol. 11, No. 21, 2016, pp. 10586-10592, XP055574484.
Dorfler, K. et al.: "Mobile Robotic Brickwork, Automation of a Discrete Robotic Fabrication Process Using an Autonomous Mobile Robot Robotic Fabrication in Architecture", Art and Design 2016, Feb. 4, 2016 (Feb. 4, 2016), pp. 204-217, XP055567451.
Egerstedt, M. et al.: "Control of Mobile Platforms using a Virtual Vehicle Approach", IEEE Transactions on Automatic Control, vol. 46, No. 11, Nov. 2001 (Nov. 1, 2001), XP055567515.
Fastbrick Robotics, Fastbrick Robotics: Hadrian 105 First Look Revealed, Nov. 16, 2015 (Nov. 16, 2015), XP054978174, Retrieved from the Internet <URL:https://www.youtube.com/watch?v=7Zw7qHxMtrY> [retrieved on Nov. 16, 2015].
Fastbrick Robotics: Hadrian 105 Demonstrative Model Animation, Jun. 29, 2015 (Jun. 29, 2015), XP054979424, Retrieved from the Internet <URL:https://www.youtube.com/watch?v=Rebqcsb61gY> [retrieved on Mar. 7, 2018].
Fastbrick Robotics: Hadrian 105 Time Lapse, Fastbrick Robotics Time Lapse, May 22, 2016 (May 22, 2016), XP054978173, Retrieved from the Internet <URL:https://www.youtube.com/watch?v=4YcrO8ONcfY> [retrieved on May 22, 2016].
Feng, C. et al.: "Vision Guided Autonomous Robotic Assembly and as-built Scanning on Unstructured Construction Sites", Automation in Construction, vol. 59, Nov. 2015 (Nov. 1, 2015), pp. 128-138, XP055567454.
Gao, X. et al.: "Complete Solution Classification for the Perspective-Three-Point Problem", IEEE Transactions on Pattern Analysis and Machine Intelligence, vol. 25, No. 8, Aug. 2003 (Aug. 1, 2003), pp. 930-943, XP011099374.
Giftthaler, M. et al., "Efficient Kinematic Planning for Mobile Manipulators with Non-holonomic Constraints Using Optimal Control", 2017 IEEE International Conference on Robotics and Automation (ICRA), Singapore, May 29-Jun. 3, 2017.
Heintze, H., "Design and Control of a Hydraulically Actuated Industrial Brick Laying Robot," 264 pages.
Heintze, J. et al., "Controlled hydraulics for a direct drive brick laying robot," Automation in Construction 5 (1996), pp. 23-29.
Helm, V. et al.: "Mobile Robotic Fabrication on Construction Sites: dimRob", IEEE /RSJ International Conference on Intelligent Robots and Systems, Oct. 7, 2012 (Oct. 7, 2012), Vilamoura, Portugal, pp. 4335-4341, XP032287463.
http://www.new-technologies.org/ECT/Other/brickrob.htm. "Emerging Construction Technologies." Dec. 1, 2006.
Huang, S. et al., "Applying High-Speed Vision Sensing to an Industrial Robot for High-Performance Position Regulation under Uncertainties," Sensors, 2016, 16, 1195, 15 pages.
International Preliminary Report on Patentability for International Application No. PCT/AU2017/050739; dated Jan. 15, 2019; 6 pages.
International Preliminary Report on Patentability for International Application No. PCT/AU2017/050731; dated Jan. 15, 2019; 5 pages.
International Search Report and Written Opinion for International Application No. PCT/AU2017/050730; dated Aug. 23, 2017; 17 pages.
International Search Report and Written Opinion for International Application No. PCT/AU2017/050731; dated Aug. 31, 2017; 8 pages.
International Search Report and Written Opinion for International Application No. PCT/AU2017/050738; dated Oct. 17, 2017; 19 pages.
International Search Report and Written Opinion for International Application No. PCT/AU2017/050739; dated Sep. 28, 2017; 9 pages.
Kazemi, M. et al.: "Path Planning for Image-based Control of Wheeled Mobile Manipulators", 2012 IEEE /RSJ International Conference on Intelligent Robots and Systems, Oct. 7, 2012 (Oct. 7, 2012), Vilamoura, Portugal, XP055567470.
Kleinkes, M. et al.: "Laser Tracker and 6DoF measurement strategies in industrial robot applications", CMSC 2011: Coordinate Metrology System Conference, Jul. 25, 2011 (Jul. 25, 2011), XP055456272.
Koren et al.: "End-effector guidance of robot arms", CIRP Annals-Manufacturing Technology, vol. 36, No. 1, 1987, pp. 289-292, XP055456270.
Kwon, S. et al., "On the Coarse/Fine Dual-Stage Manipulators with Robust Perturbation Compensator," IEEE, May 21-26, 2001, pp. 121-126.
Kyle in CMSC: Charlotte-Concord, Jul. 21-25, 2008.
Lippiello, V. et al.: "Position-Based Visual Servoing in Industrial Multirobot Cells Using a Hybrid Camera Configuration", IEEE Transactions on Robotics, vol. 23, No. 1, Feb. 2007 (Feb. 1, 2007), XP011163518.
Liu, Z. et al.: "EtherCAT Based Robot Modular Joint Controller", Proceeding of the 2015 IEEE International Conference on Information and Automation, Aug. 2015 (Aug. 1, 2015), Lijiang, China, pp. 1708-1713, XP033222650.
Notice of Acceptance of Patent Application received for priority Australian Patent Application No. 2017294796, dated May 15, 2019 (158 pages).
Pless, R .: "Using Many Cameras as One", IEEE Computer Society Conference on Computer Vision and Pattern Recognition, Jun. 18, 2003 (Jun. 18, 2003), Madison , WI, USA, pp. 1-7, XP055564465.
Posada et al.: "High accurate robotic drilling with external sensor and compliance model-based compensation", Robotics and Automation (ICRA), 2016 IEEE International Conference, May 16, 2016 (May 16, 2016), pp. 3901-3907, XP032908649.
Pritschow, G. et al., "A Mobile Robot for On-Site Construction of Masonry," Inst. of Control Tech. for Machine Tools and Manuf. Units, pp. 1701-1707.
Pritschow, G. et al., "Application Specific Realisation of a Mobile Robot for On-Site Construction of Masonry," Automation and Robotics in Construction XI, 1994, pp. 95-102.
Pritschow, G. et al., "Configurable Control System of a Mobile Robot for ON-Site Construction of Masonry," Inst. of Control Technology for Machine Tools and Manuf. Units, pp. 85-92.
Pritschow, G. et al., "Technological aspects in the development of a mobile bricklaying robot," Automation in Construction 5 (1996), pp. 3-13.
Riegl Laser Measurement Systems. "Long Range & High Accuracy 3D Terrestrial Laser Scanner System—LMS-Z420i." pp. 1-4.
Salcudean, S. et al., "On the Control of Redundant Coarse-Fine Manipulators," IEEE, pp. 1834-1840.
Sandy, T. et al.: "Autonomous Repositioning and Localization of an In Situ Fabricator", 2016 IEEE International Conference on Robotics and Automation (ICRA), May 16, 2016 (May 16, 2016), pp. 2852-2858, XP055567467.
Skibniewski, M.J., "Current Status of Construction Automation and Robotics in the United States of America," The 9th International Symposium on Automation and Robotics in Construction, Jun. 3-5, 1992, 8 pages.
Trimble ATS. "Advanced Tracking Sensor (ATS) with target recognition capability for stakeless machine control survey applications." pp. 1-4.
Vincze, M. et al., "A Laser Tracking System to Measure Position and Orientation of Robot End Effectors Under Motion," The International Journal of Robotics Research, vol. 13, No. 4, Aug. 1994, pp. 305-314.

(56) References Cited

OTHER PUBLICATIONS

Warszawski, A. et al., "Implementation of Robotics in Building: Current Status and Future Prospects," Journal of Construction Engineering and Management, Jan./Feb. 1998, 124(1), pp. 31-41.
Willmann, J. et al.: "Robotic Timber Construction—Expanding Additive Fabrication to New Dimensions", Automation in Construction, vol. 61, 2016, pp. 16-23, XP029310896.
Xu, H. et al.: "Uncalibrated Visual Servoing of Mobile Manipulators with an Eye-to-hand Camera", Proceedings of the 2016 IEEE International Conference on Robotics and Biomimetics, Dec. 3, 2016 (Dec. 3, 2016), Qingdao, China, pp. 2145-2150, XP033071767.
Yu, S.N. et al., "Feasibility verification of brick-laying robot using manipulation trajectory and the laying pattern optimization," Dept. of Mech. Eng., Automation in Construction (2009), pp. 644-655.
International Preliminary Report on Patentability for International Application No. PCT/AU2017/050738; dated Jan. 15, 2019; 13 pages.
Latteur, et al., "Drone-Based Additive Manufacturing of Architectural Structures," IASS Symposium 2015, Amsterdam, The Netherlands; Aug. 17-20, 2015; 12 pages.
International Preliminary Report on Patentability for International Application No. PCT/AU2018/050733; dated Jan. 21, 2020; 6 pages.
International Preliminary Report on Patentability for International Application No. PCT/AU2018/050734; dated Jan. 21, 2020; 9 pages.
International Preliminary Report on Patentability for International Application No. PCT/AU2018/050737; dated Jan. 21, 2020; 6 pages.
International Preliminary Report on Patentability for International Application No. PCT/AU2018/050739; dated Jan. 21, 2020; 6 pages.
International Preliminary Report on Patentability for International Application No. PCT/AU2018/050740; dated Jan. 21, 2020; 6 pages.
Partial Supplementary European Search Report dated Apr. 14, 2020 in European Patent Application No. 17826696.1, 10 pages.
Zaki, T., "Parametric modeling of Blackwall assemblies for automated generation of shop drawings and detailed estimates using BIM", Master's Thesis, May 23, 2016, pp. 1-151.
Boston Dynamics: "Introducing Spot (previously SpotMini)", Jun. 28, 2016, YouTube video, 1 page (screenshot of video); video retrieved at <https://www.youtube.com/watch?v=tf7IEVTDjng>.
Examination Report dated Apr. 18, 2021 in GCC Patent Application No. 2018-35644, 5 pages.
Examination Report dated Apr. 30, 2021 in GCC Patent Application No. 2018-35643, 3 pages.
Examination Report dated Jun. 29, 2021 for India Patent Application No. 201927004006, 6 pages.
Examination Report dated Sep. 30, 2021 for Australian Patent Application No. 2017295316, 3 pages.
Extended European Search Report dated Jun. 4, 2021 for European Patent Application No. 18865644.1, 7 pages.
Extended European Search Report dated Mar. 16, 2021 for European Patent Application No. 18834565.6, 19 pages.
Extended European Search Report dated Mar. 17, 2021 for European Patent Application No. 18835861.8, 12 pages.
Extended European Search Report dated Mar. 18, 2021 for European Patent Application No. 18834673.8, 14 pages.
Extended European Search Report dated Mar. 18, 2021 for European Patent Application No. 18834893.2, 12 pages.
Extended European Search Report dated Mar. 18, 2021 for European Patent Application No. 18835737.0, 10 pages.
Extended European Search Report dated Mar. 30, 2021 for European Patent Application No. 18845794.9, 13 pages.
Extended European Search Report dated Mar. 5, 2021 for European Patent Application No. 18828425.1, 7 pages.
Fastbrick Robotics: Hadrian X Digital Construction System, published on Sep. 21, 2016 <URL: https://www.youtube.com/watch?v=5bW1vuCgEaA >.
Gander H et al: "Application of a floating point digital signal processor to a dynamic robot measurement system", Instrumentation and Measurement Technology Conference, 1994. IMTC/94. Conference Proceedings. 10$^{th}$ Anniversary. Advanced Technologies in I & M., 1994 IEEE Hamamatsu, Japan May 10-12, 1994, New York, NY, USA, IEEE, May 10, 1994 (May 10, 1994), pp. 372-375, XP010121924, DOI: 10.1109/IMTC.1994.352046, ISBN: 978-0-7803-1880-9, *whole document*.
Garrido, S. et al., "FM2: A real-time fast marching sensor based motion planner", Advanced Intelligent Mechatronics, 2007 IEEE/ASME International Conference on, IEEE, PI, Sep. 1, 2007 (Sep. 1, 2007), pp. 1-6.
International Search Report and Written Opinion for International Patent Application No. PCT/AU19/50742; dated Sep. 23, 2019; 5 pages.
International Search Report and Written Opinion for International Patent Application No. PCT/AU19/50743; dated Oct. 1, 2019; 10 pages.
International Search Report and Written Opinion for International Patent Application No. PCT/AU20/50367; dated Jun. 29, 2020; 15 pages.
International Search Report and Written Opinion for International Patent Application No. PCT/AU20/50368; dated Jun. 25, 2020; 11 pages.
Kleinigger, M. et al: "Application of 6-DOF sensing for robotic disturbance compensation", Automation Science and Engineering (CASE), 2010 IEEE Conference on, IEEE, Piscataway, NJ, USA, Aug. 21, 2010 (Aug. 21, 2010, pp. 344-349, XP031762876, ISBN: 978-1-4244-5477-1, *abstract*, *sections 1 to 3*.
Mercedes-Benz: "Mercedes-Benz "Chicken" Magic Body Control TV commercial", YouTube, Sep. 23, 2013, 1 page. Retrieved from the internet: <https://www.youtube.com/watch?v+nLwML2PagbY>.
Office Action dated Apr. 21, 2021 in Japanese Patent Application No. 2019-523148, 4 pages.
Office Action dated Aug. 20, 2021 for Japanese Patent Application No. 2019-523147, 3 pages.
Office Action dated Jul. 5, 2021 for Japanese Patent Application No. 2019-523145, 4 pages.
Office Action dated May 24, 2021 for Chinese Patent Application No. 201880067520.0, 8 pages.
Office Action dated Sep. 3, 2021 for Chinese Patent Application No. 201780056460.8, 9 pages.
Siciliano, B. et al., "Robotics—chapters 2-4" Robotics, Dec. 31, 2009 (Dec. 31, 2009), Springer London, London, pp. 39-189.
Examination report dated Mar. 16, 2022 on European Patent Application No. 17826696.1, 5 pages.
Examination report dated Dec. 9, 2021 on Indian Patent Application No. 201927003927, 7 pages.
International Preliminary Report on Patentability for International Application No. PCT/AU20/50368, dated Sep. 28, 2021, 7 pages.
Examination report dated Apr. 19, 2022 on Australian Patent Application No. 2017295316, 4 pages.
Examination report dated Dec. 2, 2022 on Chinese Patent Application No. 201780056867.0, 13 pages.
Examination report dated Dec. 15, 2022 on Saudi Arabian Patent Application No. 519400901, 14 pages.
Examination report dated Feb. 28, 2023 on Brazilian Patent Application No. 112019000730.0, 11 pages.
European Search Report dated Nov. 23, 2022 on European Patent Application No. 20790665.2, 10 pages.
European Search Report dated Nov. 23, 2022 on European Patent Application No. 207919176, 12 pages.

* cited by examiner

| | | | |
|---|---|---|---|
| 1 | External Wall Library File | Text | BRICKS\BR000004\BR000004-001.SLDPRT |
| 2 | External Wall Brick Depth | Text | 250 |
| 3 | External Wall Brick Length | Text | 500 |
| 4 | External Wall Brick Height | Text | 258 |
| 5 | External Wall Vertical Brick Gap | Text | 0 |
| 6 | External Wall Horizontal Brick Gap | Text | 0 |
| 7 | External Inside Top Wall Library File | Text | BRICKS\BR000007\BR000007-001.SLDPRT |
| 8 | External Inside Top Wall Brick Depth | Text | 125 |
| 9 | External Inside Top Wall Brick Length | Text | 500 |
| 10 | External Inside Top Wall Brick Height | Text | 258 |
| 11 | External Inside Top Wall Vertical Brick Gap | Text | 0 |
| 12 | External Inside Top Wall Horizontal Brick Gap | Text | 0 |
| 13 | Internal Wall Library File | Text | BRICKS\BR000006\BR000006-001.SLDPRT |
| 14 | Internal Wall Brick Depth | Text | 125 |
| 15 | Internal Wall Brick Length | Text | 500 |
| 16 | Internal Wall Brick Height | Text | 258 |
| 17 | Internal Wall Vertical Brick Gap | Text | 0 |
| 18 | Internal Wall Horizontal Brick Gap | Text | 0 |
| 19 | Internal Wall Rebate | Text | 115 |
| 20 | 1st Floor Slab Type | Text | LevelSlab |

FIGURE 4

NORTH TO SOUTH
SOUTH TO NORTH

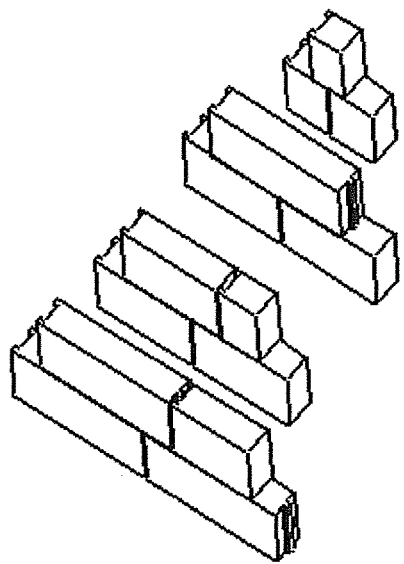
FIGURE 14
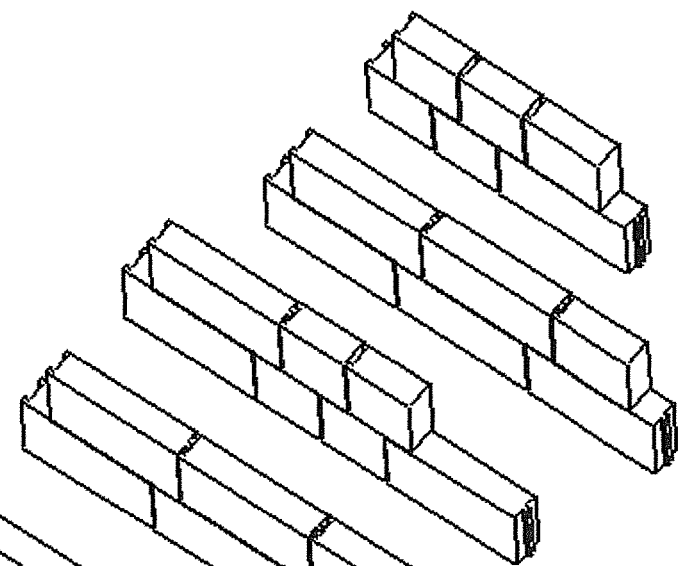
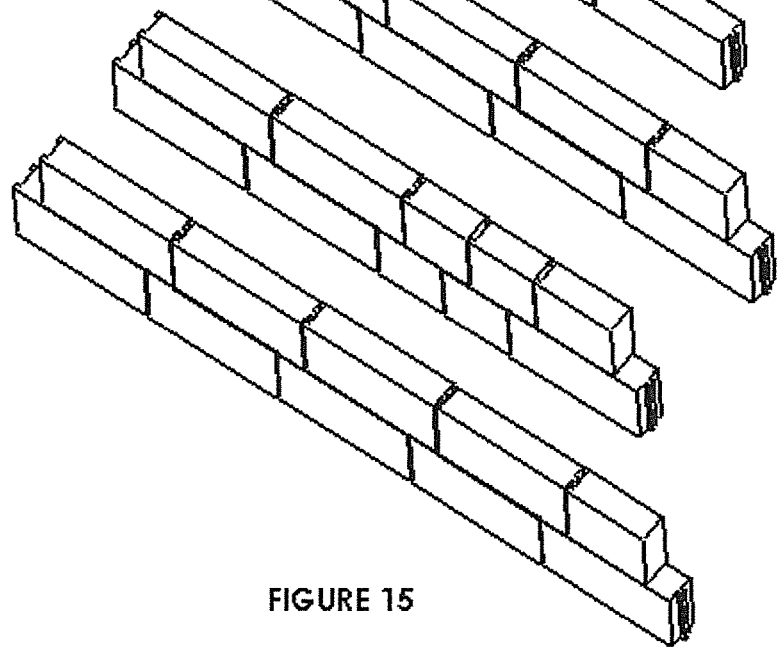
FIGURE 15

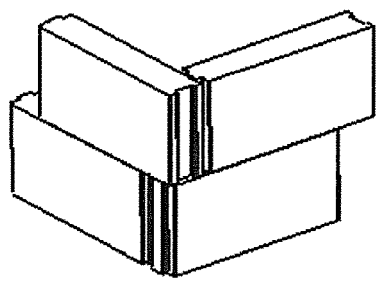
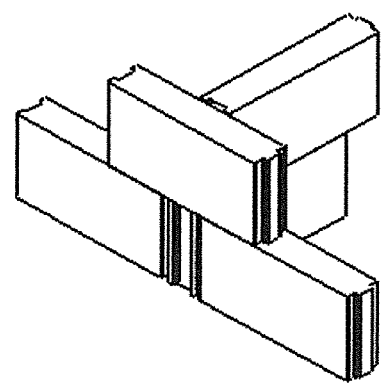
FIGURE 16  FIGURE 17
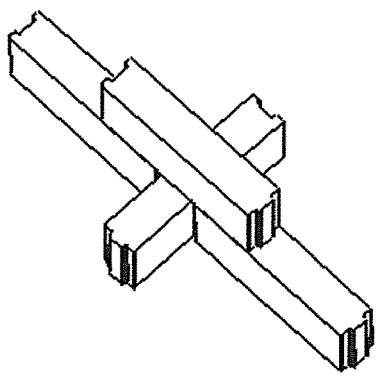
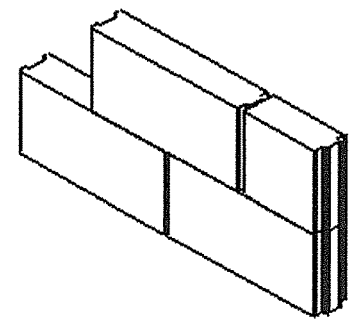
FIGURE 18  FIGURE 19
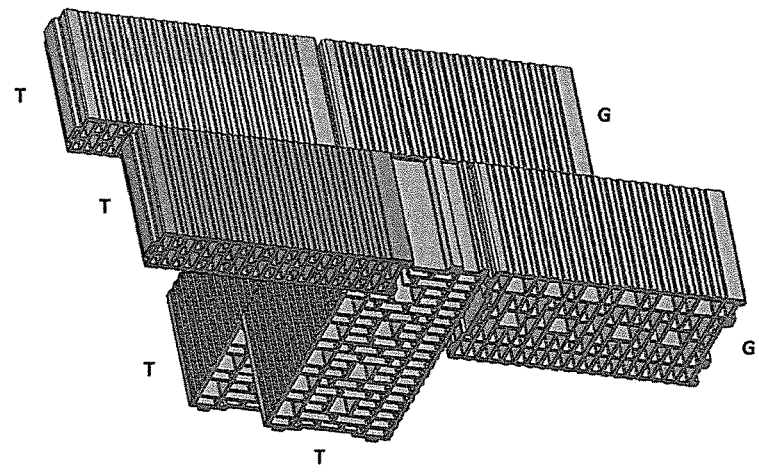
FIGURE 20

| drive | |
|---|---|
| ♦ IDX | INT |
| ○ DriveID | INT |
| ○ LogTime | TIMESTAMP |
| ○ TotalDist | BIGINT |
| ○ ExecutePosition | BOOL |
| ○ PositionSP | REAL |
| ○ Position | REAL |
| ○ PositionLag | REAL |
| ○ Velocity | REAL |
| ○ Acceleration | REAL |
| ○ Torque | REAL |

| drivereference | |
|---|---|
| ♦ IDX | INT |
| ○ DriveID | INT |
| ○ LogTime | TIMESTAMP |
| ○ TotalDist | BIGINT |
| ○ ExecutePosition | BOOL |
| ○ PositionSP | REAL |
| ○ Position | REAL |
| ○ PositionLag | REAL |
| ○ Velocity | REAL |
| ○ Acceleration | REAL |
| ○ Torque | REAL |
| ○ ExecutePositionRef | BOOL |
| ○ PositionRefSP | REAL |
| ○ PositionRef | REAL |
| ○ VelocityRef | REAL |
| ○ AccelerationRef | REAL |

| drivereference | |
|---|---|
| ♦ IDX | INT |
| ○ DriveID | INT |
| ○ LogTime | TIMESTAMP |
| ○ TotalDist | BIGINT |
| ○ ExecutePosition | BOOL |
| ○ PositionSP | REAL |
| ○ Position | REAL |
| ○ PositionLag | REAL |
| ○ Velocity | REAL |
| ○ Acceleration | REAL |
| ○ Torque | REAL |
| ○ ExecutePositionRef | BOOL |
| ○ PositionRefSP | REAL |
| ○ PositionRef | REAL |
| ○ VelocityRef | REAL |
| ○ AccelerationRef | REAL |
| ○ ClampTotalDistance | BIGINT |
| ○ OperationState | INT |

FIGURE 29F

COMPUTER AIDED DESIGN FOR BRICK AND BLOCK CONSTRUCTIONS AND CONTROL SOFTWARE TO CONTROL A MACHINE TO CONSTRUCT A BUILDING

TECHNICAL FIELD

This invention relates to the construction industry, and in particular to the design of buildings of brick and block construction. This invention provides a computer software solution for designing buildings, and subsequently executing their construction from data compiled by the software.

Throughout the specification unless the context requires otherwise, the word "comprise" or variations such as "comprises" or "comprising", will be understood to imply the inclusion of a stated integer or group of integers but not the exclusion of any other integer or group of integers.

In this specification the word "brick" is intended to encompass any building element such as a brick or block, to be placed during the construction of a building or wall or the like. Block can encompass prefabricated beams that can form lintels to be incorporated into brick work.

SUMMARY OF INVENTION

In accordance with the invention there is provided computer aided design software for designing a brick construction, said computer aided design software having a user interface allowing a user to input building plan data, said computer aided design software generating from said building plan data, data representative of a scale top-plan view of walls with predetermined known wall length dimensions, said computer aided design software generating a virtual extrusion of length commensurate with the wall height;

said computer aided design software determining brick by brick placement data for said walls, including the identification of the position and orientation in three dimensions of each brick relative to a point of origin, including determining brick stepping and brick nesting at wall intersections, and having regard to a predetermined minimum cut brick length—determination of cut length data for individual bricks to be cut to length in order to meet the required dimensions of wall length;

said computer aided design software compiling a brick placement database including brick type, position and orientation in three dimensions of each brick relative to said point of origin, and cut length data for each brick identified as to be cut to length.

Preferably said computer aided design software has a first table containing one or more user selectable settings allowing stock brick type and size parameters to be stored and selected for walls. This may include stock brick type and size parameters for external walls and internal walls, where these differ.

Preferably said building plan data is representative of a scale top-plan view of external walls and any internal walls.

Preferably said computer aided design software generates footing data and/or concrete pad data including the dimensions, position and orientation of the footings and/or concrete pad relative to a point of origin, relative height off-set between the bottom of the external walls and optionally the bottom of the internal walls and between different sections of internal walls and optionally determines the required volume of concrete to form the pad.

Preferably said computer aided design software allows user input of and storing positioning data for voids and/or apertures in said extrusion, said voids and/or apertures being of dimensions commensurate with the height and width of doors and windows to be fitted in the completed building. The step of determination of cut length data for individual bricks to be cut to length in order to meet the required dimensions of wall length will include and wall segment length adjacent to voids and apertures. The cut length data for each brick identified as to be cut to length is stored in said brick placement database.

Preferably said computer aided design software allows user input of and storing services positioning data for at least one of plumbing, electrical and ICT (Information and Communication Technology) and sound and vision cabling and connection points in said external walls and in said internal walls; said computer aided design software generating positioning data for channels in said walls to carry services and recesses in said walls for said connection points, said computer aided design software generating machining data for the location of recesses and cavities to be machined in individual bricks according to the positioning data of said channels and recesses; and storing said machining data in said brick placement database.

It should be noted that the wall height may change around the building to allow for sloping roofs and ceilings and/or changes in floor level or ceiling height, so the wall height of internal walls and external walls need not be uniform.

Preferably said computer aided design software determines the order that each brick is to be laid, and creates in said brick placement database, an index number allocated to each brick, to identify the brick laying order. This order will start at the first course on the footings and/or pad, and then work upwards, course by course.

All user input may be via a graphical user interface.

The position and orientation data for each brick includes in its simplest form, x and y horizontal dimensions relative to said point of origin, with reference to a position in or on each brick, z vertical dimension, and Ø angle relative to magnetic north or other direction. The point of origin may be a position on the building site outside, in, or within the periphery of the pad. Other orientation data may include pitch angle and roll angle where the brick is to be laid in an orientation other than flat. The reference position on each brick is preferably the centroid or centre of the horizontal area of each brick, trimmed or whole, but for simplicity not taking into account routed cut-outs or recesses.

Most preferably the reference position on each brick is the centroid of all dimensions of each brick, trimmed or whole, but for simplicity not taking into account routed cut-outs or recesses. Where bricks are cut to length (shortened), clearly the centroid position will change.

The relative height off-set between the bottom of the external walls and the bottom of the internal walls may be reflected in different z values for the first course of bricks of the external course and the internal course. The difference in z values for the first course of bricks of the external course and the internal course arises from the type of damp course construction which determines the footings and/or concrete pad configuration.

The computer aided design software may take into account and allow for different spacings between adjacent bricks and thicknesses of adhesive or mortar between adjacent bricks. Where this occurs values for adjacent brick spacing A and brick base spacing B are stored in the brick placement database. The spacings may be global settings, or individual settings stored with each brick. In this manner, the required volumes of adhesive or mortar may be dispensed on the underside of the brick to provide the required brick spacing B and dispensed on the side or end of the brick to provide the required adjacent brick spacing A. Typical global settings for an A value can be up to 10 mm but typically might be 6 mm, and for a B value might be 0 mm. Where construction adhesive is used, the B value is zero, since the construction adhesive will be compressed as the brick is placed. Each brick except for the very first to be laid in a course will have accounted for, an A value and A-location data identifying where on the brick adhesive is to be applied to give effect to the A value.

With the method of the invention, each brick is allocated attributes pertaining to position in space (at least x, y, z and Ø values) and whether it is in original form or cut or otherwise machined, and if cut or machined, mathematical expressions defining the location of the volume of material to be excised from the brick with reference to said position on said brick.

If the brick is to be cut or routed, the design software exports a 3D model (typically a 3D DXF file, but could be and IGES or STL or other 3D file) of the brick which is then later used by a quality control system (QC system) which compares the 3D model to a 3D scan of the brick. The file name for the 3D model can be referenced in the brick placement database. In the control software to control a brick laying machine, a 3D scan of the machined brick can be made, either at the point where it is machined, or later immediately prior to it being laid, or both. A go/no go decision can be later made by the QC system in the control software, based on a percentage difference. This makes sure that the brick has been processed as required and hasn't had one or more pieces break off during machining (routing or cutting).

For cut or routed bricks the design software exports the coordinates of the cut or rout. Another routine of software takes those coordinates and processing type and creates G code data to program the router or saw for that particular cut. The G code data is associated in the brick placement table data for the brick, as a G code data field in the brick placement database.

Where there is a difference in mortar or adhesive thickness, each brick may also be allocated a B value, and most bricks have one A value and A-location data, with a very few bricks having two A values and A-location data for each A value.

Preferably the design software brick placement database includes at least one trim data field to store a trim value or a trim value array for each brick.

This trim data field may store values representative of the height of the surface for at least one location for each brick at which each brick is to be located according to said brick placement database. From this data the amount of material to be machined from the bottom of each brick can be determined. This trim data can be received from a scanner located at a surveying position, which measures the relative surface height of a surface extent where bricks are to be laid.

This data may be filled at the design stage, based on a separate scan of the surface where bricks are to be laid, and imported into the brick placement database for subsequent communication to the control software to control a brick laying machine to build a building or other structure of brick construction, according to the plan embodied in the brick placement database.

Alternatively, this data may be filled during the construction stage, based on a scan of the surface where bricks are to be laid by surveying equipment interfaced with the control software to control the brick laying machine, and the control software fills the trim data fields.

The trim data fields allow for the bedding surface that the brick will be placed on, to be scanned by surveying equipment, which may be operated independently or associated with an automated brick laying machine. The brick placement database may then include a directive variable that signals to the automated brick laying machine that the bedding area for the brick needs to be scanned and the brick may need to be trimmed to suit the bedding surface. The surveying equipment associated with the automated brick laying machine may then scan the bedding surface and determine the amount of material to be removed from the brick so that when the brick is laid, the top surface of the brick is at the correct Z height and is level. This may be, and is usually done for the first course of bricks whose bedding surface is the slab or footing which may be subject to manufacturing variation from the concrete pouring and finishing process. If it is known that the tolerance of the brick height (Z dimension) is large than it may be necessary to scan the bedding surface after a certain number of courses have been laid.

As an alternative to scanning the slab by the machine during or immediately prior to the brick laying process, optionally the bedding surface or slab data could be obtained from a previously acquired scan of the slab and imported to the design software. This is of particular use where a wall is to be built on a known prior surface which may have existing survey or scan data, such as an existing slab or footing or on civil works such as a wall on a bridge or a freeway road, such as a freeway sound wall. A trim surface, or trim value for each of the first course of bricks is then associated with each first course brick in a tabular file. The trim surface may optionally be defined as a trim value or a grid array of trim values or by a known CAD data exchange format such as STL or IGES, point cloud or as a toolpath file, for example a G code file which can be run by the automated brick laying machine (the router or the saw in the machine) to trim the brick.

As a consequence, an entire construction can be defined by brick type and attributes as a data set. The data set may be provided as an accessable database, or in in tabular form with setting out the brick data in the order that the bricks are laid. The data set may include by reference additional files such as trim surface files or G code files for machining operations.

Preferably said computer aided design software has a first library in which data pertaining to one or more building plans in the form of said data sets are stored.

Preferably said computer aided design software has a second library in which data pertaining to one or more pre-defined rooms are stored, said pre-defined rooms being selected from at least one kitchen, at least one bathroom, and optionally other rooms, each said at least one kitchen including allocated space for a sink, a cooking appliance, and a refrigerator, each said at least one bathroom including allocated space for at least one of a toilet, bidet, water closet, a bathtub, a shower and a hand basin or vanity, where using said GUI a said predefined room may be merged with said scale top-plan view.

Preferably said computer aided design software has a third library in which data pertaining to a plurality of doors and windows are stored, corresponding to data for stock items used in determining said positional data based on selected doors or windows.

Preferably said computer aided design software treats walls of a structure to be built as segments extending between intersections of brickwork, where each segment has a course segment extending between intersections of brickwork and window and door opening edges; where any said course segment has a length s, where:

$$s = n.(b+A) + r + A + p.e + p.A + q.f + q.A - A$$

where A is the A value or gap),
b is the stock brick length,
e and f are the end overlap at a brick wall intersection,
p may be 1 (indicating e is equal to the width of a brick at the intersecting wall, or zero (abutting),
q may be 1 (indicating f is equal to the width of a brick at the intersecting wall, or zero (abutting),
r is the remainder which may be zero or greater than or equal to 0.2 b, preferably 0.25 b, and if this is true, a single brick is cut to length r to complete the course segment;

and if r is less than 0.2 b, preferably 0.25 b, $$s = (n-1).(b+A) + 2r + 2A + p.e + p.A + q.f + q.A - A$$

where r is the length that two bricks are cut to, to locate within and complete a course segment having n-1 bricks.

In order to achieve the preferred stepping, preferably where a said course segment includes two bricks of length r, the immediately overlying course segment includes a single brick of length r balanced on the join between the two bricks of length r, with two bricks cut to length of c=(b+r)/2, located on either side thereof, with bricks of stock brick length b continuing away from at least one of said two bricks cut to length of c. The course segment length can be described by the following:

$$s = (n-2).(b+A) + r + A + 2(c+A) + p.e + p.A + q.f + q.A - A$$

Also in accordance with the invention, there is provided control software to control a brick laying machine to build a building or other structure of brick construction, said control software accessing a brick placement database compiled by computer aided design software as described above, said control software controlling said machine to cut and optionally to machine each said brick in accordance with data stored in said brick placement database, and controlling said machine to convey each said brick one by one, and apply adhesive and locate each said brick according to data stored in said brick placement database Also in accordance with the invention there is provided control software to control a brick laying machine to build a building or other structure of brick construction, said control software accessing a brick placement database including brick type, position and orientation in three dimensions of each brick relative to a point of origin, cut length data for each brick identified as to be cut to length, and machining data for each brick including a trim value or a trim value array for each brick being trim data derived from data received from a scanner located at a surveying position to measure the relative surface height of a surface extent where bricks are to be laid; said control software correcting for the difference in height of the surface extent for each brick, from the lowest point and the highest point for each course of bricks and determining from said trim data the amount to be machined from a horizontal face of each brick so that the top of each course of bricks is level when laid; said control software controlling said machine to cut and machine each said brick in accordance with data stored in said brick placement database, said control software controlling said machine to convey each said brick one by one, and apply adhesive and locate each said brick according to data stored in said brick placement database.

Also in accordance with the invention there is provided control software to control a brick laying machine to build a building or other structure of brick construction, said control software accessing a brick placement database including brick type, position and orientation in three dimensions of each brick relative to a point of origin, cut length data for each brick identified as to be cut to length, and machining data for each brick; said control software including a scanner interface to receive data from a scanner located at a surveying position to measure the relative surface height of a surface extent where bricks are to be laid, storing the height of the surface for at least one location for each brick at which each brick is to be located according to said brick placement database; said control software correcting for the difference in positioning of said surveying position and said point of origin and determining the difference in height of the surface for said at least one location for each brick, from the lowest point and the highest point for each course of bricks and storing the difference in said brick placement database as trim data in the form of a trim value or trim value array for each said brick corresponding with the amount to be machined from a horizontal face of each brick so that the top of each course of bricks is level when laid; said control software controlling said machine to cut and machine each said brick in accordance with data stored in said brick placement database, said control software controlling said machine to convey each said brick one by one, and apply adhesive and locate each said brick according to data stored in said brick placement database.

The surface extent where bricks are to be laid may comprise footings and/or a concrete pad on which a building is to be constructed of bricks, or the upper surface of a structure upon which a course of bricks is to be laid.

Preferably, unless the computer aided design software that compiled the brick placement database has done so, said control software determines the order that each brick is to be laid, and creates an index number allocated to each brick, to identify the brick laying order, and enters the index number into the brick placement database.

Preferably said control software includes a library of handling identifiers which each identify a unique handling device within said brick laying machine, and said control software produces a handling table identifying individual bricks and associating individual bricks with a particular handling device at a particular time, and updating said handling table as individual brick progress from handling device to handling device with the elapsing of time.

Handling devices can include programmable brick handling apparatus to convey bricks from a pack of bricks, to a brick laying gripper mounted to a brick laying and adhesive applying head. The programmable brick handling apparatus may include dehacking robotic handlers that unpack rows of individual bricks from a pallet, and a series of devices each with grippers that handle individual bricks between the dehacking robotic handlers and the brick laying gripper, optionally via at least one brick machining tool, as preprogrammed. Where the bricks are moved out along a boom, there may be a plurality of shuttles, each with a gripper, and individual bricks are passed between shuttles. All of these transfers between the programmable brick handling apparatus are logged in the handling table, so that the handling table provides a record of which brick is where and when.

Consequently, if for any reason the brick laying machine must be paused for any reason, it may be restarted, and the correct brick will be laid in the correct position.

Further, if for any reason a brick is damaged during a machining (cutting or routing) operation, it may be discarded at the machining tool, and the handling table can be updated by reallocating brick identification numbers to the bricks preceding the damaged brick in the supply chain.

Where damage to an individual brick is not determined until it reaches a position closer to the brick laying gripper, where any said brick already in transit along said handling devices includes no machining data in said brick placement database, said handling table can be updated by reallocating brick identification numbers to the bricks preceding the damaged brick in the supply chain.

However, where any said brick already in transit along said handling devices includes machining data in said brick placement database, due to the individual bricks being laid in order, it becomes necessary for the control software to run the brick laying machine in reverse, restacking the bricks and storing their restacked position until there are no bricks having associated said machining data in transit along said handling devices, whereupon a replacement brick can be picked from said pallet and processed according to said brick placement database. Thereafter, any restacked bricks are picked up in order, and operation continues as pre-programmed.

Preferably said control software calculates corrected x y z position and orientation data relative to said point of origin for each brick recorded in said brick placement database, based on the difference between the location of the point of origin and the surveying position, and records the corrected x y z position and orientation data relative to said surveying position, for use in controlling said brick laying machine.

Thus controlled by the control software, the brick laying machine may build the building or structure, course by course, until completed to the required height. The first course of each course of bricks may be machined to reduce their height as necessary, according to the data from the scan measuring the relative surface height of footings and/or a concrete pad, so the tops of the first course of laid bricks are level. Thereafter, successive courses should not need their height adjusted by machining, in order to keep each course level. If the brick height tolerance is large then the top of a course may be scanned and the bottoms of the bricks in the subsequent course of bricks may be trimmed so that the top of the course of bricks is level.

Preferably said trim data is measured and stored as a trim value array for multiple locations for each said brick, so that said machine may machine said brick to compensate for localised footing or pad height excesses. Where greater attention is paid to the levelness of the footings or pad it will be sufficient to measure and store the trim value for four, three, two, or even one location for each said brick. In the ideal situation the slab or footing is accurate enough such that the trim data for all bricks is zero and no machining is necessary, however, in practice, unless greater expense has been incurred when laying the slab or footing, there will be variation in the level of the slab or footing.

The brick placement database contains position and orientation data for each brick, including in its simplest form, x and y horizontal dimensions relative to said point of origin, with reference to a position in or on each brick, z vertical dimension, and Ø angle relative to magnetic north or other direction. The point of origin may be a point on the building site outside of the periphery of the pad, or within the periphery of the pad. Other orientation data may include pitch angle and roll angle where the brick is to be laid in an orientation other than flat. The reference position on each brick is preferably the centroid or centre of the horizontal area of each brick, trimmed or whole, but for simplicity not taking into account routed cut-outs or recesses. Most preferably the reference position on each brick is preferably the centroid of all dimensions of each brick, trimmed or whole, but for simplicity not taking into account routed cut-outs or recesses. Where bricks are cut to length (shortened) the centroid position will change.

The relative height off-set between the bottom of the external walls and the bottom of the internal walls may be reflected in different z values for the first course of bricks of the external course and the internal course. The difference in z values for the first course of bricks of the external course and the internal course arises from the type of damp course construction which determines the concrete pad configuration.

The trim data may be represented as an adjusted z value for each brick and may include multiple z values tied to separate x and y values for each brick, to provide complex machining data where the machining is to adjust for localised undulations in the footing or pad.

The control software may take into account and allow for different spacings between adjacent bricks and thicknesses of adhesive or mortar between adjacent bricks. Where this occurs, values for adjacent brick spacing A and brick base spacing B are stored with each brick in the brick placement database. The control software interfaces with the adhesive or mortar applicator in the machine, to control the applicator to dispense the required volumes of adhesive or mortar on the underside of the brick to provide the required brick spacing B and on the side or end of the brick to provide the required adjacent brick spacing A. Each brick except for the very first to be laid in a course will have an A value and A-location data identifying where on the brick adhesive is to be applied to give effect to the A value.

With the methodology of the invention, each brick is allocated attributes pertaining to position in space (at least x, y, z and Ø values) and whether it is in original form or cut or otherwise machined, and if cut or machined, mathematical expressions defining the location of the volume of material to be excised from the brick with reference to said position in or on said brick. Where there is a difference in mortar or adhesive thickness, each brick may also be allocated a B value, and most bricks have one A value and A-location data, with a very few bricks having two A values and A-location data for each A value.

As a consequence an entire construction can be defined by brick type and attributes as a data set. The data set may be provided in the form of an accessable database or in tabular form, setting out the brick data in the order that the bricks are laid.

It should be noted that where this description refers to a database, this function may be performed by one or more data tables and such tables may be formed by a plurality of tables that cross reference each other.

Also in accordance with the invention there is provided a method of building a structure from bricks, comprising steps of determining the size of brick to be utilised; creating a scale top-plan view of walls with predetermined known wall length dimensions; determining brick by brick placement data for said walls, including identification of the position and orientation in three dimensions of each brick identification of the position in three dimensions and orientation of individual bricks to be cut to length in order to meet the required dimensions of wall length, and determining the order that each brick is to be laid, and storing this data in a brick placement database; measuring the relative surface height of a surface extent where bricks are to be laid, recording the height of footings for at least one location at which each brick is to be located according to said brick placement data, determining the difference in height of the footings for at least said one location for each brick, from the lowest point to the highest point for at least the first course of bricks and storing the difference from the lowest point as trim data in the form of a trim value or trim value array for said at least one location for each said each brick corresponding with the amount to be machined from a horizontal face of each brick so that the top of at least the first course is leveled when laid, the trim data being stored with said brick placement data; cutting each said brick in accordance with said brick placement data, conveying each said brick one by one, and applying adhesive and locating each said brick according to said brick placement data.

Also in accordance with the invention there is provided a method of building a building or other structure, comprising steps of determining the size of brick to be utilised for external walls and the size of brick to be utilised for internal walls; creating a scale top-plan view of external walls and internal walls with predetermined known wall length dimensions, determining footing and/or concrete pad data including the dimensions of the footings and/or concrete pad, relative height off-set between the bottom of the external walls and the bottom of the internal walls and between different sections of internal walls and optionally determining the required volume of concrete to form the pad; planning the configuration of the walls from the footings and/or pad up to the tops of the walls including positional determination of voids of dimensions commensurate with the height and width of doors and windows to be fitted, and positioning data for channels and recesses (chasing) for services of plumbing, electrical and ICT and sound and vision cabling and connection points in said external walls and in said internal walls; determining brick by brick placement data for said external walls and said internal walls, including identification of the position and orientation in three dimensions of each brick relative to the footings and/or concrete pad, identification of the position in three dimensions of individual bricks to be cut to length in order to meet the required dimensions of wall length, void size and aperture size, and generating machining data for the position of recesses and cavities to be machined in individual bricks according to the positioning data of said channels and recesses, and determining the order that each brick is to be laid, and storing this data in a brick placement database; measuring the relative surface height of a surface extent where bricks are to be laid, recording the height of the footings and/or a concrete pad for at least one location at which each brick is to be located according to brick placement data as described above, determining the difference in height of the pad for at least said one location for each brick, from the lowest point to the highest point for at least the first course of bricks and storing the difference from the lowest point as trim data in the form of a trim value or trim value array for said at least one location for each said each brick corresponding with the amount to be machined from a horizontal face of each brick so that the top of at least the first course is level when laid, the trim data being stored with said brick placement data; cutting and machining each said brick in accordance with said brick placement data, conveying each said brick one by one, and applying adhesive and locating each said brick according to said brick placement data.

The surface extent where bricks are to be laid may be footings and/or a concrete pad on which a building is to be constructed of bricks or the upper surface of a structure on which bricks are to be laid.

The building or structure may be built course by course until completed to the required height. The first course of each course of bricks is machined to reduce their height as necessary, according to the data from a scan measuring the relative surface height of footings and/or a concrete pad so the tops of the first course are level. Thereafter, successive courses should not need their height adjusted by machining, in order to keep each course level, unless brick size tolerance is so poor that a rescan of the tops of completed courses is required during construction.

Preferably said trim data is measured and stored as a trim value array for multiple locations for each said brick, so that each said brick is machined to compensate for localised footing or pad height excesses. Where greater attention is paid to the levelness of the footings or pad it will be sufficient to measure and store the trim value for four, three, two, or even one location for each said brick.

The position and orientation data for each brick includes in its simplest form, x and y horizontal dimensions relative to a reference point, with reference to a position on each brick, z vertical dimension, and Ø angle relative to magnetic north or other direction. The reference point may be a point on the building site outside of the periphery of the pad, or within the periphery of the pad. Other orientation data may include pitch angle and roll angle where the brick is to be laid in an orientation other than flat. The reference position on each brick is most preferably the centroid or centre of the horizontal area of each brick, trimmed or whole, but for simplicity not taking into account routed cut-outs or recesses.

The relative height off-set between the bottom of the external walls and the bottom of the internal walls may be reflected in different z values for the first course of bricks of the external course and the internal course. The difference in z values for the first course of bricks of the external course and the internal course arises from the type of damp course construction which determines the concrete pad configuration.

The method may take into account and allow for different spacings between adjacent bricks and thicknesses of adhesive or mortar between adjacent bricks. Where this occurs values for adjacent brick spacing A and brick base spacing B are stored with each brick, so the required volumes of adhesive or mortar may be dispensed on the underside of the brick to provide the required brick spacing B and dispensed on the side or end of the brick to provide the required adjacent brick spacing A. Each brick except for the very first to be laid in a course will have an A value and A-location data identifying where on the brick adhesive is to be applied to give effect to the A value.

With the method of the invention, each brick is allocated attributes pertaining to position in space (at least x, y, z and Ø values) and whether it is in original form or cut or otherwise machined, and if cut or machined, mathematical expressions defining the location of the volume of material to be excised from the brick with reference to said position on said brick. Where there is a difference in mortar or adhesive thickness, each brick may also be allocated a B value, and most bricks have one A value and A-location data, with a very few bricks having two A values and A-location data for each A value.

As a consequence an entire construction can be defined by brick type and attributes as a data set. The data set may be provided in tabular form with setting out the brick data in the order that the bricks are laid. During construction the controller adds data to the data set (database). This added data includes the position of the brick in the machine and photo and scan data and offset data. For example as a brick moves from a stick clamp to another, the database is updated with the coded location of the brick in its updated current clamp. When the brick is QC scanned, the scan data is stored in a unique file and the file name is associated to the database. At various locations on the machine, computer vision photographs are taken of the brick to determine its position so that an offset can be applied to the clamp that will next handle the brick, so that the brick is grasped in the correct position. Each of these photographs is stored in a file and the file name is associated to the database. This is done so that if there is a problem, such as a brick being laid incorrectly, the history of the brick as it passed through the machine can be reviewed for the purpose of fault finding for machine maintenance, or to give feedback to brick manufacturers or transporters if the bricks are not of acceptable quality or have damage or defects. The stored data also becomes part of the Quality Assurance records for the build.

In the most preferred embodiment, the invention comprises three aspects, first a computer aided design software for designing a building or other structure of brick construction, where in addition to the usual three dimensional modelling and rendering typical of CAD software, tabular data describing the spatial location and orientation of each brick is provided, including information regarding which bricks are cut to length so as to be shortened, and where they are located along each course, and which bricks are machined, drilled or routed for services or other special fittings. This data is exported to a database which may be accessed by control software to control a brick laying machine.

The second aspect comprises control software to control a brick laying machine to build a building or other structure from bricks. The database may receive data from a scanner which measures the elevation of the footings and/or concrete pad that has been constructed according to the building plan and for each brick of the first course, to determine how much material must be machined off the bottom of each brick so that when the first course is laid, the tops of the bricks of the first course are at the same level. This machining data is stored for each brick with the tabular data produced by computer aided design software, so that the control software can control the brick laying machine to machine and cut each brick as per the stored data, and convey each brick to the stored position on the footing, pad or previously laid course of bricks, with application of adhesive prior to positioning of the brick.

The third aspect of the invention comprises the combined method of building a building or other structure of brick construction, including steps of design of the building, determination of location of bricks including milling and cutting to size of individual bricks, scanning the footings and/or pad for height variations, adjusting the milling data, and then carrying out predetermined milling and cutting operations on each brick as necessary, prior to placing each brick.

BRIEF DESCRIPTION OF DRAWINGS

Preferred embodiments of the invention will now be described with reference to the drawings, in which:

FIG. 4 is tabular data showing stock brick parameters;

FIG. 14 is an isometric view showing internal wall brick stepping for a bay length of up to twice the brick length with associated vertical gaps;

FIG. 15 is an isometric view showing internal wall brick stepping for a bay length of more than twice the brick length with associated vertical gaps;

FIG. 16 is an isometric view showing one possible corner nesting configuration;

FIG. 17 is an isometric view showing one possible tee junction nesting configuration;

FIG. 18 is an isometric view showing one possible cross nesting configuration;

FIG. 19 is an isometric view showing one possible end stepping configuration;

FIG. 20 is an isometric view from below showing one possible tee junction nesting configuration with a rebate routed into a lower course external brick;

DESCRIPTION OF EMBODIMENTS

Figure 1:
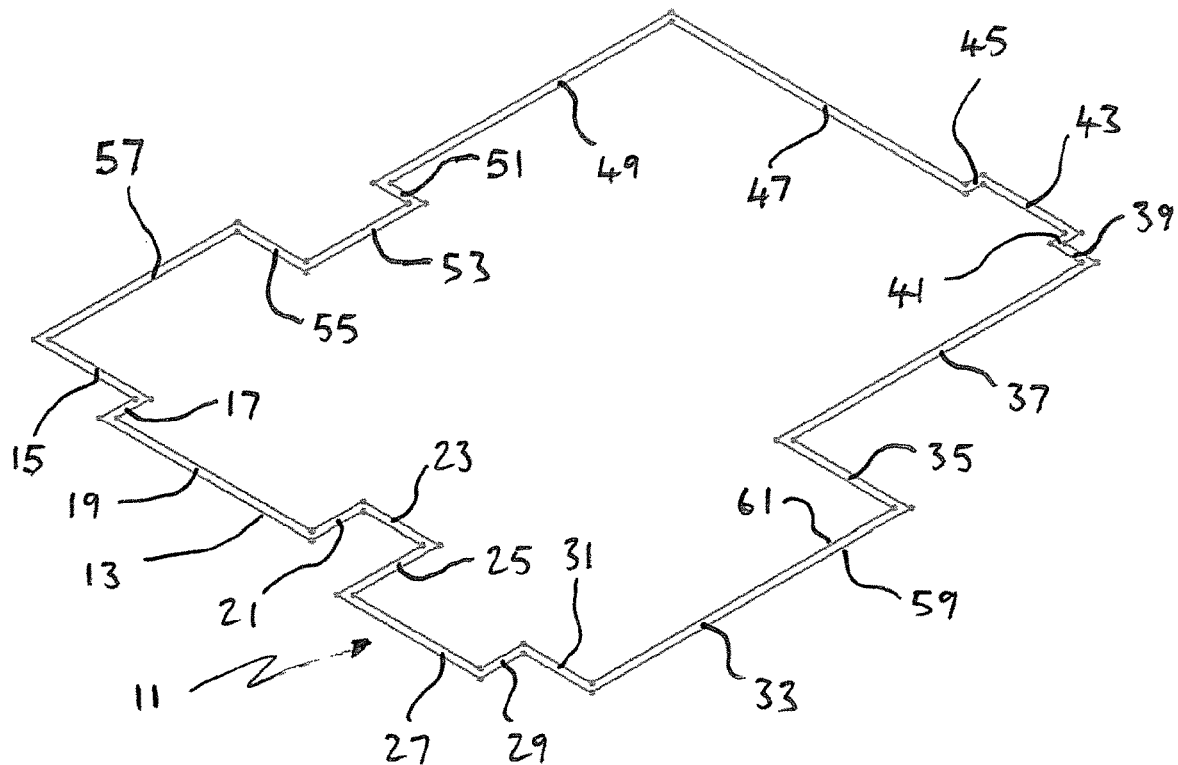
FIG. 1 is an orthographic projection of the external perimeter wall of a house.

The computer aided design software according to the embodiment can be implemented as a fully featured CAD program, or as a plug-in for an existing CAD program, such as Solidworks. The control software to control a brick laying machine to build a building which is designed in the computer aided design software imports a brick placement database produced in the computer aided design software, and then the brick laying machine implements the construction of the building according to the data contained in the brick placement database. During the construction phase, the brick placement database may have fields (cloumns) added to it, in order to associate new data with each brick.

The computer aided design software allows the user, once size of brick to be utilised for external walls and the size of brick to be utilised for internal walls has been determined, to create a scale top-plan view of external walls and internal walls with known wall length dimensions as determined by the user in accordance with the requirements of the person commissioning the build. The user determines the footing and/or concrete pad data including the dimensions of the footings and/or concrete pad, and relative height off-set between the bottom of the external walls and the bottom of the internal walls and between different sections of internal walls.

The computer aided design software can, through inputting of concrete thickness required to meet load bearing capacity of the built structure, determine the required volume of concrete to form the pad.

The computer aided design software provides for the user to plan the configuration of the walls from the footings and/or pad up to the tops of the walls including positional determination of voids of dimensions commensurate with the height and width of doors and windows to be fitted, and positioning data for channels and recesses (chasing) for services of plumbing, electrical and ICT and sound and vision cabling and connection points in said external walls and in said internal walls.

The computer aided design software then determines brick by brick placement data for the external walls and the internal walls, and identifies the position and orientation in three dimensions of each brick relative to the footings and/or concrete pad, and identifies the position in three dimensions of individual bricks to be cut to length in order to meet the required dimensions of wall length, void size and aperture size.

The computer aided design software generates machining data for the position of recesses and cavities to be machined in individual bricks according to the positioning data of said channels and recesses.

The computer aided design software then determines the order that each brick is to be laid, based on a rule that requires any brick extending across an intersection or to the apex of a corner to be laid first. A blockdependency data field can be provided, associated with each brick in order to identify a set of bricks that must be laid before the brick specified. This is to avoid laying arm collisions with previously laid bricks.

A brick placement database is compiled, containing data identifying the position and orientation in three dimensions of each brick relative to a datum point which relates to a point on the footings and/or concrete pad, and where bricks are trimmed to length, the trimmed length, and the order in which the bricks are to be laid. All position and orientation data is referenced to a central point in each brick, whether trimmed to length or whole. The gap to the next brick is also stored as an A value in the brick placement database. Machining data for services, or any special arrangements of interconnecting walls is also stored in the brick placement database, against each brick. Blockdependency data is included for each brick, where necessary.

For each side of each brick requiring routing or cutting, a record is placed in the brick placement database. Each record provides a link to the brick it is associated with, cross-referencing to additional tables that contain the actual routing and cutting information in a form that can be read by the routing tool or saw, as the case may be.

Additional fields in the brick placement database are also provided for, against each brick, which can be populated at the design stage when the footings and/or slab have been poured and scanned for surface height variation, or can be populated during the construction phase, by input to the control software for controlling the brick laying machine. These additional fields include trim data containing a trim value array for each brick, which is the amount of material that must be machined from the bottom of each brick, so that when the bricks are all laid, the tops of the course will be level.

A laser scanning device is arranged to measure the relative surface height of a surface extent where bricks are to be laid, recording the height of the footings and/or a concrete pad, or the height of an existing course of bricks or other surface, at the location where each brick is to be located according to brick placement database as described above, to determine the difference in height of the surface across the location for each brick, from the lowest point to the highest point for the first course of bricks and stores the difference from the lowest point as trim data in the form of a trim value array for each brick. This data corresponds with the amount to be machined from a horizontal face of each brick so that the top of each course is level when laid, the trim data being stored with said brick placement data.

Special considerations regarding the execution of a building plan in the computer aided design software, including location of trimmed bricks and nesting of bricks will now be discussed.

As will be apparent from the discussion that follows, each course of each wall of a building or structure has a start point and a finish point. The course distance between start point and end point for each course is known, determined from the scale top-plan view produced in the computer aided design software. These points comprise two of the end of a course of bricks, the stepped end of a course of bricks plus adhesive thickness, the edge of a window and the edge of a door. A stepped end of a course of bricks is stepped inwards along the length of the course by the wall thickness of an intersecting brick of an intersecting course, usually forming part of a wall running at 90 degrees to the course. The minimum brick length is determined by the length of the gripper of the brick laying machine, which in the present embodiment is 120 mm. It would be impractical for the brick laying machine to handle bricks of shorter length than its gripper as this would invariably lead to the gripper clashing with bricks that had already been placed.

A course is made up of a number of stock bricks of known length, including where necessary, one or more bricks that are trimmed in length, referred to as a remainder which can be no shorter than 120 mm. Where two or three trimmed bricks are utilised and the lengths of the trimmed bricks is determined to ensure that brick stepping conforms with accepted practices. In the embodiment, the external bricks are 258 mm high, 500 mm long and 240 mm deep. The internal bricks are 258 mm high, 500 mm long and 115 mm deep.

The first course is made up of a number of stock bricks of length 500 mm divided into the length of the wall. The remainder is determined from a distance greater than 125 and less than 500.

These bricks are illustrated in the FIGS. 7 to 10, and 12 to 24 and are provided with a tongue and groove configuration in their ends to assist as light blockers to prevent light from being seen on the opposite side.

The computer aided design software allows the CAD operator to sketch the plan of the building, in this example, a house. Referring to FIG. 1, the CAD operator draws the external perimeter 11 of the exterior wall 13 of the house as straight line sketch segments 15, 17, 19, 21, 23, 25, 27, 29, 31, 33, 35, 37, 39, 41, 43, 45, 47, 49, 51, 53, 55, 57, and closes the sketch pattern to make it a closed contour. The external perimeter 11 is drawn using a 125 mm grid system to position the walls at 125 mm increments. With this arrangement the bricks can be cut into 125, 250, 375 to fill the remainder gap to ensure that brick stepping conforms with accepted practices.

External openings for doors and windows are closed. Where the entire structure is built on a concrete pad, the external perimeter will represent the concrete pad dimensions. For a level concrete pad the elevation of the pad is given a z value of 0. The lowermost elevation of the wall should be set to the same z value. Alternatively for a stepped down damp course building construction, the external wall may be set down. The parallel lines of the wall in FIG. 1 represent the exterior 59 of the external wall and the interior 61 of the external wall. Each sketch segment 15 to 57 represents a wall from end to end.

Figure 2:
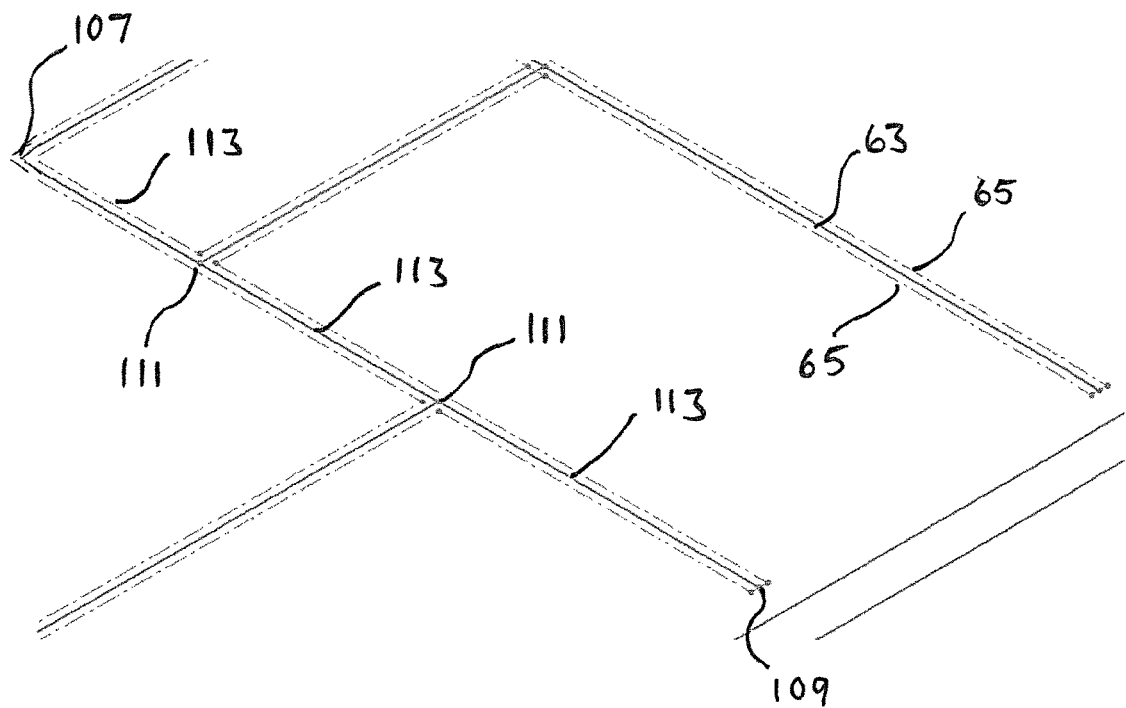
FIG. 2 is an orthographic projection of the internal perimeter wall of a house.

The next step is to draw the internal walls 63 as a single line which traces the centrelines of the bricks whilst maintaining 125 mm grid system to position the walls at 125 mm increments. Referring to FIG. 2, the dashed lines 65 either side of the single line, denote the surface of the interior bricks. The lowermost elevation of the internal walls should be set to a y value of 0.

Figure 3:
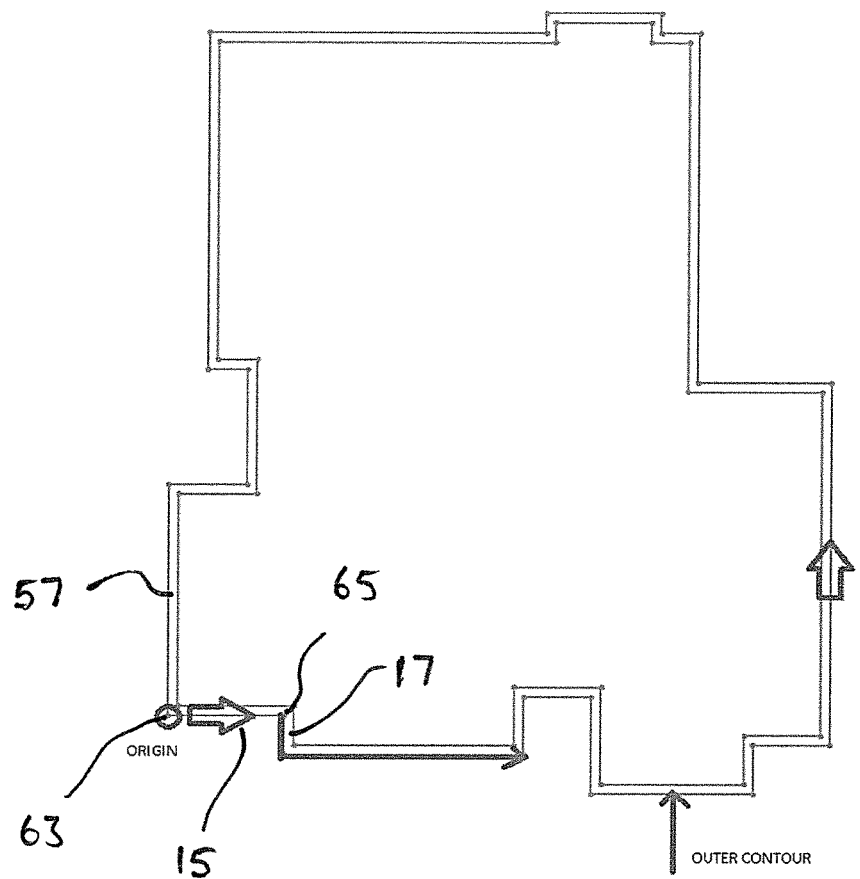
FIG. 3 is a top plan view of the external perimeter wall of a house.

Referring to FIG. 3, the exterior wall each sketch segment 15 to 57 on the perimeter outer contour are collected and ordered in an anti-clockwise direction starting from the closest to the projects origin 63. Each sketch segment has a 3D x y z start point and 3D x y z finish point. Segment 15 has its 3D x y z start point at origin 63 and its 3D x y z finish point at the junction 65 with segment 17.

The sketch segments may be drawn in any direction, but the software collects the sketch segments and swaps the start and finish point (if required as it may be pointing in the opposite direction) on the sketch segment to maintain the chain pattern from start to finish on each sketch segment in an anti-clockwise direction, with sketch segment 57 having its 3D x y z finish point back at origin 63.

Wall assemblies are added to the project and are attached to the start point of the sketch segment, then the brick component from the library containing the brick data is inserted into the brick wall assembly. Brick data includes the stock external wall brick depth (thickness), length and height, the external vertical brick gap, the external wall horizontal brick gap, the stock internal wall brick depth (thickness), length and height, the internal vertical brick gap, and the internal wall horizontal brick gap. FIG. 4 shows representative data for these values.

All walls are created from a pattern of the first and second courses to the cap.

Figure 5:
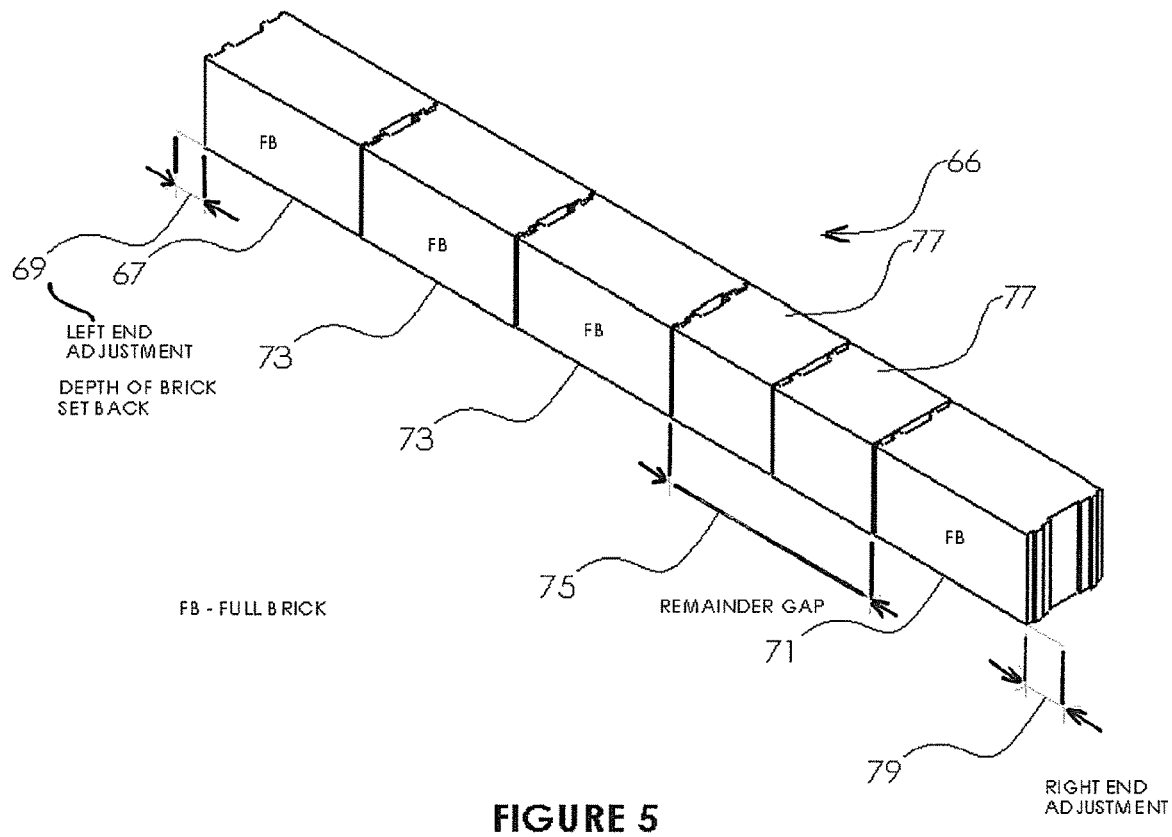
FIG. 5 is an orthographic projection of part of a first external course of bricks.

Referring to FIG. 5, the first (bottom) course 66 of bricks is shown. To maintain consistency, the first brick 67 of each wall is offset 69 on the bottom course the depth of the first brick and then is placed from this point based on the brick depth plus vertical gap (indicated at 69) from the brick data in FIG. 4. This offset 69 provides space to accommodate a brick from the intersecting course, plus the vertical gap which is to be filled with adhesive. The first brick 67 and last brick 71 in the sequence for the bottom course are full uncut bricks. Proceeding from the first brick 67, full uncut bricks 73 are allocated with the vertical gap, until a space referred to as a remainder gap 75 which exceeds the length of a full uncut brick, but is less than the length of two full uncut bricks plus spacing for three vertical gaps, is reached along the course 66. Two stepping adjustment bricks 77 of equal length, equal to the remainder gap less three vertical gaps, all divided by two, are allocated to the remainder gap 75. There is a right end adjustment 79 at the end of last brick 71 which is set to zero if the end of last brick 71 is a doorway or external corner, and set to 6 mm (the same as the vertical spacing) if the last brick 71 forms an internal corner.

For external walls, from corner to corner, or from door to corner or visa-versa, the wall length is equally divisible by 125.

The first (bottom) course starts flush on the end of the first corner and patterns as full bricks to the remainder gap minus the end of the perpendicular bricks depth, this being Right End Adjustment. The remainder is stepped using cut bricks of 125 mm intervals. ie 125, 250, 375.

Doors are treated similarly as a corner nest where the perpendicular brick in the Right End Adjustment is cut to a 250 brick on either side of the door for each course respectively.

The bricks 67, 73, 75 and 71 are placed on the exterior 59 line being the outer edge of the external brick and lines up with the sketch segments.

Figure 6:
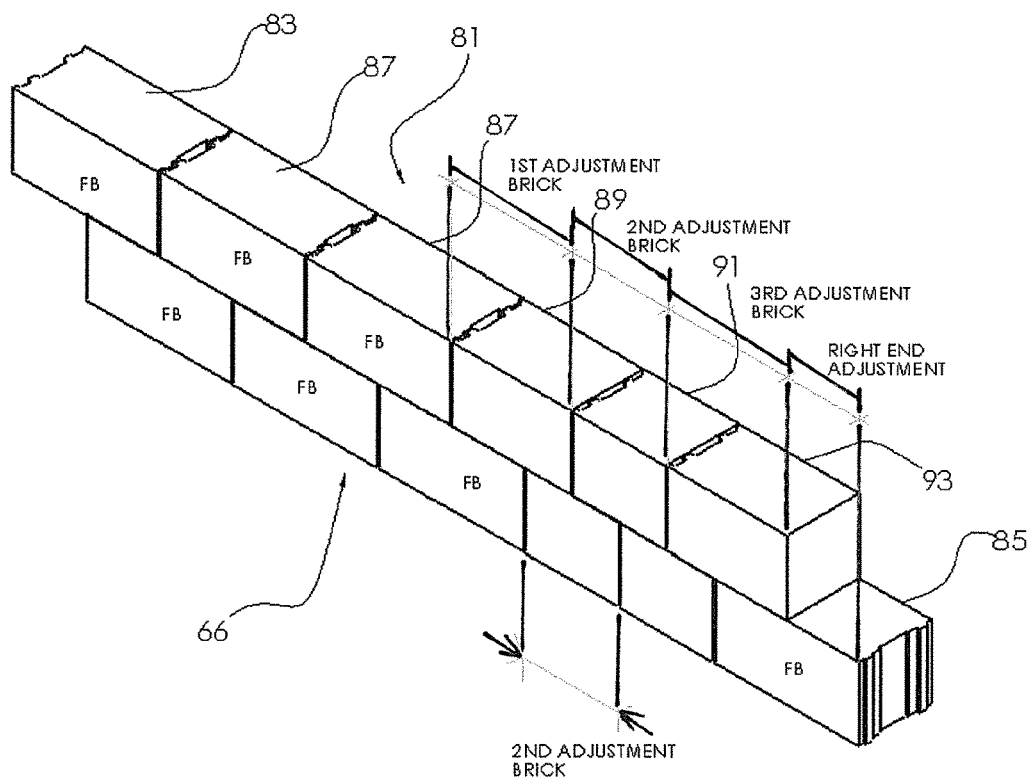
FIG. 6 is an orthographic projection of part of the first external course of bricks of FIG. 5 and part of the second external course of bricks.

Referring to FIG. 6, the second course 81 brick placement starts with a full brick 83 on the left end with no left end adjustment and the right end with a brick depth+vertical gap adjustment 85. There are two full bricks 87 to the right of the left end full brick 83, and three cut to length stepping adjustment bricks 89, 91 and 93. The second stepping adjustment brick 91 is the same length as one of the first course 66 stepping adjustment bricks 77. The first stepping adjustment brick 89 length is determined by half the length of a first course 66 stepping adjustment brick 77, added to the distance between the right hand end of brick 73 and the right hand end of brick 87. The third stepping adjustment brick 93 length is measured from the end of the second stepping adjustment brick 91 minus the brick depth+vertical gap adjustment 85.

Any course of bricks running between an intersection of bricks, a corner, or an edge for a window or a door, can be considered to be a course segment. Each course segment is populated in the design software with a number of full length bricks 73 extending from end adjustment 69 to end adjustment 79 (if any), with at least one full length brick 67, 71 abutting each end adjustment 69, 79 respectively, leaving a remainder gap 75. Where the remainder gap 75 is less than the minimum allowable remainder of 120 mm (or 125 mm under the 125 mm grid system), the calculated remainder gap 75 added to the length of a stock brick added to the A value for each, all divided by two, determines the length of two bricks 77 to fill the remainder gap 75, as is illustrated in FIG. 5. End adjustments may include cut bricks to ensure proper nesting, particularly where the end of a course segment is an opening for a door or window.

Where the remainder is the same as or greater than the allowable remainder, the trimmed brick length to fill the remainder is the determined remainder size. All data pertaining to this is stored in the brick placement database.

Referring to FIG. 6, in the case where two remainder bricks 77 are utilised in a course, the immediately overlying course 81 includes a trimmed brick 91 of the same length as one of the bricks 77, balanced across the join between the two bricks 77 (that is to say with half of the brick 91 lying to either side of the join between the bricks 77). Two bricks 89 and 93 are cut to a length equal to the length of brick 91 plus a stock brick 87, all divided by two, and these trimmed bricks 89 and 93 are placed either side of brick 91. Standard stock bricks 87 then extend away from these trimmed bricks.

The second course starts with the Left End Adjustment, being the perpendicular bricks depth, then patterns as full bricks until a remainder gap minus a full brick on the end sitting flush with the external face of the wall occurs. The remainder must be greater than or equal to 125 mm and can consist of 2×375 mm, 2×125 mm, 1×125 mm cut bricks and consideration of the first courses remainder for stepping as described above ensures a vertical gap overlap occurs to ensure that there are no continuous vertical gaps occurring between courses.

The final brick on the second course is a full brick and sits flush with the external face of the returning wall.

The third course placed on top of the second course 81 is a repeat of the first course 66, and the fourth course placed on top of the third course is a repeat of the second course 81.

The order of laying bricks in each of the first and second courses (and in consequence the courses that follow) may be swapped so that efficiencies can be gained from nesting arrangements at door and window headers with lintels.

Figure 7:
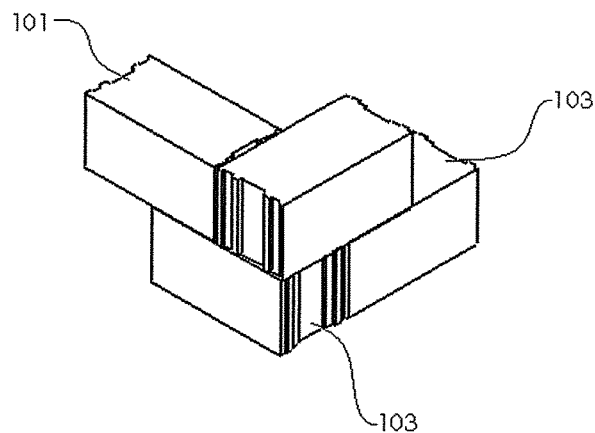
FIGS. 7 to 10 are orthographic projections of external brick nesting configurations.
Figure 8:
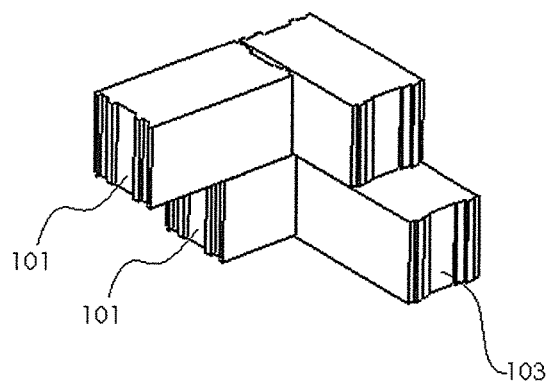
Figure 9:
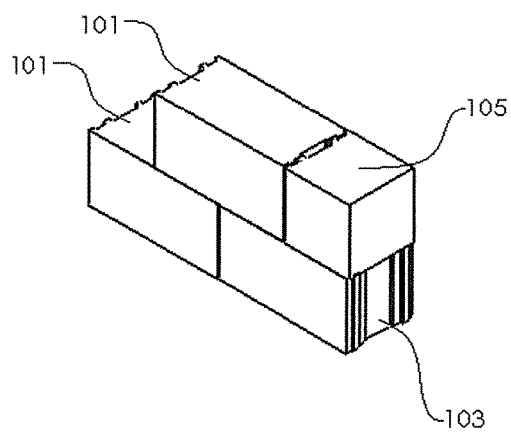
Figure 10:
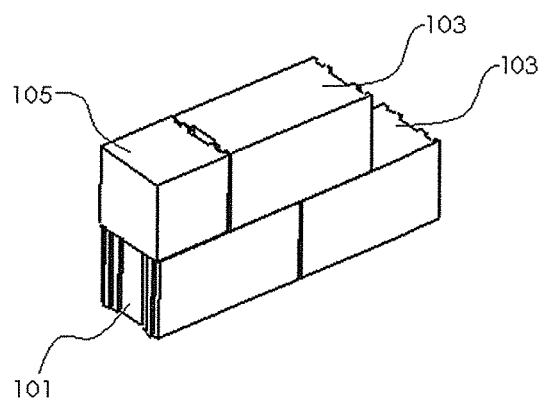

Referring to FIGS. 7 to 10, various nesting configurations of bricks for external brick junctions are shown. FIG. 7 shows the nesting configuration for a typical external corner in external bricks. The groove ends 101 and tongue ends 103 of the bricks are shown. FIG. 8 shows the nesting configuration for a typical internal corner in external bricks. FIG. 9 shows a nesting configuration for an external tongue end, and FIG. 10 shows a nesting configuration for an external groove end, both featuring cut bricks 105 at the ends. These are typically used for doors and windows.

Referring to FIGS. 16 to 20, various nesting configurations of bricks for external brick junctions are shown. FIG. 16 shows the nesting configuration for a typical internal corner in internal bricks. The groove ends and tongue ends of the bricks are shown. FIG. 17 shows a nesting configuration for an internal corner in internal bricks. FIG. 18 shows a possible nesting configuration for an internal wall intersection. FIG. 19 shows a nesting configuration for an internal groove end, typically used for doors and windows. FIG. 20 shows internal brick junction nesting of two external walls and their junction with an internal wall. Machining of the intersecting external brick to accommodate part of the lower course internal brick can be seen.

Another design consideration for the design software is the order of the laying of the bricks, which is another parameter included in the brick placement database. As any course segment is laid, the first brick to be laid is one that extends across a brick junction or to the apex of a brick junction corner. This is so that the gripper of the brick laying machine has access to lay the bricks. If a brick abutting such a brick was to be laid first, the gripper of the brick laying machine would not have access to be able to lay the brick that extends across a brick junction or to the apex of a brick junction corner.

Internal wall creation is similar to external wall creation, except that the brick is placed centrally to the sketch segments and not on a perimeter sketch segments. The stepping of the bricks is also different in that the end conditions (nesting of the bricks from 1 wall to another) have many possibilities. A rule of thumb has been applied based on the direction of the walls to which the left and right end conditions are applied. This rule of thumb is applied to allow for corners to nest in any situation.

Figure 13:
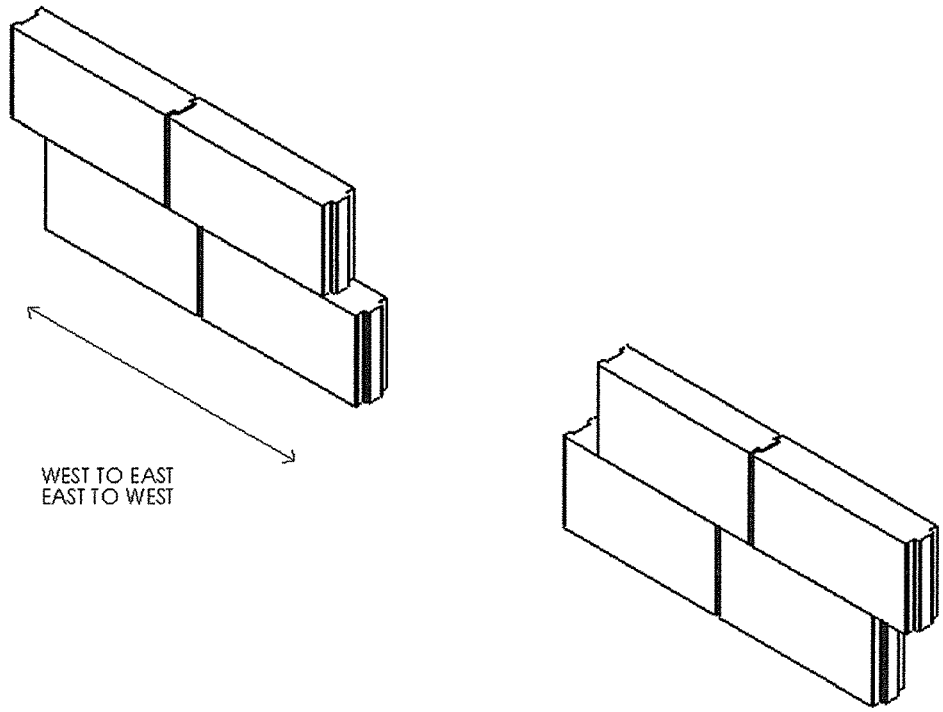
FIG. 13 is a broken isometric view of part of the first course of an internal wall, running in an east/west or transverse direction.
Figure 11:
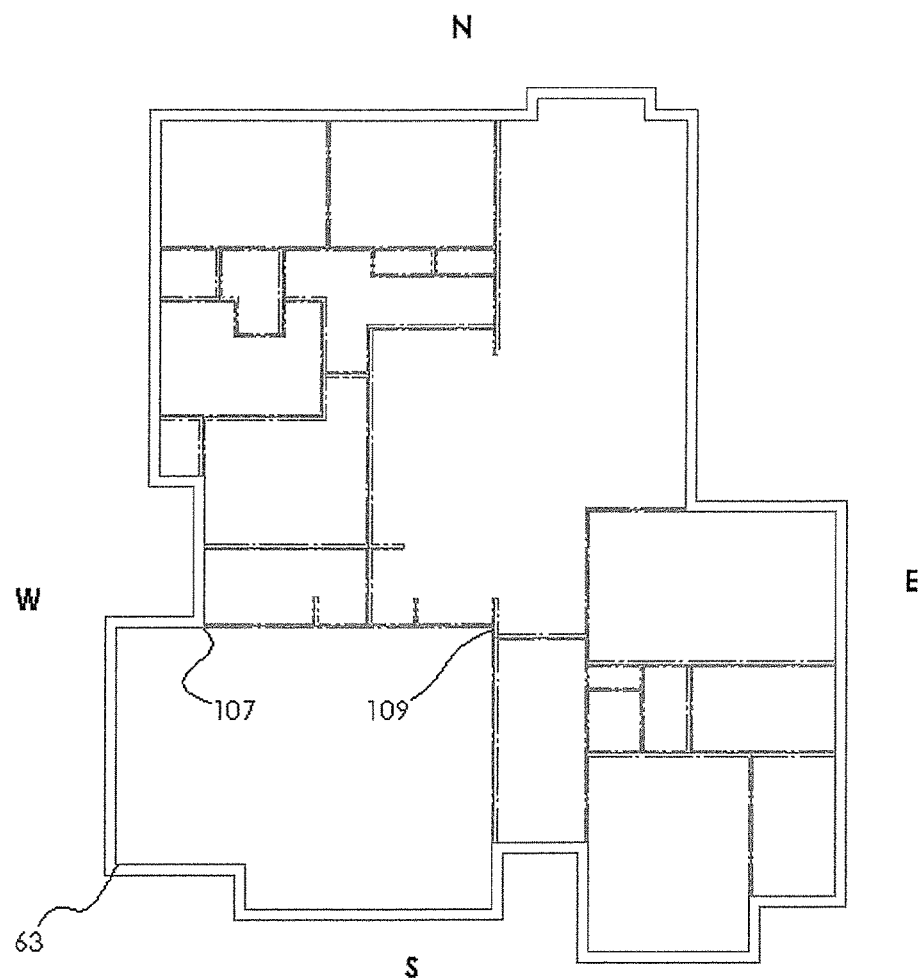
FIG. 11 is a top plan view of the external perimeter wall of the house shown in FIG. 3 with the internal walls added.
Figure 12:
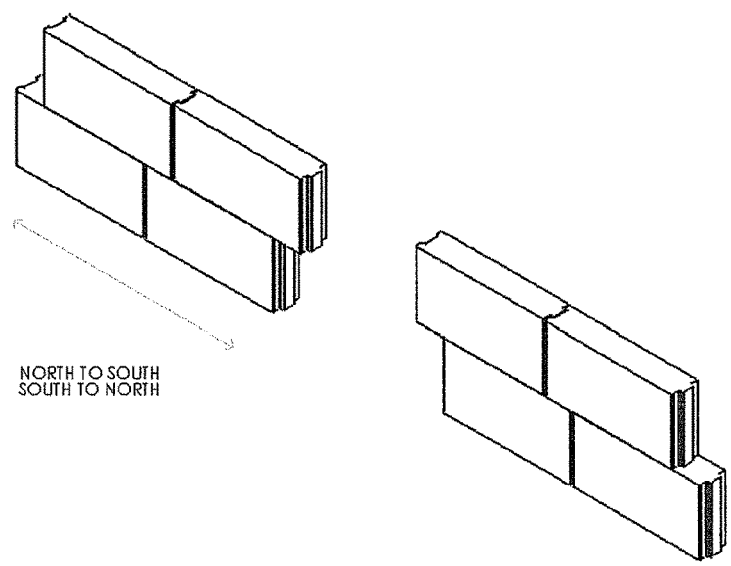
FIG. 12 is a broken isometric view of part of the first course of an internal wall, running in a north/south or longitudinal direction.

In a wall heading in the direction from North to South or South to North as shown in FIG. 12 (considering the plan in FIG. 11 and not magnetic or true north at the actual building site) the first course first and last bricks are extended past the corner brick and the second course brick is positioned internally, in order to lie flush against the intersecting brick. In a wall heading in the direction West to East or East to West, as shown in FIG. 13, the first and last bricks are opposite to North to South or South to North to allow for nesting of internal corners of the two intersecting courses.

Referring to FIG. 2, each entire line between distal points is considered to be a sketch segment. The line between points 107 and 109 is one such sketch segment. The internal wall is divided at sketch points 111, where intersected by other internal walls, into separate bays 113. The brick stepping for each bay 113 is based on the distance and the number of full bricks that can be patterned into the length of the bay, the adjustment cut bricks and left and right adjustments for each bay based on nesting of other walls. For the determination of brick stepping, the bay length excluding any left and right end adjustment offset lengths is considered. Left and right end adjustment offsets are the thickness of bricks of intersecting walls at corner nesting configurations, as discussed for the external walls in the description above, but with dimensions adjusted for the different 125 mm depth of the internal bricks. Brick stepping is determined depending on whether the bay length (excluding the left and right end adjustment dimensions) is from the minimum brick length to the length of two bricks plus the vertical brick gap or whether the bay length exceeds the length of two bricks plus the vertical brick gap. See FIG. 14 for typical brick stepping where the bay length is up to the length of two full bricks plus the vertical gap, and FIG. 15 for where the bay length exceeds the length of two bricks plus the vertical brick gap.

The adjusted length of the stepping adjustment bricks 77, the centre xyz coordinates for each brick in each course of bricks, and the orientation of each brick, relative to the origin 63 together with the left end adjustment 69 and right end adjustment 79 are stored in a brick placement database, which defines the parameters for the bricks to be laid. Since the bricks have a tongue at one end and a groove at the opposite end, and they are laid in a straight line with tongue projecting into groove, the orientation of each brick runs at any value from 0 degrees to 359 degrees, to retain the tongue-groove co-operation. In addition, the 3D x y z start point and 3D x y z finish point for each sketch segment is stored, and the course number for each brick is stored, for example 0 for the first course, 1 for the second course, and so on. The order of laying the bricks, typically from the origin 63, is also stored. The first brick to be laid will have adhesive applied to its underside, and the bricks that follow will have adhesive applied to both their underside and the end (or in the case of a corner, a part of the side that abuts the previously laid brick), and the location of applied adhesive is stored in the brick placement database.

Each bricks 3D location point, length, cut, routing, chasing and rotation data is exported from the design software in the brick placement database, to the control software of the brick laying machine. The three dimensional coordinates of each brick are the length x, the depth or width y and the height z. These values are imported from the brick data contained in a first table containing stock brick sizes, or where the brick is trimmed, are calculated from a virtual bounding box for the brick, generated by the design software. The orientation of the brick is measured against the design software project front plane running in the South to North direction and is degrees from 0 to 359

Where a brick is to be shortened it can be cut to leave the tongue end to be used, or the groove end. This will determine the handling of the brick for the cutting operation. The end to be used is predetermined and its data is stored in the brick placement database. The off cut length is calculated by the design software and the off cut is recorded as available stock for use elsewhere in the plan, and control software is programmed to retrieve an offcut brick portion from recorded available stock, with data pertaining to this being recorded in the brick placement database.

Figure 21:
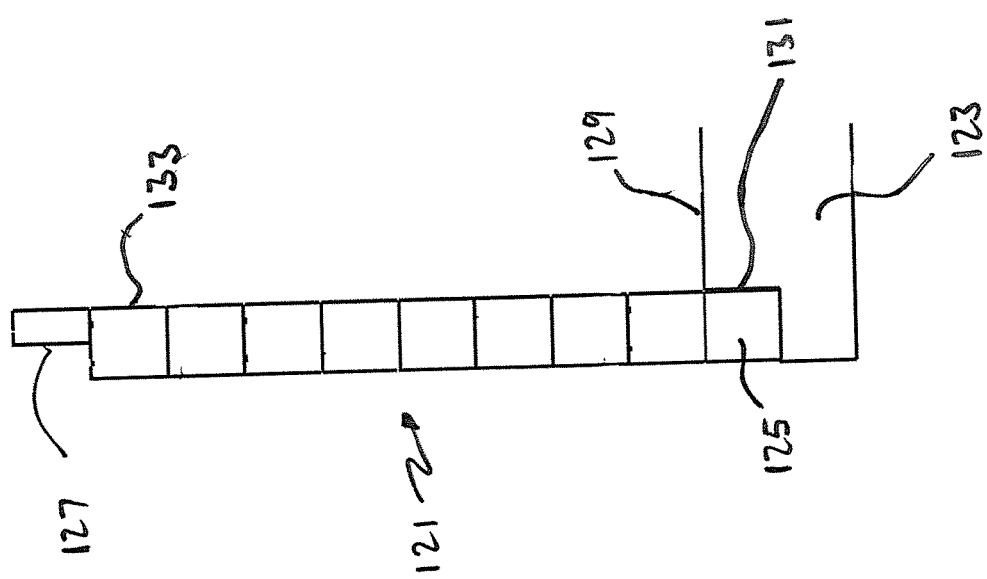
FIG. 21 is a vertical cross section through part of a wall and slab of a building showing the wall and footing configuration.

FIGS. 21 to 24 show various configurations of wall construction including the footing arrangements and finishing courses. FIG. 21 shows a cross section through a wall 121 and slab 123 showing the bottom course 125 with a damp course building method and the top course 127 using an internal brick.

Figure 22:
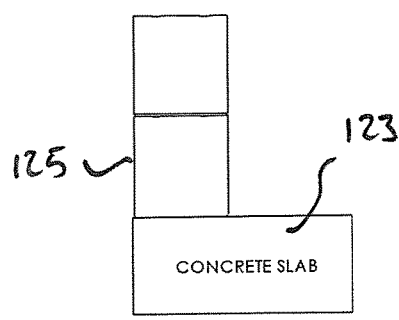
FIG. 22 is a vertical cross section through part of a wall and slab of a building showing an alternative wall and footing configuration to that shown in FIG. 21.
Figure 23:
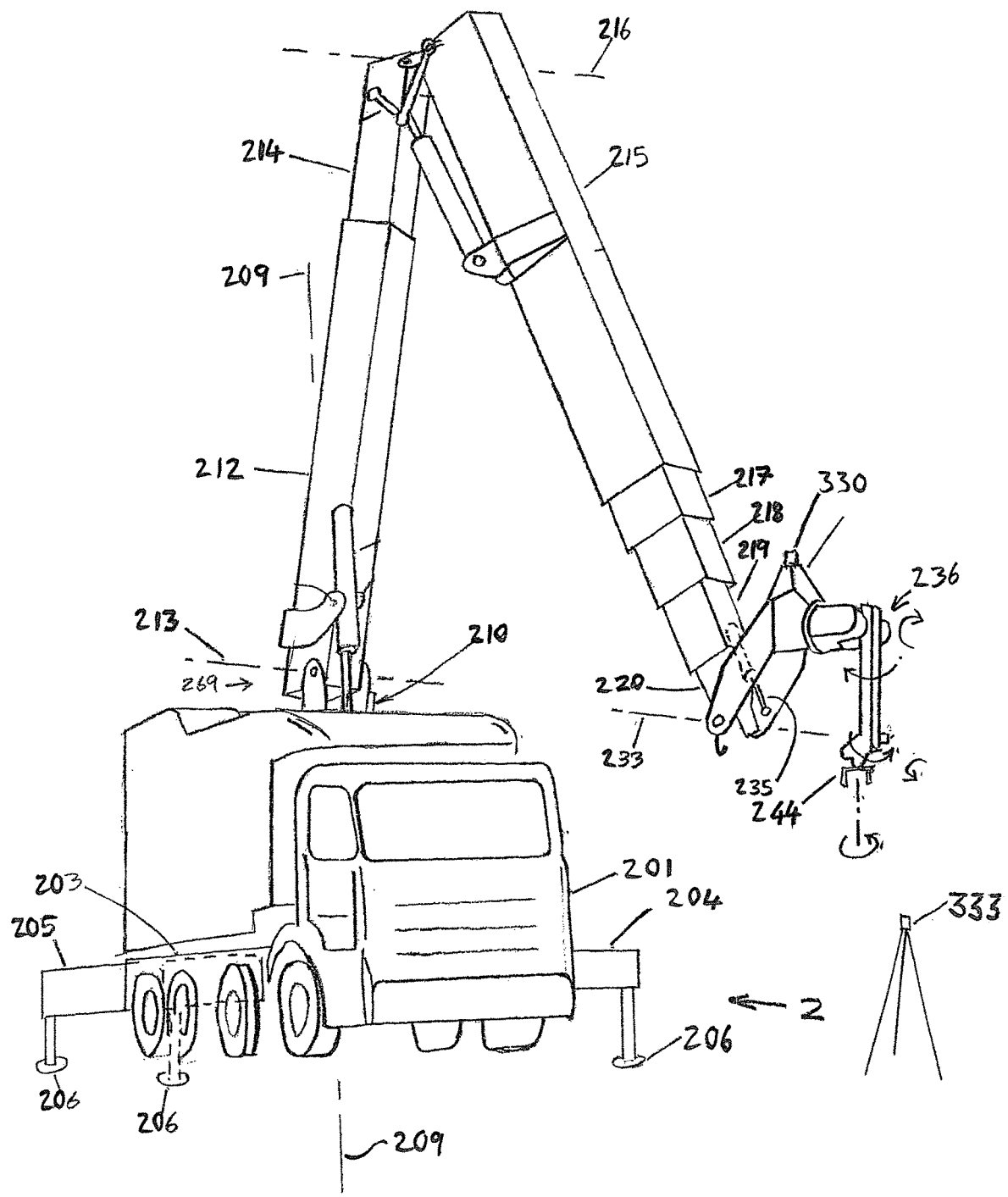
FIG. 23 shows a view of the automated brick laying machine 202 with its truck base 201 with the boom and stick assembly 341 unfolded.

Referring to the section shown on FIG. 22, this shows the bottom course 125 sitting flush on the concrete slab 123 as alternative design, whereas referring to the section shown on FIG. 23, the bottom course 125 is one course lower than the surface 129 of the slab 123 forming a damp course ledge 131 around the perimeter of the concrete slab, used for external walls only.

Figure 24:
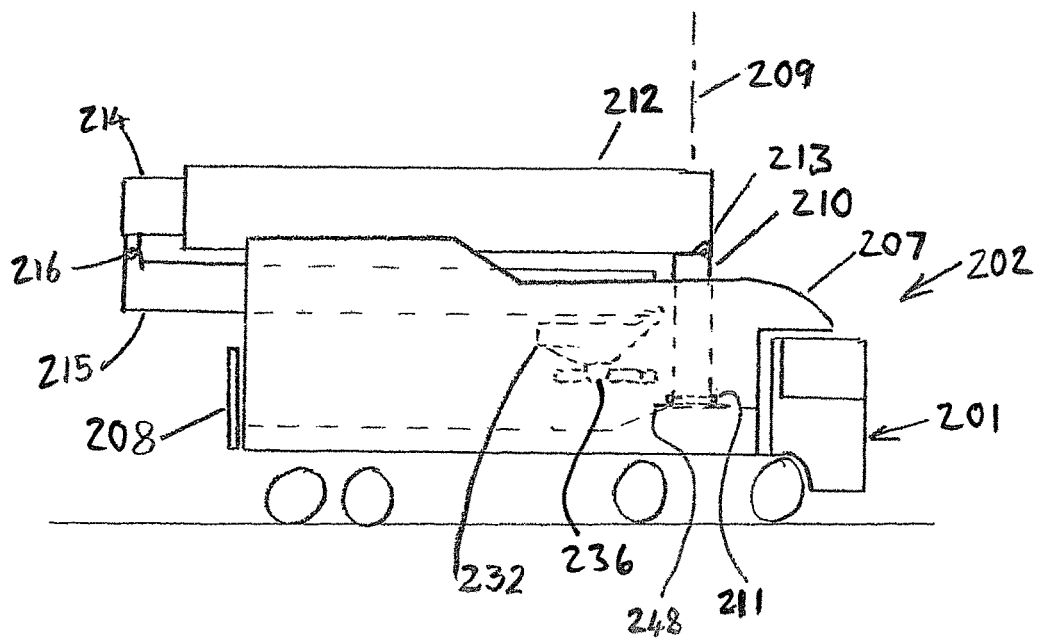
FIG. 24 shows a view of the automated brick laying machine 202 with the boom and stick assembly 341 folded and stowed for driving on a public road.

Referring to the section shown on FIG. 24, the top course 127 on the external wall 121 is an internal brick 127 sitting flush on the internal face 133 of the wall.

The control software for controlling the brick laying machine is incorporated into control electronics in a control cabinet 282, to control the operation of a brick laying machine 202.

Referring to FIG. 24, a truck 201 supports a brick laying machine 202 which is mounted on a frame 203 on the chassis (not shown) of the truck 201. The frame 203 provides additional support for the componentry of the brick laying machine 202 beyond the support that would be provided by a typical truck chassis. The frame 203 has horizontal outwardly extending legs 204 and 205, each with hydraulically actuated push down legs 206 to stabilise the bricklaying machine, once it is parked in position for work.

Figure 26:
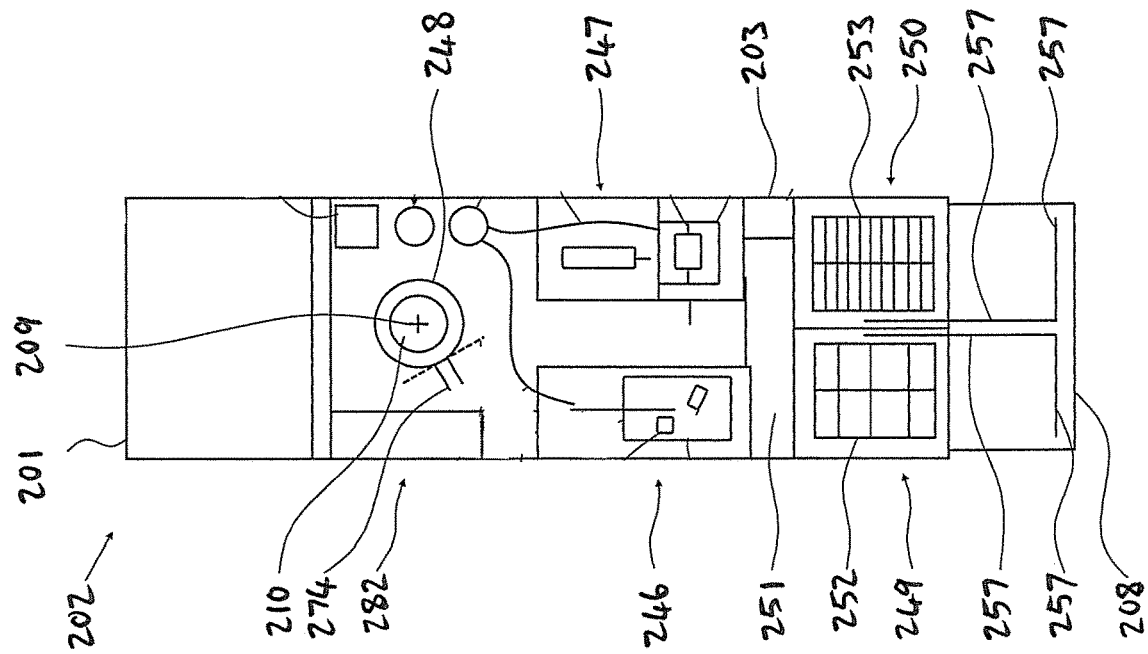
FIG. 26 shows a plan view of the automated brick laying machine 202.

Referring also to FIG. 26, the frame 203 supports packs or pallets of bricks 252, 253, which have been loaded onto a fold down rear deck 208 and moved onto dehacker bays 249 and 250 by scrapers 257. De-hacker robots (not shown) can take rows of bricks off the pallets and place them on a platform 251. A transfer robot (not shown) can then pick up an individual brick and move it to, or between either a saw 246 or a router 247 or a carousel 248. The carousel 248 is located coaxially on a stewing ring 211 with a tower 210, at the base of the tower 210. The carousel 248 rotates to align to the tower to transfer the brick to a gripper on a shuttle running up the tower 210 to allow transfer of the brick to an articulated (folding about horizontal axis 216) telescoping boom.

Figure 25:
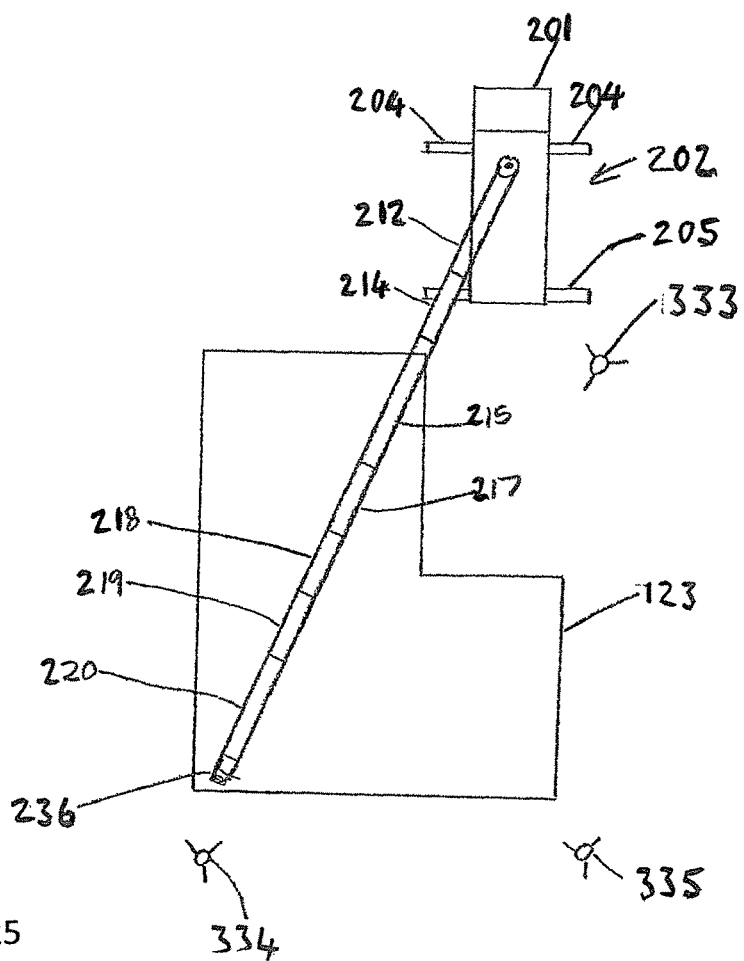
FIG. 25 shows a site plan of the automated brick laying machine 202 set up near a concrete slab 123 on which the automated brick laying machine 2 will build a structure.
Figure 27:
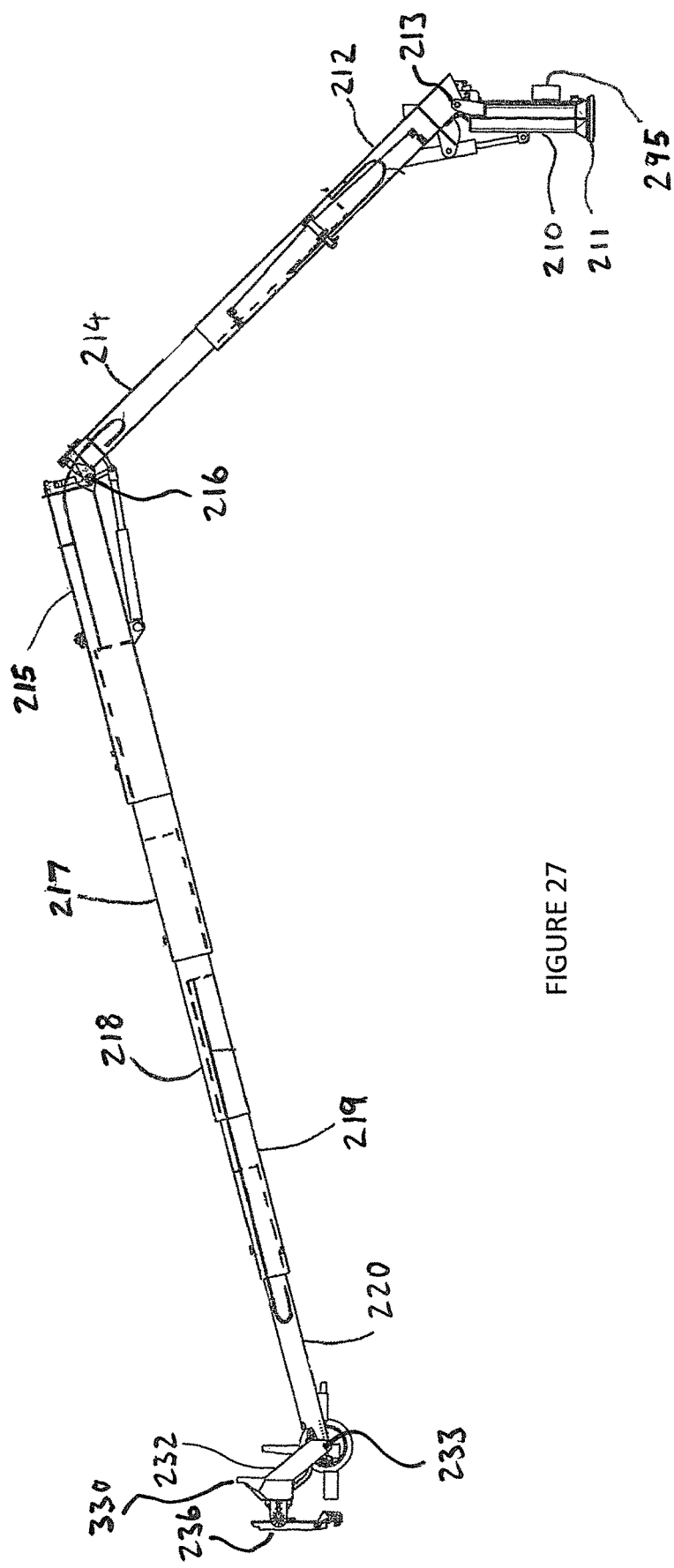
FIG. 27 shows a side view of the boom assembly.

The telescoping boom comprises telescopic boom elements 212, 214 and telescopic stick elements 215, 217, 218, 219, 220. Each element 212, 214, 215, 217, 218, 219, 220 of the folding telescoping boom has a shuttle located inside on a longitudinally extending track in the element, to transport a brick along the longitudinal extent of the element. The bricks are moved through the inside of the folding telescoping boom by the linearly moving shuttles. The shuttles are equipped with grippers that pass the brick from shuttle to shuttle. The shuttles in the telescoping elements are located alternately along the top of one element and along the bottom of the next element, when viewed with the boom unfurled, as shown in FIGS. 25 and 27. The shuttles have grippers to grip a brick as discussed above, and since the shuttles run on opposite sides of immediate next telescoping elements, when the shuttles are coincident both sets of jaws on both shuttles can grip the brick, allowing the brick to be passed from one shuttle to the other.

The shuttles in the elements 214 and 215 run along the top of these elements and a pivoting gripper is provided about axis 216, so that a brick can transfer from the gripper on the shuttle in element 214 to the gripper on the axis 216 which can rotate to align to the gripper on the shuttle in element 215.

A pivoting gripper is also provided on the axis 213 about which boom element 212 mounts to the tower 210, so that a brick can transfer from the gripper on the shuttle on the tower 210, to the pivoting gripper on the axis 213 and then to the gripper on the shuttle running along the bottom of element 212.

The carousel 248 also has a pivoting gripper 274 into which a brick is placed by the transfer robot, before the carousel 248 rotates and the pivoting gripper 274 thereon pivots to present the brick to the grippers on the shuttle on the tower 210.

The end of the boom is fitted with a brick laying and adhesive applying head 232. The brick laying and adhesive applying head 232 mounts by pins (not shown) to element 220 of the stick, about an axis 233 which is disposed horizontally. The poise of the brick laying and adhesive applying head 232 about the axis 233 is adjusted by double acting hydraulic ram 235, and is set in use so that the tracker component 330 is disposed uppermost on the brick laying and adhesive applying head 232. A gripper is mounted about the pivot axis 233 and received a brick from the shuttle at the end of stick element 220, flips it and presents it to the brick laying and adhesive applying head 232, which applies adhesive to the brick and presents it to a robot 236 with a gripper 244 that lays the brick. Vision and laser scanning and tracking systems 334, 335, 333 are provided to allow the measurement of as-built slabs 123, bricks, the monitoring and adjustment of the process and the monitoring of safety zones. The first, or any course of bricks can have the bricks pre-machined by the router module 247 so that the top of the course is level once laid, as is discussed above.

The transfer robot, the saw 246, and the router 247 each have a gripper that can hold a brick at any point in time, as do the grippers on the carousel 248, the tower 210, the pivot axis 213, the shuttle in the boom element 212, the shuttle in the boom element 214, the gripper mounted to the pivot axis 216, the shuttle in the stick element 215, the shuttle in the stick element 217, the shuttle in the stick element 218, the shuttle in the stick element 219, the shuttle in the stick element 220, the gripper mounted about the pivot axis 233, and the brick laying robot 236. For a more detailed description of the brick laying machine, reference is made to the patent specification titled "Brick/Block Laying Machine Incorporated in a Vehicle" which is the subject of international patent application PCT/AU2017/050731, the contents of which are incorporated herein by cross-reference.

Operation of the brick laying machine will now be discussed. The brick placement database is accessed by control software contained in the control cabinet 282. If a scan of the slab to determine its horizontal variance has not already been carried out, this is now performed, and a trim value array for each brick is determined and loaded as trim data in the brick placement database.

A brick is taken from a dehacked row of bricks, by the transfer robot, and allocated an identification number as the first brick of the construction according to the brick placement database. The brick is then treated according to the instructions embodied in the brick placement database. As the first brick, it is unlikely that it will require machining or cutting, and if so it will be moved by the transfer robot to the carousel. If the brick requires machining due to the slab scan analysis determining that the slab has a lower elevation at other positions where bricks are to be laid, the brick is moved to the router 247 where it is transferred by a gripper therein and has material machined from the bottom thereof in accordance with the trim value array trim data stored against the brick in the brick placement database. Otherwise the transfer robot would transfer the brick to the carousel 247. After the machining operation the transfer robot transfers the brick from the router 247 to the carousel 248. After this, the transfer robot is free to return to the row of dehacked bricks, to select the next brick in the sequence as determined by the brick placement database The carousel 248 rotates so that its gripper 274 aligns with the transfer robot, and the carousel gripper 274 grips the brick followed by the transfer robot gripper releasing the brick. The carousel 248 rotates to the position of the shuttle and track on the tower 210 (note that this slews with the tower rotating with the boom about the horizontal axis 209). The tower shuttle lowers to the grippers 274, and the brick is transferred to the grippers on the tower shuttle. The tower shuttle can then climb the tower 210 to reach the pivot axis. At this stage the carousel is ready to rotate back to receive the next brick from the transfer robot.

This process continues, with the transfer robot moving the bricks via the saw 246 and/or router 247, for the cutting and machining each said brick in accordance with said brick placement data allocated against each identified brick in the brick placement database.

The control software controls the brick laying machine elements to convey each said brick one by one, and apply adhesive and locate each said brick in position on the build, according to said brick placement data for each brick contained in the brick placement database.

In addition to this the control software builds a handling table identifying for each brick, its identification number which can equate to an identification number in the brick placement database, and for each step between different grippers in the sequence of grippers contained in the brick laying machine, identifies the time and the gripper ID.

All of these transfers between the programmable brick handling apparatus are logged in the handling table, so that the handling table provides a record of which brick is where and when.

Consequently, if for any reason the brick laying machine must be paused for any reason, such as shutting down at the end of a working day, it may be restarted, and the correct brick will be laid in the correct position after the restart has occurred.

Further, if for any reason a brick is damaged during a machining (cutting or routing) operation, it may be discarded at the machining tool, and the handling table can be updated by reallocating brick identification numbers to the bricks preceding the damaged brick in the supply chain.

Where damage to an individual brick is not determined until it reaches a position closer to the brick laying gripper, where any said brick already in transit along said handling devices includes no machining data in said brick placement database, said handling table can be updated by reallocating brick identification numbers to the bricks preceding the damaged brick in the supply chain.

However, where any said brick already in transit along said handling devices includes machining data in said brick placement database, due to the individual bricks being laid in order, it becomes necessary for the control software to run the brick laying machine in reverse, restacking the bricks and storing their restacked position until there are no bricks having associated said machining data in transit along said handling devices, whereupon a replacement brick can be picked from said pallet and processed according to said brick placement database. Thereafter, any restacked bricks are picked up in order, and operation then continues as pre-programmed.

Figure 28:
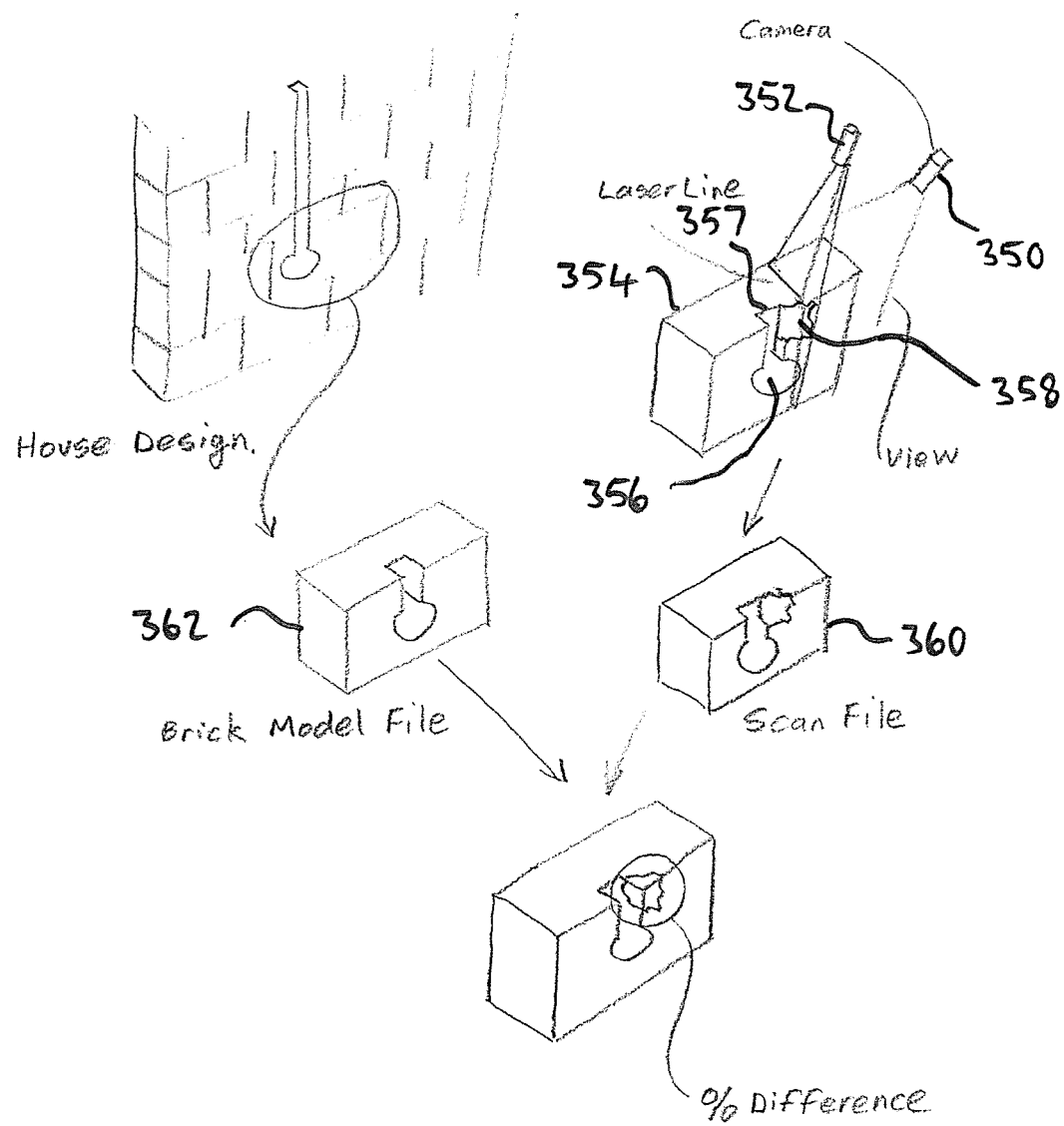
Figure 29A:
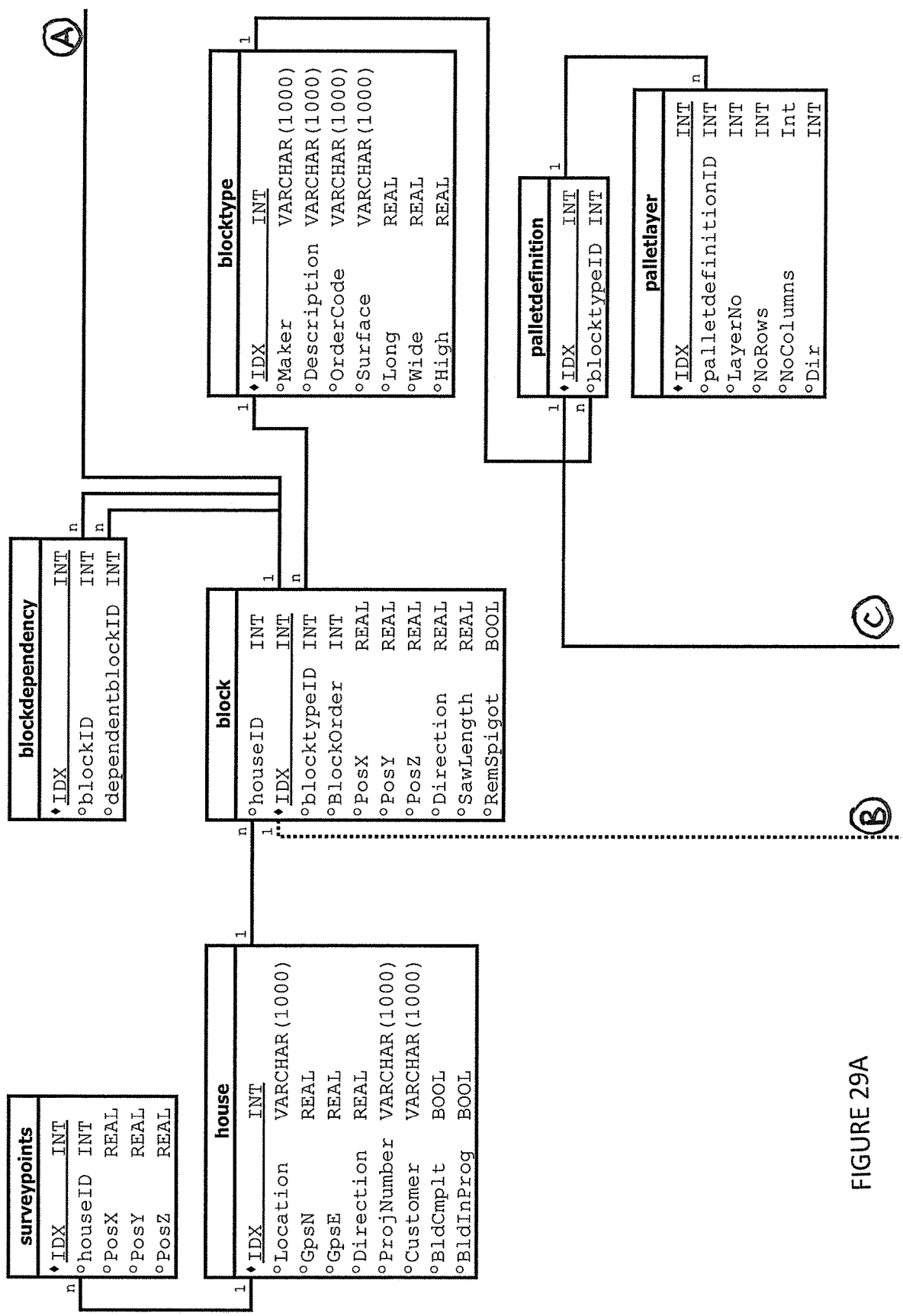
Figure 29B:
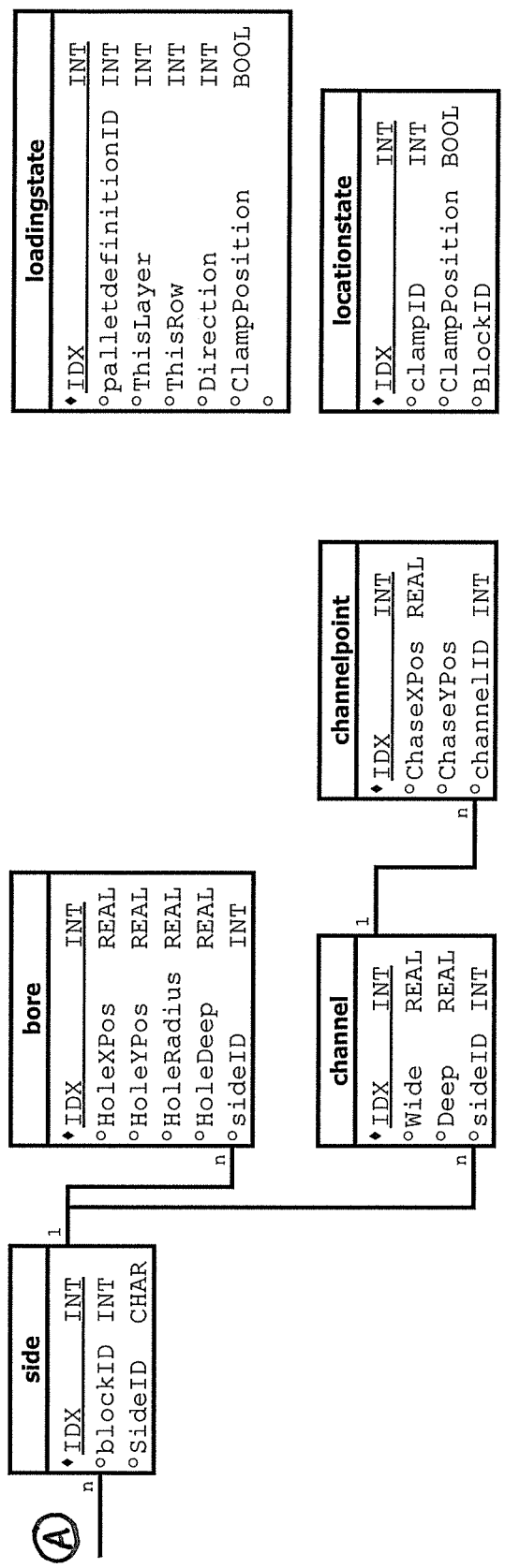
Figure 29C:
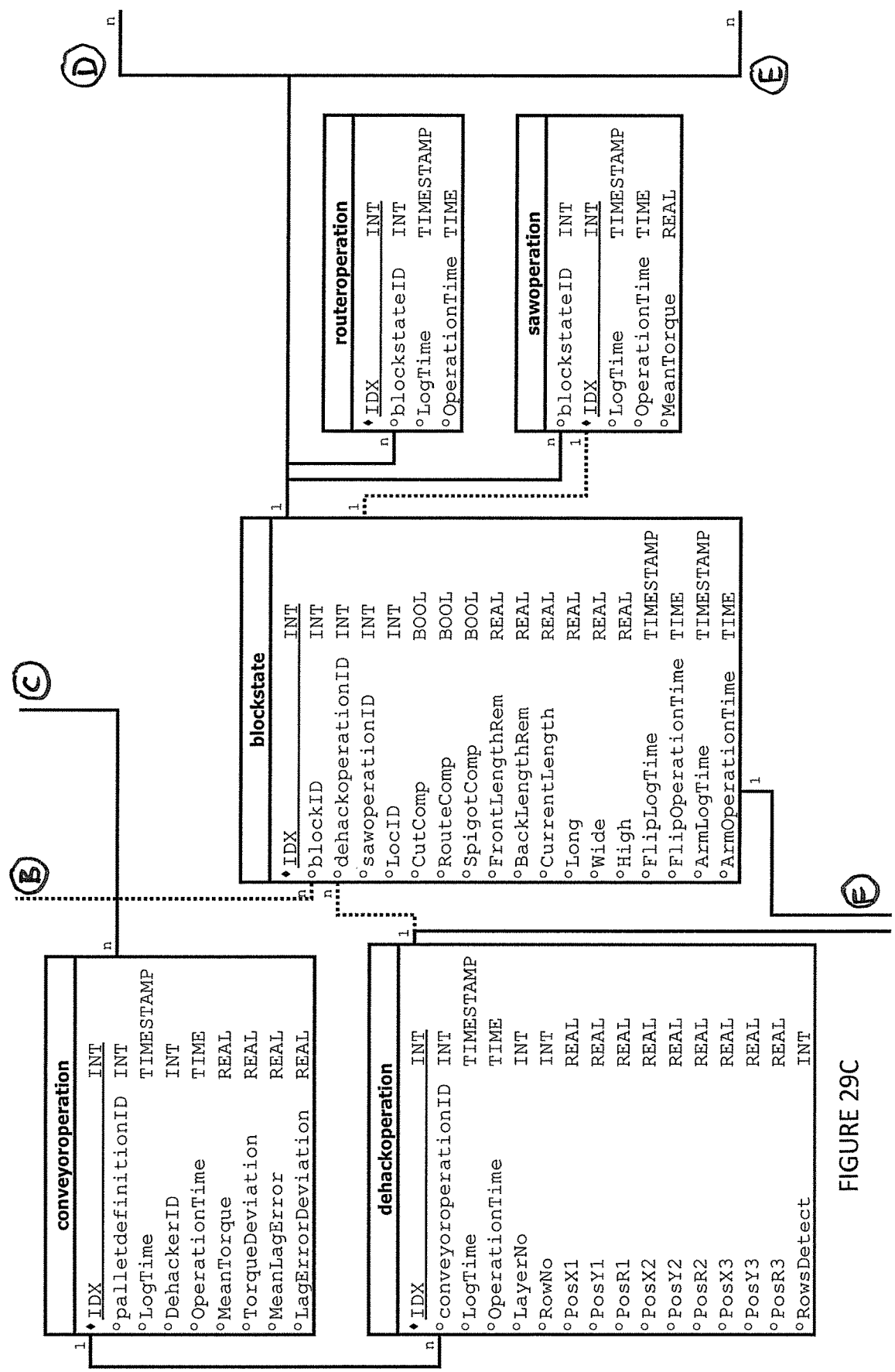
Figure 29D:
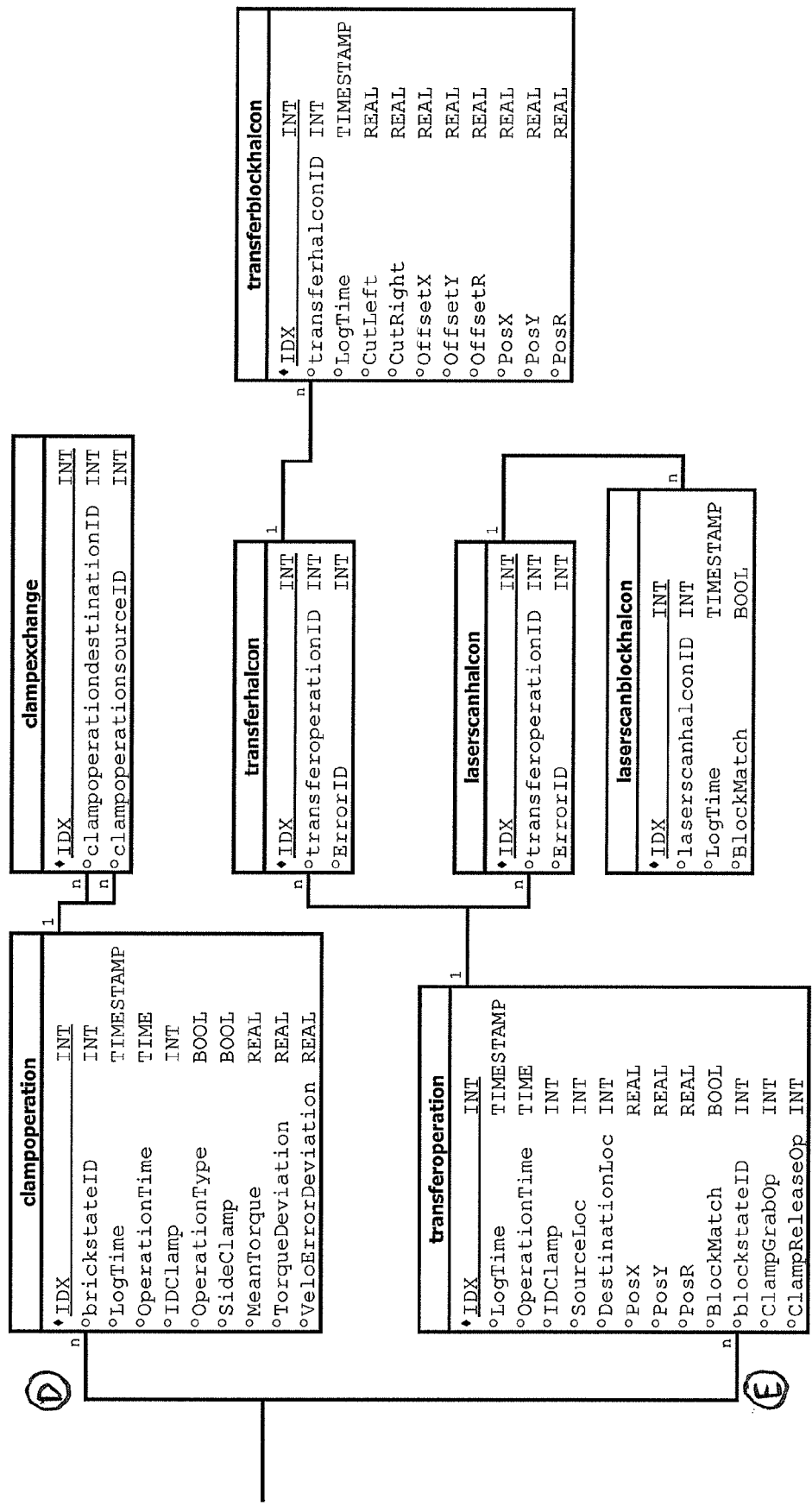
Figure 29E:
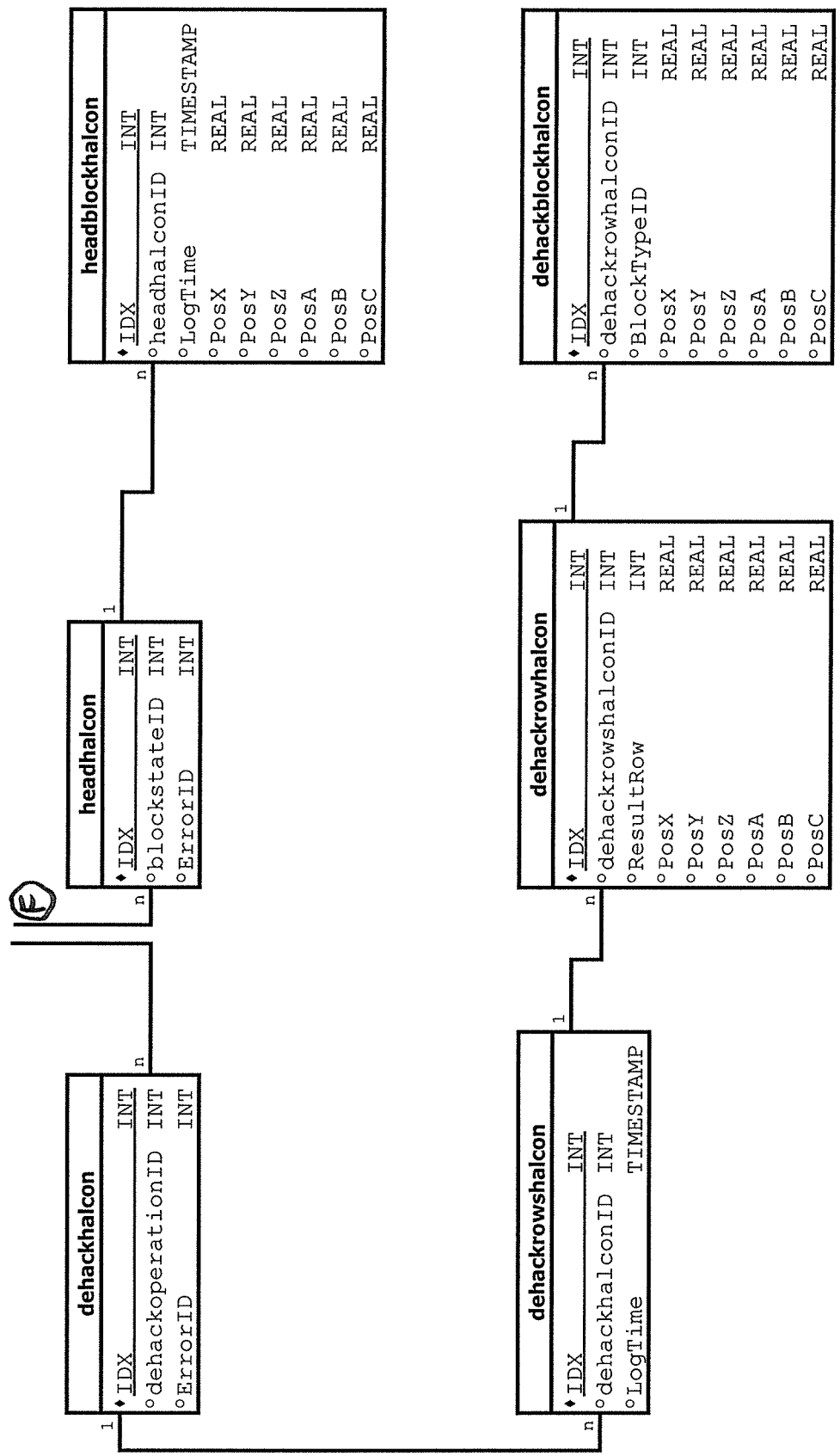

Referring to FIG. 28, scanning equipment comprising a camera 350 and a scanning laser 352 scans a brick 354 that has been subject to a machining operation in the router 247 to produce a power outlet recess 356 and part of a cable access channel 357. In the example, the brick 354 has cracked and a chip 358 has come away from the brick. The control software produces a scan file image 360 which is compared with a model file 362 for the brick which is contained in the brick placement database, to determine whether the scan file image 360 differs sufficiently from the model file 362, that the brick 354 should be rejected.

Both the design software and the control software access a database which is illustrated in FIGS. 29A to 29F. The database can be notionally divided into four sections, namely build data for a house and current machine state, equipment and block transfer logging, vision system logging, and axis/drive and instrument logging. Different elements of the bricklaying machine may access the same data.

The build data and machine state section of the database stores the current state of the house; including location/state of each block, state of each clamp of the machine, state of the de-hacking bays and slab details. The build data is generated by the computer aided design software, and contains all of the information required by the control software to run the brick laying machine to build a structure. For each house or structure, hereafter referred to as a house for brevity, a record is added to the house table. This is the identifying data for the particular house being built and includes street address, slab origin in real world GPS coordinates, slab heading and project/client information.

TABLE 1

HOUSE TABLE DESCRIPTION

| Field | Type | Description |
| --- | --- | --- |
| IDX | INT (Primary Key) | |
| Location | VARCHAR(1000) | The address/lot of a house/structure location |
| GpsN | REAL | The North GPS location of the house slab origin |
| GpsE | REAL | The East GPS location of the house slab origin |
| Direction | REAL | The slab direction, 0-360° |
| ProjNumber | VARCHAR(1000) | The company project number for the house being built |
| Customer | VARCHAR(1000) | The customer that the house is being built for |
| BldCmplt | BOOL | Indicates if the house has completed |
| BldInProg | BOOL | Indicates if the house has begun |

A house is made up of multiple types of block. Each type is stored in the blocktype table. This contains the block details such as name, manufacturer, ordering details and physical characteristics.

TABLE 2

BLOCKTYPE TABLE DESCRIPTION

| Field | Type | Description |
| --- | --- | --- |
| IDX | INT (Primary Key) | |
| Maker | VARCHAR(1000) | The company that makes the block |
| Description | VARCHAR(1000) | The block type and description |

TABLE 2-continued

BLOCKTYPE TABLE DESCRIPTION

| Field | Type | Description |
|---|---|---|
| OrderCode | VARCHAR(1000) | The order code for the block type |
| Surface | VARCHAR(1000) | The color and type of block, eg red smooth clay |
| Long | REAL | The length of the block |
| Wide | REAL | The width of the block |
| High | REAL | The height of the block |

A house is made up of many blocks, the details of each block are located in the block table. Each block record references the house that it belongs to as well as its type. As well as the location and rotation of the block on the slab, the block record contains the cut length required and if the spigot is to be removed.

TABLE 3

BLOCK TABLE DESCRIPTION

| Field | Type | Description |
|---|---|---|
| IDX | INT (Primary Key) | |
| houseID | INT (Relation) | The 'house' that the block belongs to, many 'block' records can reference the same 'house' |
| blocktypeID | INT (Relation) | The 'blocktype' representing this block, many 'block' records can reference the same 'blocktype' |
| BlockOrder | INT | The ideal order in the house that the block should be placed |
| PosX | REAL | The X position of the block location in the house in slab coordinates |
| PosY | REAL | The Y position of the block location in the house in slab coordinates |
| PosZ | REAL | The Z position of the block location in the house in slab coordinates |
| Direction | REAL | The direction of the block in the house in slab coordinates |
| SawLength | REAL | The length the block must be cut to |
| RemSpigot | BOOL | Specifies if the spigot needs to be removed |

Although blocks have a BlockOrder specifying ideal lay order, this is not mandatory. Blocks can be laid in a different order, for example, for fault handling. There are however some situations where a block (a) must be laid before another block (b), for example, to prevent the laying arm clamp from colliding with already placed blocks. The blockdependency table allows these situations to be specified.

TABLE 4

BLOCKDEPENDENCY TABLE DESCRIPTION

| Field | Type | Description |
|---|---|---|
| IDX | INT (Primary Key) | |
| blockID | INT (Relation) | Block (b) that this dependency record specifies, many 'blockdependency' records can reference the same 'block' |
| dependentblockID | INT (Relation) | Block (a) that this dependency record specifies, many 'blockdependency' records can reference the same 'block' |

For each side of each block requiring routing, a record is placed in the side table. Each record has a link to the block it is associated with. The actual routing information is contained in additional tables.

TABLE 5

SIDE TABLE DESCRIPTION

| Field | Type | Description |
|---|---|---|
| IDX | INT (Primary Key) | |
| blockID | INT (Relation) | The 'block' that this 'side' belongs to, many 'side' records can reference the same 'block' |
| SideID | CHAR | Specifies if the side is the front, back, top, underside, left or right side of the block. |

The bore table references the side table, and uses a record for each hole to be drilled into the face of the block. Each hole has a specified position, width and depth. The location is specified relative to the face origin.

TABLE 6

BORE TABLE DESCRIPTION

| Field | Type | Description |
|---|---|---|
| IDX | INT (Primary Key) | |
| sideID | INT (Relation) | The 'side' that this 'bore' will be performed on, many 'bore' records can reference the same 'side' |
| HoleXPos | REAL | The bore X position relative to the origin of the block side |
| HoleYPos | REAL | The bore Y position relative to the origin of the block side |
| HoleRadius | REAL | The size of the bore to be drilled |
| HoleDeep | REAL | The depth of the bore to be drilled |

The channel table contains details for each channel that has to be put on a block face. It references the face it is to be machined on as well as the channel depth and width. The channel does not have to be a single straight line but can have corners. The channel path is defined by the channelpoint table. Each point references a chase record and are in local face coordinates. Each chase has 2 or more points making up a path for the channel.

TABLE 7

CHANNEL TABLE DESCRIPTION

| Field | Type | Description |
|---|---|---|
| IDX | INT (Primary Key) | |
| sideID | INT (Relation) | The 'side' that this 'channel' will be performed on, many 'channel' records can reference the same 'side' |
| Wide | REAL | The width of the channel |
| Deep | REAL | The depth of the channel |

TABLE 8

CHANNELPOINT TABLE DESCRIPTION

| Field | Type | Description |
|---|---|---|
| IDX | INT (Primary Key) | |
| channelID | INT (Relation) | The 'channel' that this 'channelpoint' is part of, the 'channel' is made of several 'channelpoints' |
| ChaseXPos | REAL | The point X position relative to the origin of the block side |
| ChaseYPos | REAL | The point Y position relative to the origin of the block side |

Parts of the data set are used to generate block routing files for the router on the brick laying machine. A routing file is generated for each block that requires routing and uses the data in the block, side, bore, channel and channelpoint tables. This file is copied to the machine along with the rest of the build data.

Each block type will have associated pallets that the machine needs defined so it can de-hack it. This data is stored in the tables palletdefinition and palletlayer. The palletdefinition table will simply contain the block type, while the palletlayer table will have one record each for the layers in the pallet. Each layer will specify the number of rows and columns, as well as if the rows run left/right or front/back. Front/back is defined as being parallel with the forklift forks.

TABLE 9

PALLETDEFINITION TABLE DESCRIPTION

| Field | Type | Description |
|---|---|---|
| IDX | INT (Primary Key) | |
| blocktypeID | INT (Relation) | The 'blocktype' that makes up this pallet, each 'blocktype' can have many 'palletdefinitions' |

TABLE 10

PALLETLAYER TABLE DESCRIPTION

| Field | Type | Description |
|---|---|---|
| IDX | INT (Primary Key) | |
| palletdefinitionID | INT | The 'palletdefinition' that this 'palletlayer' belongs to, each 'palletdefinition' can have multiple 'palletlayers' |
| LayerNo | INT | The order that the layers are in |
| NoRows | INT | The lumber of rows in this layer |
| NoColumns | INT | The number of columns in this layer |
| Dir | INT | The direction of the layer, 4 directions are possible as the side with the spigot is significant |

Along with the data required to build a structure, the machine state data section of the database contains the information required for the machine to continue building, either at the beginning of a new day, or following an unscheduled shut-down of the H109 controller. When the brick laying machine is restarted after a fault, the data is read back into the controller so that the brick laying machine can continue with minimal operator assistance.

For each structure that the brick laying machine has in its database, it records if the house has started or completed in the house table.

A surveypoint table is used to record points built into the slab that can be used to re-align the laser tracker with the slab after the first course of blocks have been laid. Each surveypoint record references the house table that it is associated with.

TABLE 11

SURVEYPOINTS TABLE DESCRIPTION

| Field | Type | Description |
|---|---|---|
| IDX | INT (Primary Key) | |
| houseID | INT (Relation) | The 'house' that this 'surveypoints' belongs to, many 'surveypoints' records can reference the same 'house' |

TABLE 11-continued

SURVEYPOINTS TABLE DESCRIPTION

| Field | Type | Description |
|---|---|---|
| PosX | REAL | The X position of the point in slab coordinates |
| PosY | REAL | The Y position of the point in slab coordinates |
| PosZ | REAL | The Z position of the point in slab coordinates |

For each of the two de-hacker bays 249 and 250, a record is kept in the loadingstate table. The table records the pallet type, current layer and row that is to be de-hacked and the orientation of the pallet in the bay. The table also records if a row of blocks is currently being held in the de-hacker clamp. The primary ID is used to identify the left and right de-hacker data.

TABLE 12

LOADINGSTATE TABLE DESCRIPTION

| Field | Type | Description |
|---|---|---|
| IDX | INT (Primary Key) | |
| palletdefinitionID | INT | The pallet type that is loaded in the de hacker bay, this corresponds to the 'palletdefinition' IDX field but there is no database relationship |
| ThisLayer | INT | The current/next layer to be de-hacked |
| ThisRow | INT | The current/next row to be de-hacked |
| Direction | INT | The pallet direction in the bay |
| ClampPosition | BOOL | Specifies if the de-hacker has hold of a row of blocks |

For each block that has been loaded into the brick laying machine, either from the de-hacker platforms or saw offcut, an entry is made in the blockstate table. This record references the dehackoperation or sawoperation that produced the block. This is separate from the block table used for house data as a physical block may be damaged, and a second blockstate record generated for the second instance of the block in the house. Also, an offcut from the saw requires a blockstate entry, even if it hasn't yet been assigned to the house. The records specify the blocks current location on the H109, record if the cutting, routing and spigot removal have been completed, the current length of the block and the length of block removed from each end. This data is required in addition to the clamp data (described in the next paragraph) as it can track the difference between a block being damaged and discarded, vs being laid on the house. When a block is QC laser scanned, the actual block dimensions will be stored in the table.

Also associated with the blockstate table are the head flipper and laying arm logs, as these are only stored once per block. These record the start time and operation time of each operation.

TABLE 13

BLOCKSTATE TABLE DESCRIPTION

| Field | Type | Description |
| --- | --- | --- |
| IDX | INT (Primary Key) | |
| blockID | INT (Relation) | The 'block' that that this 'blockstate' is refereeing to, many 'blockstate' records can reference the same 'block' in the case of block breakage |
| dehackeroperationID | INT (Relation) | The 'dehackoperation' that produced this 'blockstate', each 'dehackoperation' can have many 'dehackstate' records |
| sawoperationID | INT (Relation) | The 'sawoperation' that produced this 'blockstate', each 'sawoperation' can have only one 'dehackstate' record |
| LocID | INT | The current location on the machine that the block is in |
| CutComp | REAL | Specifies if the block has been cut to length |
| RouteComp | REAL | Specifies if the block has been routed |
| SpigotComp | REAL | Specifies if the spigot has been removed |
| FrontLengthRem | REAL | Specifies the length of block removed from the front (front and back refer to the two block ends) |
| BackLengthRem | REAL | Specifies the length of block removed from the back (front and back refer to the two block ends) |
| CurrentLength | REAL | Specifies the current length of the block |
| Long | REAL | The QC scanned actual length of the block |
| Wide | REAL | The QC scanned actual width of the block |
| High | REAL | The QC scanned actual height of the block |
| FlipLogTime | TIMESTAMP | The start time of the flipper operation |
| FlipOperationTime | TIME | The time taken for the flipper to complete brick delivery |
| ArmLogTime | TIMESTAMP | The start time of the arm operation |
| ArmOperationTime | TIME | The time taken for the arm to complete brick delivery |

To complement the blockstate table, there is a location-state table to record the state of all clamps on the machine. This table records if the clamp has a block and what its ID is. This is required in addition to the block state data as during block transfers, two clamps can be holding the same block. This data is used to prevent the machine moving two clamps apart when they both have hold of a block as it could cause damage to the machine.

TABLE 14

LOCATION TABLE DESCRIPTION

| Field | Type | Description |
| --- | --- | --- |
| IDX | INT (Primary Key) | |
| clampID | INT | The ID of the physical clamp on the machine |
| clampPosition | BOOL | Specifies if the clamp has hold of a block |
| BlockID | INT | The block type that is loaded in the de hacker bay, this corresponds to the 'block' IDX field but there is no database relationship |

To perform equipment logging, each item of equipment of has its own data structure type in a PLC. Separate buffers for each equipment struct type are used for logs across the brick laying machine. If the tail does not get appended successfully, an alarm will be raised.

Each time a piece of machine equipment moves or handles a block, the details are recorded. Typically this includes the block ID, what the equipment was doing, performance parameters and any applied corrections from the Vision system.

The conveyoroperation table records the pallet type that was loaded and operational data. The operational data consists of operation time, the mean torque, the torque standard deviation, the lag error mean and the lag error standard deviation. The operational data will aid the detection of equipment performance changes over time. Conveyor operation records are not attached to a particular house, as the blocks from a single pallet could be used to build adjacent houses without machine pack up in between.

TABLE 15

LOCATION TABLE DESCRIPTION

| Field | Type | Description |
| --- | --- | --- |
| IDX | INT (Primary Key) | |
| palletdefinitionID | INT (Relation) | Links to the 'palletdefinition' that defines the pallet type loaded by the 'conveyoroperation' record, each 'palletdefinition' can have many 'conveyoroperation' records |
| LogTime | TIMESTAMP | The time that the operation began |
| OperationTime | TIME | The time it took to perform the operation |
| DehackerID | INT | The de-hacker (eg left or right) that performed the operation |
| MeanTorque | REAL | The mean (average) torque of the axis during the operation |
| TorqueDeviation | REAL | The statistical standard deviation of the axis torque during the operation |

TABLE 15-continued

LOCATION TABLE DESCRIPTION

| Field | Type | Description |
| --- | --- | --- |
| MeanLagError | REAL | The mean (average) lag error of the axis during the operation |
| LagErrorDeviation | REAL | The statistical standard deviation of the axis lag error during the operation |

For each row removed from a pallet, a dehack operation is recorded in the dehackoperation table. This includes the results returned from the vision system. That is, the X and Y location as well as the rotation of three detected rows. The three rows are the two edge rows and the centre most row. The centre row is required as the geometry of the bays requires some pallets to be dehacked from the centre rows out. Along with the vision data, the PLC records the pallet layer and what row (of the three returned) was actually picked up. Operational logs are not stored as the de-hackers are 3d motion controlled CNC equipment, and the data cannot easily be reduced to a set of statistical values. Analysis of these drives must be performed on the axis logging data described later. The operation logs will not include the clamp operation as this is handled by the clamp exchange tables described below.

TABLE 16

DEHACKOPERATION TABLE DESCRIPTION

| Field | Type | Description |
| --- | --- | --- |
| IDX | INT (Primary Key) | |
| conveyoroperatioID | INT (Relation) | The 'conveyoroperation' that that produced the pallet that this 'dehackoperation' is being performed on, each 'conveyoroperation' can have many 'dehackoperation' records |
| LogTime | TIMESTAMP | The time that the operation began |
| OperationTime | TIME | The time it took to perform the operation |
| LayerNo | INT | The layer being dehacked |
| RowNo | INT | The row (of those returned from the vision system) that was dehacked |
| PosX1 | REAL | Row 1 X position |
| PosY1 | REAL | Row 1 Y position |
| PosR1 | REAL | Row 1 rotation |
| PosX2 | REAL | Row 2 X position |
| PosY2 | REAL | Row 2 Y position |
| PosR2 | REAL | Row 2 rotation |
| PosX3 | REAL | Row 3 X position |
| PosY3 | REAL | Row 3 Y position |
| PosR3 | REAL | Row 3 rotation |
| RowsDetected | INT | How many rows were detected by the vision system |

For each cut the saw makes, a saw operation is recorded in the sawoperation table. The operation logs will not include the clamp operation as this is handled by the clamp exchange tables described below. The operational logs will hold the table axis operation time, the mean torque, the torque standard deviation and the lag error standard deviation. It will also record the saw torque standard deviation and the velocity error standard deviation.

TABLE 17

LOCATION TABLE DESCRIPTION

| Field | Type | Description |
|---|---|---|
| IDX | INT (Primary Key) | |
| blockstateID | INT (Relation) | Links to the 'blockstate' that that the 'sawoperation' was performed on, each 'blockstate' can have only one 'sawoperation' record |
| LogTime | TIMESTAMP | The time that the operation began |
| OperationTime | TIME | The time it took to perform the operation |
| MeanTorque | REAL | The mean (average) torque of the saw during the operation |

For each block that the router cuts, a router operation is recorded in the routeroperation table. Operational logs are not stored as the router is a 3d motion controlled CNC equipment, and the data cannot easily be reduced to a set of statistical values. Analysis of these drives must be performed on the axis logging data described later. The logs will not include the clamp operation as this is handled by the clamp exchange tables described below.

TABLE 18

LOCATION TABLE DESCRIPTION

| Field | Type | Description |
|---|---|---|
| IDX | INT (Primary Key) | |
| blockstateID | INT (Relation) | Links to the 'blockstate' that that the 'routeroperation' was performed on, each 'blockstate' can have only one 'routeroperation' record |
| LogTime | TIMESTAMP | The time that the operation began |
| OperationTime | TIME | The time it took to perform the operation |

Each time the transfer robot moves a block from one location to another, a transfer operation log is made in the transferoperation table. This the source and destination clamp locations. The transfer can perform multiple types of block transfer and these require different logs. If the block requires an accurate pick up, the logs include the results returned from the vision system. That is, the X and Y location as well as the rotation of the block. If the transfer is to the carousel, the transfer will include a laser scan. The laser scan logs if the scan resulted in an accurate block match to the expected block. Operational logs are not stored as the transfer is a 3d motion controlled CNC equipment, and the data cannot easily be reduced to a set of statistical values. Analysis of these drives must be performed on the axis logging data described later. The logs will not include the clamp operation as this is handled by the clamp exchange tables described below.

TABLE 19

TRANSFEROPERATION TABLE DESCRIPTION

| Field | Type | Description |
|---|---|---|
| IDX | INT (Primary Key) | |
| blockstateID | INT (Relation) | Links to the 'blockstate' that that the 'transferoperation' was performed on, each 'blockstate' can have many 'transferoperation' records |
| LogTime | TIMESTAMP | The time that the operation began |
| OperationTime | TIME | The time it took to perform the operation |
| SourceLoc | INT | The location ID where the transfer picked up the block |
| DestinationLoc | INT | The location ID where the transfer dropped off the block |
| PosX | REAL | Vision system correction X component |
| PosY | REAL | Vision system correction Y component |
| PosR | REAL | Vision system correction rotation component |
| BlockMatch | BOOL | If the transfer included a laser scan QC, this field will indicate if the scan matched the model in memory |
| ClampGrabOp | INT | Refers to the clamp grab operation record, there is no actual database relationship |
| ClampReleaseOp | INT | Refers to the clamp grab operation record, there is no actual database relationship |

Every time a block is grabbed or released by a clamp (or platform), a clamp operation is logged in the clampoperation and clampexchange tables. These are always in pairs (giving and receiving clamp/platform) and are linked by a clampexchange table. This includes the type of operation (open/close), the clamp side (left/right for individually operated clamp sides) and the operation logs for the clamp. The operational data will aid the detection of equipment performance changes over time. The operational data consists of operation time, the mean torque and the torque standard deviation. Depending on if the clamp is a position or clamp operation, the additional data of velocity error standard deviation or lag error standard deviation is also logged.

TABLE 20

CLAMPOPERATION TABLE DESCRIPTION

| Field | Type | Description |
| --- | --- | --- |
| IDX | INT (Primary Key) | |
| blockstateID | INT (Relation) | Links to the 'blockstate' that that the 'clampoperation' was performed on, each 'blockstate' can have only one 'clampoperation' record |
| LogTime | TIMESTAMP | The time that the operation began |
| OperationTime | TIME | The time it took to perform the operation |
| IDClamp | INT | The clamp that this record has been logged for |
| OperationType | BOOL | Is the operation opening or closing |
| SideClamp | BOOL | Specifies the left or right clamp for two piece clamps |
| MeanTorque | REAL | The mean (average) torque of the axis during the operation |
| TorqueDeviation | REAL | The statistical standard deviation of the axis torque during the operation |
| VeloErrorDeviation | REAL | The statistical standard deviation of the axis velocity error during the operation |

TABLE 21

CLAMPEXCHANGE TABLE DESCRIPTION

| Field | Type | Description |
| --- | --- | --- |
| IDX | INT (Primary Key) | |
| clampoperationdestinationID | INT (Relation) | The 'clampoperation' that is receiving the block, each 'clampoperation' can link to multiple 'clampexchange' records (give and receive) |
| clampoperationsourceID | INT (Relation) | The 'clampoperation' that is giving the block, each 'clampoperation' can link to multiple 'clampexchange' records (give and receive) |

The vision system logging uses the database frequently. Upon start-up, the vision system will grab the details of every type of block from the database. This information is comprised of properties of the block relevant to the vision system, such as the ideal dimensions of the block, the presence of a spigot and the stacking pattern of the pallet for that block type.

This information is used frequently through all vision modules once taken from the database, but the system does not query it again, and hence the generic information flow is not documented here.

However, during operation, the database is queried for more specific information about the blocks. This information relates to the state of the block such as its current location, its measured size, its block type and its bore/channel details.

Upon completion of each vision analysis, the results are logged into the database. This information is kept for later review if required for any reason, and is detailed enough to trace any single block to all images it appears in.

The information stored is separated by module, as described in the following sections.

The dehacker module has a lot more information to log when compared to the other modules, with respect to the database. Every dehacker process has an associated dehackhalcon table with it. As with other modules, one of these records is created for every request the PLC makes.

TABLE 22

DEHACKHALCON TABLE DESCRIPTION

| Field | Type | Description |
| --- | --- | --- |
| IDX | INT (Primary Key) | |
| dehackoperationID | INT (RELATION) | Links to the 'dehackoperation' that the 'dehackhalcon' analysis was performed for, each 'dehackoperation' can have many 'clehackhalcon' records |
| ErrorID | INT | If the analysis could not be completed, the error code returned to the PLC |

Unlike other modules, the dehacker contains three tables of results, the dehackrowshalcon, dehackrowhalcon and the dehackblockhalcon. For every attempted analysis, a dehackrowshalcon record is created, along with a list of block rows, each represented by a single dehackrowhalcon entry. This entry contains the calculated effective centre of the row in 6DOF. For every block row, there exists many blocks, each block is represented by an entry in the dehackblockhalcon table, each containing the 6DOF of the block as well as the type of block. Therefore, every attempt for the dehacker vision module contains one dehackrowshalcon, comprised of many dehackrowhalcon which in turn each have many dehackblockhalcon. The three rows that are selected for PLC return, are indicated in the dehackrowhalcon records.

TABLE 23

DEHACKROWSHALCON TABLE DESCRIPTION

| Field | Type | Description |
|---|---|---|
| IDX | INT (Primary Key) | |
| dehackhalconID | INT (RELATION) | Links to the 'dehackhalcon' record that the 'dehackrowshalcon' record belongs to, each 'dehackhalcon' record can have many 'dehackrowshalcon' records |
| LogTime | TIMESTAMP | The time that the operation began |

TABLE 24

DEHACKROWHALCON TABLE DESCRIPTION

| Field | Type | Description |
|---|---|---|
| IDX | INT (Primary Key) | |
| dehackrowshalconID | INT (RELATION) | Links to the 'dehackrowshalcon' record that the 'dehackrowhalcon' record belongs to, each 'dehackrowshalcon' record can have many 'dehackrowhalcon' records |
| ResultRow | INT | IF this row is a result returned to the PLC, give it the PLC return number (1-3) else this will be 0 |
| PosX | REAL | The X coordinate of the row center |
| PosY | REAL | The Y coordinate of the row center |
| PosZ | REAL | The Z coordinate of the row center |
| PosA | REAL | The A rotation of the row |
| PosB | REAL | The B rotation of the row |
| PosC | REAL | The C rotation of the row |

TABLE 25

DEHACKBLOCKHALCON TABLE DESCRIPTION

| Field | Type | Description |
|---|---|---|
| IDX | INT (Primary Key) | |
| dehackrowhalconID | INT (RELATION) | Links to the 'dehackrowhalcon' record that the 'dehackblockhalcon' record belongs to, each 'dehackrowhalcon' record can have many 'dehackblockhalcon' records |
| BlockTypeID | INT | The block type for the block being analysed, this corresponds to the 'block' IDX field but there is no database relationship |
| PosX | REAL | The X coordinate of the block centre |
| PosY | REAL | The Y coordinate of the block centre |
| PosZ | REAL | The Z coordinate of the block centre |
| PosA | REAL | The A rotation of the block |
| PosB | REAL | The B rotation of the block |
| PosC | REAL | The C rotation of the block |

Every transfer operation is linked to a single table in the database named transferhalcon. This table represents the link between a PLC operation and the vision system analyses. One of these tables is created for every time the PLC commences a transfer operation to move a block from one location in the base to another location. Each of these transfers will contain one or more transferblockhalcon tables.

The transferblockhalcon table is the table which contains the actual results of each analysis. The information stored in this table both represent the detected location of the block as well as having the required information to reproduce the analysis if required. Hence, the table contains the results of the analysis as well as the state of the block and the location it is stored in. The results of the analysis being the blocks' X, Y and R locations. The state of the block describes the block at the time of analysis, with regards to its left cut amount and a right cut amount. Finally, the location state comprises of an offset X, Y and R for the analysis location, calculated via offsets provided by the PLC and offsets defined during machine setup/calibration.

TABLE 26

TRANSFERHALCON TABLE DESCRIPTION

| Field | Type | Description |
| --- | --- | --- |
| IDX | INT (Primary Key) | |
| transferoperationID | INT (RELATION) | Links to the 'transferoperation' record that the 'transferhalcon' record belongs to, each 'transferoperation' record can have many 'transferoperation' records |
| ErrorID | INT | If the analysis could not be completed, the error code returned to the PLC |

TABLE 27

TRANSFEBLOCKRHALCON TABLE DESCRIPTION

| Field | Type | Description |
| --- | --- | --- |
| IDX | INT (Primary Key) | |
| transferhalconID | INT (RELATION) | Links to the 'transferhalcon' record that the 'transferblockhalcon' record belongs to, each 'transferhalcon' record can have many 'transferblockhalcon' records |
| LogTime | TIMESTAMP | The time that the operation began |
| CutLeft | REAL | The amount of block missing on the left end |
| CutRight | REAL | The amount of block missing on the right end |
| OffsetX | REAL | A bay can hold multiple blocks, the represents the X coordinate offset for the block that should be analysed |
| OffsetY | REAL | A bay can hold multiple blocks, the represents the Y coordinate offset for the block that should be analysed |
| OffsetR | REAL | A bay can hold multiple blocks, the represents the Rotation offset for the block that should be analysed |
| PosX | REAL | The actual X coordinate of the block |
| PosY | REAL | The actual Y coordinate of the block |
| PosZ | REAL | The actual Rotation of the block |

Every QC laser scanner operation is linked to a single table in the database named laserscanhalcon. This table represents the link between a PLC operation and the vision system analyses. One of these tables is created every time the PLC passes the laser scanner with a block for the carousel, and is populated with one or more result tables. The QC results are very simple. The PLC only receives a pass or fail, with an identifier if failed. As before, there may be a number of analyses for each laserscanhalcon entry, one for each attempt.

TABLE 28

LASERSCANHALCON TABLE DESCRIPTION

| Field | Type | Description |
|---|---|---|
| IDX | INT (Primary Key) | |
| transferoperationID | INT (RELATION) | Links to the 'transferoperation' record that the 'laserscanhalcon' record belongs to, each 'transferoperation' record can have many 'laserscanhalcon' records |
| ErrorID | INT | If the analysis could not be completed, the error code returned to the PLC |

TABLE 29

LASERSCANBLOCKHALCON TABLE DESCRIPTION

| Field | Type | Description |
|---|---|---|
| IDX | INT (Primary Key) | |
| laserscanhalconID | INT (RELATION) | Links to the 'laserscanhalcon' record that the 'laserscanblockhalcon' record belongs to, each 'laserscanhalcon' record can have many 'laserscanblockhalcon' records |
| LogTime | TIMESTAMP | The time that the operation began |
| BlockMatch | BOOL | Does the scanned block match the 3d model of the block within a pre-determined tolerance |
| Long | REAL | The scanned length of the brick |
| Wide | REAL | The scanned width of the brick |
| High | REAL | The scanned height of the brick |

For every lay head vision operation, there exists a single table named headhalcon. This table represents the link between PLC operation and the vision system analyses. One of these tables is created for every request the PLC requests for the lay head module and is populated with one or more result tables.

For every headhalcon table there exists at least one table named headblockhalcon. This table contains the actual results of a single vision analysis, which are the 6DOF poses of the blocks. In the case of an intermittent fault, there will be more than one of these headblockhalcon table, one for each attempt.

TABLE 30

HEADHALCON TABLE DESCRIPTION

| Field | Type | Description |
|---|---|---|
| IDX | INT (Primary Key) | |
| blockstateID | INT (RELATION) | Links to the 'blockstate' record that the 'headhalcon' record belongs to, each 'blockstate' record can have many 'headhalcon' records |
| ErrorID | INT | If the analysis could not be completed, the error code returned to the PLC |

TABLE 31

HEADBLOCKHALCON TABLE DESCRIPTION

| Field | Type | Description |
|---|---|---|
| IDX | INT (Primary Key) | |
| headhalconID | INT (RELATION) | Links to the 'headhalcon' record that the 'headblockhalcon' record belongs to, each 'headhalcon' record can have many 'headblockhalcon' records |
| LogTime | TIMESTAMP | The time that the operation began |
| PosX | REAL | The X component position correction of the actual block location |
| PosY | REAL | The Y component position correction of the actual block location |
| PosZ | REAL | The Z component position correction of the actual block location |
| PosA | REAL | The A component position correction of the actual block location |
| PosB | REAL | The B component position correction of the actual block location |
| PosC | REAL | The C component position correction of the actual block location |

For every single instance of any vision result table, the vision system also stores several images used and created during the analysis in a standardised location. These images include the raw image from the image device, as well as various other forms of data generated during analysis. The filenames of the files describe the situation when the request was made.

For example, the filename "Logs/B1/TM/T8-1-F1P" refers to:

House 1, Transfer Master, Transfer location 8, PLC operation ID 1, Faulted attempt 1, Processed.

For the dehacker, the raw image and a processed image are stored for every dehackhalcon entry. The processed image being the image after being rectified into global co-ordinates and has the locations of each block and row marked.

Dehacker entries are stored with the identifier D #, where # is the ID of the dehacker. The file prefixes match the identifier.

The transfer stores the raw image from the relevant camera and the processed image after being mapped into the world co-ordinate system, with the detected block outlined.

These entries are stored with the identifier TM, with the individual entries prefixed T #, where # is the location ID.

For every laserscanhalcon entry, the raw image from the laser scanner is stored, as well as the point cloud represented in the image, the point cloud of missing points, and the point cloud of extra points. For later reference, the match location of the block in the point cloud is also stored, despite not being relevant to operation.

QC entries are stored using the identifier QC. With files being prefixed also with QC and suffixed with the content type, where M refers to missing and E refers to extra. Example: QC-2, QC-4-F2M or QC-6-F1E. In theory, there should not be a M or E file for a perfect block.

For the layhead, all raw images from the camera array as well as the calculated point cloud from the images are stored for every headhalcon entry.

Layhead entries are stored using the identifier LH, with the numerous images prefixed Lb 1 to L6.

All axis and instruments have normal logging of operational data. As a drive is operating it will check the following parameters:

Lag between setpoint and actual position of drive (PositionLag)
Velocity of drive
Acceleration of drive
Torque of drive
Distance travelled by drive If any of these change by a significant amount (amount is configurable) an event will be triggered to create a log in the database. Regardless of the trigger for logging, the following variables will be stored:

TABLE 32

DRIVE TABLE DESCRIPTION

| Field | Type | Description |
| --- | --- | --- |
| IDX | INT (Primary Key) | |
| DriveID | INT | unique ID of the drive |
| LogTime | TIMESTAMP | The time that the log was generated |
| TotalDistance | BIGINT | Total distance travelled by drive at this point in time |
| ExecutePosition | BOOL | Drive is being commanded to move to the set point |
| PositionSP | REAL | Drive position set point from the controller |
| Position | REAL | Drive position at time of logging |
| PositionLag | REAL | Drive position lag (difference between setpoint and actual position) at time of logging |
| Velocity | REAL | Drive velocity at time of logging |
| Acceleration | REAL | Drive acceleration at time of logging |
| Torque | REAL | Drive torque at time of logging |

This data will be stored within a custom-made 'drive-log' structure. This will then be appended as a tail to a buffer of axis log structures. The buffer will be used for all axis logs across the machine. If the tail does not get appended successfully, an alarm will be raised.

A drive that is defined as a DriveReference will store the above variables, as well as the position, velocity and acceleration relative to the parent that it is referencing. The data will be stored within a custom-made 'DriveReference-log' structure. The buffer will be used for all DriveReference logs across the machine. If the tail does not get appended successfully, an alarm will be raised.

TABLE 33

DRIVEREFERENCE TABLE DESCRIPTION

| Field | Type | Description |
| --- | --- | --- |
| IDX | INT (Primary Key) | |
| DriveID | INT | unique ID of the drive |
| LogTime | TIMESTAMP | The time that the log was generated |
| TotalDistance | BIGINT | Total distance travelled by drive at this point in time |
| ExecutePosition | BOOL | Drive is being commanded to move to the set point |
| PositionSP | REAL | Drive position set point from the controller |
| Position | REAL | Drive position at time of logging |
| PositionLag | REAL | Drive position lag (difference between setpoint and actual position) at time of logging |
| Velocity | REAL | Drive velocity at time of logging |
| Acceleration | REAL | Drive acceleration at time of logging |
| Torque | REAL | Drive torque at time of logging |
| ExecutePositionRef | REAL | Drive is being commanded to move to the referenced position SP |

TABLE 33-continued

DRIVEREFERENCE TABLE DESCRIPTION

| Field | Type | Description |
|---|---|---|
| PositionRefSP | REAL | Drive referenced position SP from the controller |
| PositionRef | REAL | Drive referenced position at time of logging |
| VelocityRef | REAL | Drive referenced velocity at time of logging |
| AccelerationRef | REAL | Drive referenced acceleration at time of logging |

A drive that is defined as DriveClamp will store the same variables as a DriveReference, as well as total distance the clamp apparatus itself has travelled. It also records the clamp operation state (what the clamp is doing). The data will be stored within a custom-made 'DriveClamp-log' structure. The buffer will be used for all DriveClamp logs across the machine. If the tail does not get appended successfully, an alarm will be raised.

TABLE 34

DRIVEREFERENCE TABLE DESCRIPTION

| Field | Type | Description |
|---|---|---|
| IDX | INT (Primary Key) | |
| DriveID | INT | unique ID of the drive |
| LogTime | TIMESTAMP | The time that the log was generated |
| TotalDistance | BIGINT | Total distance travelled by drive at this point in time |
| ExecutePosition | BOOL | Drive is being commanded to move to the set point |
| PositionSP | REAL | Drive position set point from the controller |
| Position | REAL | Drive position at time of logging |
| PositionLag | REAL | Drive position lag (difference between setpoint and actual position) at time of logging |
| Velocity | REAL | Drive velocity at time of logging |
| Acceleration | REAL | Drive acceleration at time of logging |
| Torque | REAL | Drive torque at time of logging |
| ExecutePositionRef | REAL | Drive is being commanded to move to the referenced position SP |
| PositionRefSP | REAL | Drive referenced position SP from the controller |
| PositionRef | REAL | Drive referenced position at time of logging |
| VelocityRef | REAL | Drive referenced velocity at time of logging |
| AccelerationRef | REAL | Drive referenced acceleration at time of logging |
| ClampTotalDistance | BIGINT | Total distance travelled by the clamp at this point in time |
| OperationState | INT (ENUM) | What is the clamp doing:<br>0—no command<br>1—opening<br>2—open<br>3—closing<br>4—closed |

The design and control software of the invention provides a complete solution from design through to completed build, of any structure that may be built from bricks or blocks using a brick laying machine.

The claims defining the invention are as follows:

1. A computer-implemented method for designing a brick construction implemented by a brick laying machine, the method comprising:
   receiving input building plan data from a user;
   generating, from said building plan data, data representative of a scale top-plan view of walls with predetermined known wall length dimensions;
   generating a virtual extrusion of length commensurate with the wall height;
   determining brick by brick placement data for said walls, including the identification of a position and orientation in three dimensions of each brick relative to a point of origin, including determining brick stepping and brick nesting at wall intersections, and having regard to a predetermined minimum cut brick length—determination of cut length data for individual bricks to be cut to length in order to meet the required dimensions of wall length;
   compiling a brick placement database including brick type, position and orientation in three dimensions of each brick relative to said point of origin, and cut length data for each brick identified as to be cut to length; and
   determining a brick laying order indicative of an order in which each brick is to be laid, and creating in the brick placement database an index number allocated to each brick to identify the brick laying order, wherein the database includes a dependency data field associated with each brick that is indicative of one or more other bricks that must be previously laid to avoid laying arm collisions with the one or more other previously laid bricks;
   wherein the brick placement database is used by a brick laying machine to cut and optionally to machine each brick in accordance with data stored in the brick placement database, the brick laying machine conveying each brick one by one according to the brick laying order identified by the stored index numbers allocated to each brick, and applying adhesive and locating each brick according to data stored in the brick placement database on a footing, pad or previously laid course of bricks, with application of adhesive prior to positioning of each brick, to thereby lay the bricks.

2. The computer-implemented method of claim 1 having a first table containing one or more user selectable settings allowing stock brick type and size parameters to be stored and selected for walls.

3. The computer-implemented method of claim 1 wherein said building plan data is representative of a scale top-plan view of external walls and internal walls.

4. The computer-implemented method of claim 1 further comprising generating footing data and/or concrete pad data including the dimensions, position and orientation of the footings and/or concrete pad relative to a point of origin, relative height off-set between the bottom of external walls and optionally the bottom of internal walls and between different sections of the internal walls and optionally determining the required volume of concrete to form the pad.

5. The computer-implemented method of claim 1 further comprising allowing user input of and storing positioning data for voids and/or apertures in said extrusion, said voids and/or apertures being of dimensions commensurate with the height and width of doors and windows to be fitted in the completed building.

6. The computer-implemented method of claim 1 further comprising allowing user input of and storing services positioning data for at least one of plumbing, electrical and ICT (Information and Communication Technology) and sound and vision cabling and connection points in external walls and in internal walls; generating positioning data for channels in said walls to carry services and recesses in said walls for said connection points; generating machining data for the location of recesses and cavities to be machined in individual bricks according to the positioning data of said channels and recesses;

and storing said machining data in said brick placement database.

7. The computer-implemented method of claim 1 wherein a reference position on each brick is a centroid of all dimensions of each brick, trimmed or whole, not taking into account any routed cut-outs or recesses.

8. The computer-implemented method of claim 1 wherein different spacings between adjacent bricks and thicknesses of adhesive or mortar between adjacent bricks are accounted for and adjacent brick spacing A and brick base spacing B are stored in the brick placement database.

9. The computer-implemented method of claim 1, further comprising storing coordinates of a cut for cut bricks in the brick placement database.

10. The computer-implemented method of claim 6 having a first library in which data pertaining to one or more building plans in the form of data sets are stored.

11. The computer-implemented method of claim 6 wherein walls of a structure to be built are treated as segments extending between intersections of brickwork, where each segment has a course segment extending between intersections of brickwork and window and door opening edges; where any said course segment has a length s, where:

$$s = n.(b+A) + r + A + p.e + p.A + q.f + q.A - A;$$

where A is the A value or gap),
b is the stock brick length,
e and f are the end overlap at a brick wall intersection,
p may be 1 (indicating e is equal to the width of a brick at the intersecting wall, or zero (abutting),
q may be 1 (indicating f is equal to the width of a brick at the intersecting wall, or zero (abutting), and
r is the remainder which may be zero or greater than or equal to 0.2 b, preferably 0.25 b, and if this is true, a single brick is cut to length r to complete the course segment;
and if r is less than 0.2 b, preferably 0.25 b, $$s = (n-1).(b+A) + 2r + 2A + p.e + p.A + p.f + q.A - A$$

where r is the length that two bricks are cut to, to locate within and complete a course segment having n–1 bricks.

12. The computer-implemented method of claim 11 wherein a next course of bricks are arranged in order to achieve preferred stepping, where a course segment includes two bricks of length r, the immediately overlying course segment includes a single brick of length r balanced on the join between the two bricks of length r, with two bricks cut to length of c=(b+r)/2, located on either side thereof, with bricks of stock brick length b continuing away from at least one of said two bricks cut to length of c, and the course segment length can be described by the following:

$$s = (n-2).(b+A) + r + A + 2(c+A) + p.e + p.A + p.f + q.A - A.$$

13. The computer-implemented method of claim 1 further comprising a library of handling identifiers which each identify a unique handling device within said brick laying machine, and generating a handling table identifying individual bricks and associating individual bricks with a particular handling device at a particular time, and updating said handling table as individual bricks progress from handling device to handling device with the elapsing of time.

14. The computer-implemented method of claim 1 further comprising receiving data from a scanner located at a surveying position to measure a relative surface height of a surface extent where bricks are to be laid, and calculating corrected x y z position and orientation data relative to said point of origin for each brick recorded in said brick placement database, based on a difference between the location of the point of origin and the surveying position, and recording the corrected x y z position and orientation data relative to said surveying position, for use in controlling said brick laying machine.

15. The computer-implemented method of claim 1 further comprising receiving data from a scanner located at a surveying position to measure a relative surface height of a surface extent where bricks are to be laid, and correcting for the difference in positioning of said surveying position and said point of origin and determining the difference in height of the surface for said at least one location for each brick, from the lowest point and the highest point for each course of bricks and storing the difference in the brick placement database as trim data corresponding with an amount to be machined from a horizontal face of each brick so that the top of each course of bricks is level when laid, the trim data being measured and stored as a trim value array for multiple locations for each brick, so that the brick laying machine may machine a brick to compensate for localised footing or pad height excesses.

* * * * *